United States Patent
Akimoto et al.

(10) Patent No.: US 12,061,644 B2
(45) Date of Patent: Aug. 13, 2024

(54) IMAGE RETRIEVAL SYSTEM AND IMAGE RETRIEVAL METHOD

(71) Applicant: SEMICONDUCTOR ENERGY LABORATORY CO., LTD., Atsugi (JP)

(72) Inventors: Kengo Akimoto, Kanagawa (JP); Shigeru Tamaki, Kanagawa (JP); Kunitaka Yamamoto, Kanagawa (JP); Isamu Shigemori, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 355 days.

(21) Appl. No.: 17/439,684

(22) PCT Filed: Mar. 17, 2020

(86) PCT No.: PCT/IB2020/052405
§ 371 (c)(1),
(2) Date: Sep. 15, 2021

(87) PCT Pub. No.: WO2020/201866
PCT Pub. Date: Oct. 8, 2020

(65) Prior Publication Data
US 2022/0164381 A1 May 26, 2022

(30) Foreign Application Priority Data
Mar. 29, 2019 (JP) .................................. 2019-065757

(51) Int. Cl.
*G06F 16/58* (2019.01)
*G06F 16/53* (2019.01)
(Continued)

(52) U.S. Cl.
CPC .......... *G06F 16/5866* (2019.01); *G06F 16/53* (2019.01); *G06F 16/5846* (2019.01); *G06F 40/268* (2020.01); *G06N 3/045* (2023.01)

(58) Field of Classification Search
CPC .................................................. G06T 19/006
See application file for complete search history.

(56) References Cited

U.S. PATENT DOCUMENTS 8,180,162 B2  5/2012  Haseyama
9,384,419 B2  7/2016  Konishi
(Continued)

FOREIGN PATENT DOCUMENTS

CN  104899253 A  9/2015
EP  2211275 A  7/2010
(Continued)

OTHER PUBLICATIONS

International Search Report (Application No. PCT/IB2020/052405) Dated Jun. 9, 2020.
(Continued)

*Primary Examiner* — Di Xiao
(74) *Attorney, Agent, or Firm* — Fish & Richardson P.C.

(57) ABSTRACT

An image retrieval system with high retrieval accuracy is provided. The image retrieval system includes a database and a processing portion. The database has a function of storing a plurality of pieces of database image data, and a database tag is linked to each of the plurality of pieces of database image data. The processing portion has a function of obtaining database image feature value data representing a feature value of the database image data for each piece of the database image data. The processing portion has a function of obtaining query image feature value data representing a feature value of the query image data. The processing portion has a function of calculating first similarity
(Continued)

of the database image data to the query image data for each piece of the database image data. The processing portion has a function of obtaining a query tag linked to the query image data using some of the database tags.

14 Claims, 26 Drawing Sheets

(51) Int. Cl.
*G06F 16/583* (2019.01)
*G06F 40/268* (2020.01)
*G06N 3/045* (2023.01)

(56) References Cited

U.S. PATENT DOCUMENTS

| | | | |
|---|---|---|---|
| 9,773,160 B2 | 9/2017 | Perlmutter et al. | |
| 10,102,277 B2 | 10/2018 | Legrand et al. | |
| 10,503,765 B2 | 12/2019 | Duffy | |
| 10,606,883 B2 | 3/2020 | Legrand et al. | |
| 11,216,496 B2 | 1/2022 | Duffy | |
| 2007/0255695 A1 | 11/2007 | Hu et al. | |
| 2014/0355886 A1 | 12/2014 | Konishi | |
| 2015/0120760 A1* | 4/2015 | Wang | G06F 18/2178 707/749 |
| 2015/0331908 A1* | 11/2015 | Duffy | G06F 16/93 707/765 |
| 2017/0039198 A1* | 2/2017 | Ramamurthy | G06F 16/904 |
| 2017/0317085 A1 | 11/2017 | Kurokawa | |
| 2018/0005588 A1 | 1/2018 | Kurokawa | |
| 2018/0060356 A1* | 3/2018 | Watanabe | G06F 16/5838 |
| 2018/0267996 A1* | 9/2018 | Lin | G06F 16/5866 |
| 2019/0005035 A1 | 1/2019 | Yamazaki et al. | |
| 2019/0050427 A1* | 2/2019 | Wiesel | G06T 19/00 |
| 2019/0156122 A1* | 5/2019 | Lu | G06V 10/761 |
| 2021/0011956 A1 | 1/2021 | Yamazaki et al. | |

FOREIGN PATENT DOCUMENTS

| | | |
|---|---|---|
| JP | 2007-188440 A | 7/2007 |
| JP | 2015-007972 A | 1/2015 |
| JP | 2017-207947 A | 11/2017 |
| JP | 2018-045517 A | 3/2018 |
| JP | 2018-073429 A | 5/2018 |
| JP | 2018-206376 A | 12/2018 |
| TW | 200741491 | 11/2007 |
| TW | 201606537 | 2/2016 |
| WO | WO-2007/043679 | 4/2007 |
| WO | WO-2009/060722 | 5/2009 |
| WO | WO-2015/173647 | 11/2015 |
| WO | WO-2017/064561 | 4/2017 |
| WO | WO-2017/064563 | 4/2017 |
| WO | WO-2017/098475 | 6/2017 |
| WO | WO-2020/183267 | 9/2020 |

OTHER PUBLICATIONS

Written Opinion (Application No. PCT/IB2020/052405) Dated Jun. 9, 2020.
Taiwanese Office Action (Application No. 109109919) dated Aug. 15, 2023.

* cited by examiner

S04

| Tag | Vector |
|---|---|
| Circuit diagram | (0.12, 0.55, ···) |
| Block diagram | (0.30, 0.23, ···) |
| aaa | (0.96, 0.61, ···) |
| bbb | (0.45, 0.87, ···) |
| ccc | (0.28, 0.75, ···) |
| ddd | (0.50, 0.13, ···) |
| ggg | (0.02, 0.08, ···) |
| hhh | (0.91, 0.03, ···) |
| ⋮ | ⋮ |

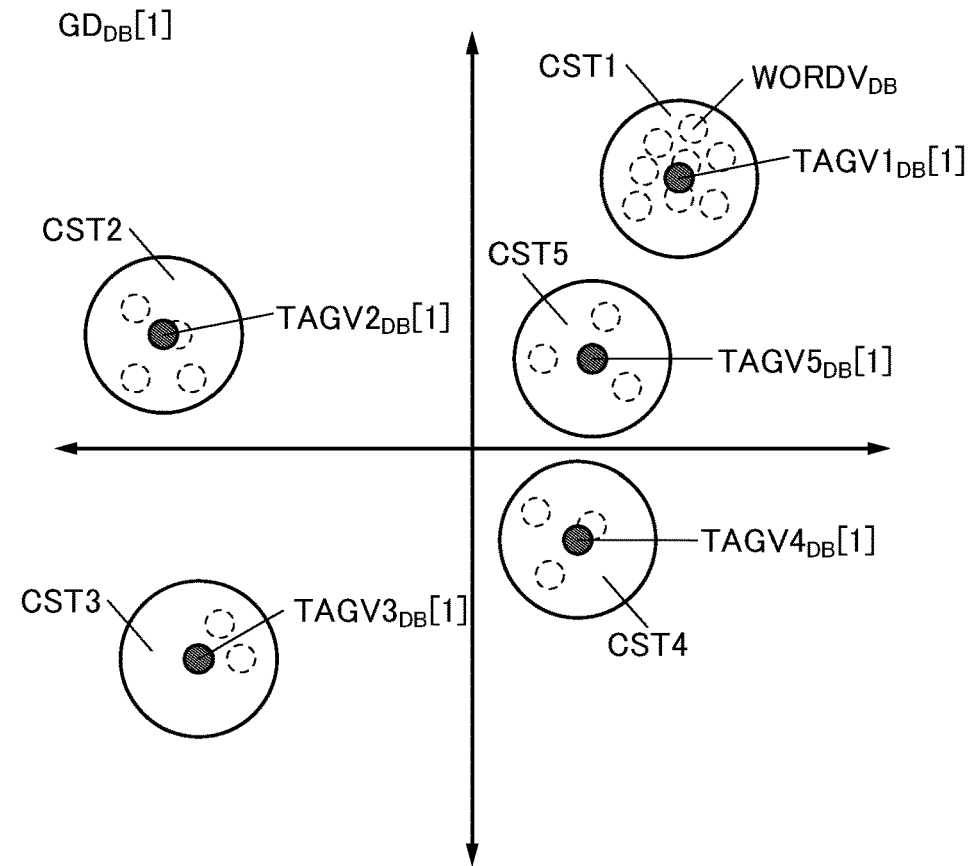

| Image data | Database tag vector $TAGV_{DB}$ | Component | Weight |
|---|---|---|---|
| $GD_{DB}[1]$ | $TAGV1_{DB}[1]$<br>$TAGV2_{DB}[1]$<br>$TAGV3_{DB}[1]$<br>$TAGV4_{DB}[1]$<br>$TAGV5_{DB}[1]$ | (0.42, 0.65)<br>(−0.83, 0.27)<br>(−0.77, −0.53)<br>(0.21, −0.17)<br>(0.25, 0.29) | 8/20<br>4/20<br>2/20<br>3/20<br>3/20 |
| $GD_{DB}[2]$ | $TAGV1_{DB}[2]$<br>$TAGV2_{DB}[2]$<br>$TAGV3_{DB}[2]$<br>$TAGV4_{DB}[2]$<br>$TAGV5_{DB}[2]$ | (0.88, −0.61)<br>(0.13, 0.27)<br>(−0.34, 0.81)<br>(−0.99, −0.11)<br>(0.18, 0.43) | 10/33<br>15/33<br>1/33<br>3/33<br>4/33 |
| ⋮ | ⋮ | ⋮ | ⋮ |
| $GD_{DB}[100]$ | $TAGV1_{DB}[100]$<br>$TAGV2_{DB}[100]$<br>$TAGV3_{DB}[100]$<br>$TAGV4_{DB}[100]$<br>$TAGV5_{DB}[100]$ | (0.98, −0.99)<br>(0.26, 0.55)<br>(−0.56, 0.43)<br>(−0.12, −0.01)<br>(−0.87, −0.78) | 10/78<br>5/78<br>30/78<br>25/78<br>8/78 |

| Image data | Similarity |
|---|---|
| $GD_{DB}[1]$ | 0.101 |
| $GD_{DB}[2]$ | 0.999 |
| $GD_{DB}[3]$ | 0.529 |
| ⋮ | ⋮ |
| $GD_{DB}[98]$ | 0.890 |
| $GD_{DB}[99]$ | 0.931 |
| $GD_{DB}[100]$ | 0.324 |

| Image data | Similarity | Database tag $TAG_{DB}$ |
|---|---|---|
| $GD_{DB}[2]$ | 0.999 | aaa, bbb, ccc, ddd, eee |
| $GD_{DB}[31]$ | 0.971 | aaa, ccc, fff, ggg, hhh |
| $GD_{DB}[73]$ | 0.964 | aaa, bbb, fff, iii, kkk |
| $GD_{DB}[52]$ | 0.951 | aaa, ccc, ggg, ppp, qqq |
| $GD_{DB}[28]$ | 0.937 | aaa, kkk, rrr, sss, ttt |

| Tag | Number of appearances | Rank of similarity of appearing image data |
|---|---|---|
| aaa | 5 | 1, 2, 3, 4, 5 |
| bbb | 2 | 1, 3 |
| ccc | 3 | 1, 2, 4 |
| ddd | 1 | 1 |
| eee | 1 | 1 |
| fff | 2 | 2, 3 |
| ggg | 2 | 2, 4 |
| hhh | 1 | 2 |
| iii | 1 | 3 |
| kkk | 2 | 3, 5 |
| ppp | 1 | 4 |
| qqq | 1 | 4 |
| rrr | 1 | 5 |
| sss | 1 | 5 |
| ttt | 1 | 5 |

$TAG_Q$: aaa, ccc, bbb, fff, ggg

S14

S14

| Query tag vector $TAGV_Q$ | Component | Weight |
|---|---|---|
| $TAGV1_Q$ | (0.45, 0.69) | 11/25 |
| $TAGV2_Q$ | (−0.88, 0.25) | 4/25 |
| $TAGV3_Q$ | (−0.73, −0.50) | 5/25 |
| $TAGV4_Q$ | (0.16, −0.22) | 2/25 |
| $TAGV5_Q$ | (0.21, 0.26) | 3/25 |

| Data | Similarity | Database tag $TAG_{DB}$ included |
|---|---|---|
| $D_{DB}[1]$ | 0.100 | a2a, b3b |
| $D_{DB}[2]$ | 0.999 | aaa, ccc |
| $D_{DB}[3]$ | 0.530 | a2a, c4c |
| ⋮ | ⋮ | ⋮ |
| $D_{DB}[98]$ | 0.891 | d5d, e6e |
| $D_{DB}[99]$ | 0.932 | c7c, f8f |
| $D_{DB}[100]$ | 0.326 | d5d, f8f |

| Data | Database image data corresponding to data on the left | Similarity | Database tag $TAG_{DB}$ linked to database image data on the left |
|---|---|---|---|
| $D_{DB}[2]$ | $GD_{DB}[2]$ | 0.999 | aaa, bbb, ccc, ddd, eee |
| $D_{DB}[41]$ | $GD_{DB}[41]$ | 0.971 | aaa, ccc, fff, ggg, hhh |
| $D_{DB}[53]$ | $GD_{DB}[53]$ | 0.964 | aaa, bbb, fff, iii, kkk |
| $D_{DB}[22]$ | $GD_{DB}[22]$ | 0.951 | aaa, ccc, ggg, ppp, qqq |
| $D_{DB}[88]$ | $GD_{DB}[88]$ | 0.937 | aaa, kkk, rrr, sss, ttt |

FIG. 16B
S25

| Tag | Number of appearances | Rank of similarity of appearing image data |
|---|---|---|
| aaa | 5 | 1, 2, 3, 4, 5 |
| bbb | 2 | 1, 3 |
| ccc | 3 | 1, 2, 4 |
| ddd | 1 | 1 |
| eee | 1 | 1 |
| fff | 2 | 2, 3 |
| ggg | 2 | 2, 4 |
| hhh | 1 | 2 |
| iii | 1 | 3 |
| kkk | 2 | 3, 5 |
| ppp | 1 | 4 |
| qqq | 1 | 4 |
| rrr | 1 | 5 |
| sss | 1 | 5 |
| ttt | 1 | 5 |

$TAG_Q$: Circuit diagram, semiconductor, aaa, bbb, ccc

FIG. 20A
S31
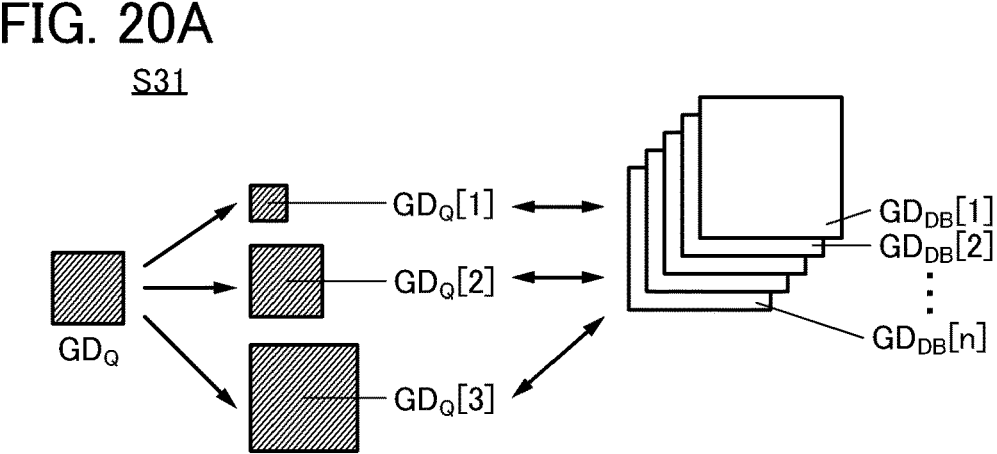
FIG. 20B1
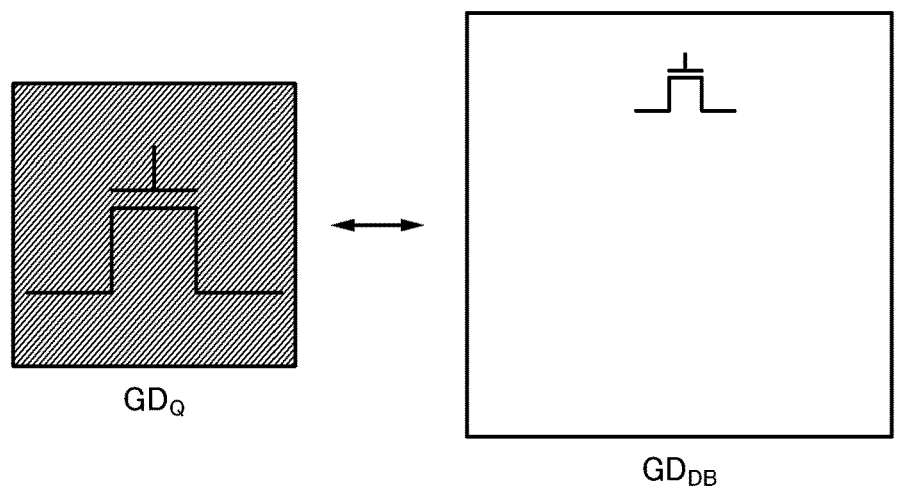
FIG. 20B2
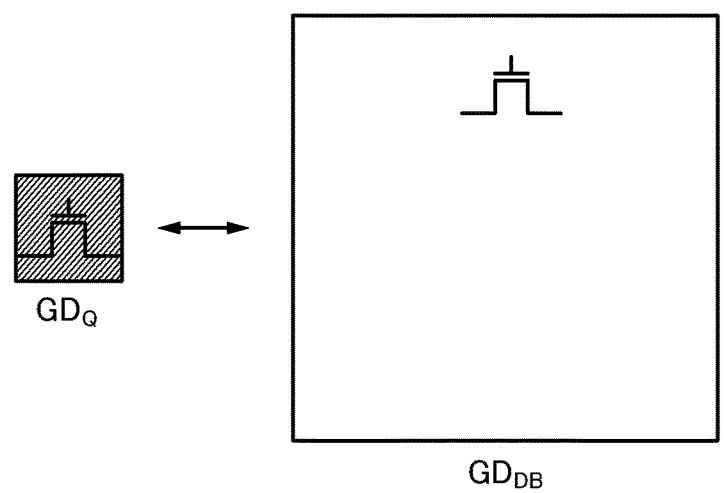

S32

S32

S41

FIG. 26
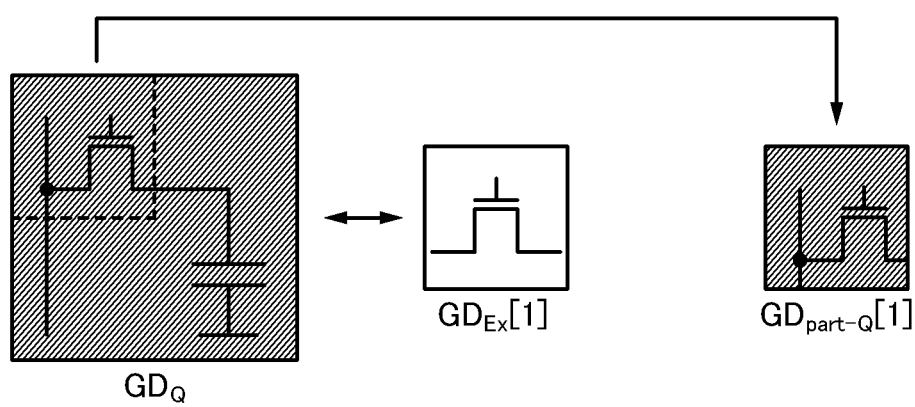
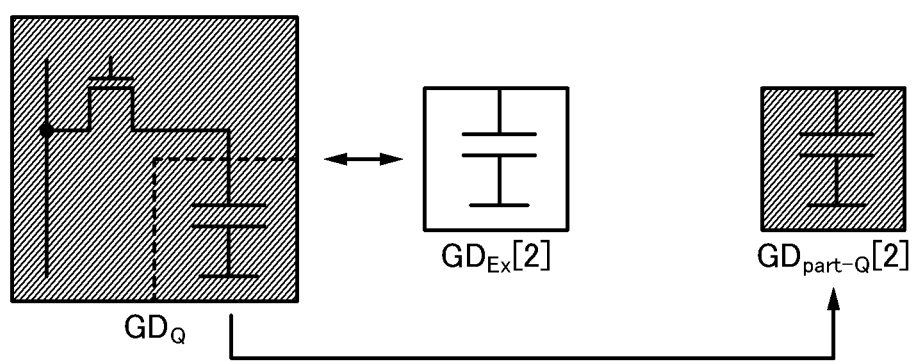

ND IMAGE
IMAGE RETRIEVAL SYSTEM AND IMAGE RETRIEVAL METHOD

CROSS REFERENCE TO RELATED APPLICATIONS

This application is a U.S. National Phase Application under 35 U.S.C. § 371 of International Application PCT/IB2020/052405, filed on Mar. 17, 2020, which is incorporated by reference and claims the benefit of a foreign priority application filed in Japan on Mar. 29, 2019, as Application No. 2019-065757.

TECHNICAL FIELD

One embodiment of the present invention relates to an image retrieval system and an image retrieval method.

Note that one embodiment of the present invention is not limited to the above technical field. Examples of the technical field of one embodiment of the present invention include a semiconductor device, a display device, a light-emitting device, a power storage device, a memory device, an electronic device, a lighting device, a method for driving any of them, and a method for manufacturing any of them.

BACKGROUND ART

Prior art search before application for an invention can reveal if there is a relevant intellectual property right. Prior art documents such as domestic or foreign patent documents and papers obtained through the prior art search are helpful in confirming the novelty and non-obviousness of the invention and determining whether to file the application. In addition, prior art document invalidity search can reveal whether there is a possibility of invalidation of the patent right owned by an applicant or whether the patent rights owned by others can be rendered invalidation.

The prior art search can be performed by, for example, retrieval of prior art documents disclosing a drawing similar to a drawing embodying technology before application. Specifically, a user inputs a drawing to an image retrieval system, for example, whereby prior art documents including a drawing similar to the input drawing can be retrieved.

An image similar to an input image can be retrieved using a neural network, for example. Patent Document 1 discloses a method for determining similarity between images using a neural network, for example.

REFERENCE

Patent Document

[Patent Document 1] Japanese Published Patent Application No. 2017-207947

SUMMARY OF THE INVENTION

Problems to be Solved by the Invention

Calculation of similarity between an input image and a retrieval target image using only image data may result in retrieval of an image with a different concept from the input image, for example. In that case, an image to be noise is mixed in retrieval results, and an image that is desired to be retrieved is not output in some cases. This may decrease the retrieval accuracy of similar images.

An object of one embodiment of the present invention is to provide an image retrieval system with high retrieval accuracy. Another object of one embodiment of the present invention is to provide an image retrieval system that can perform retrieval in a short time. Another object of one embodiment of the present invention is to provide an image retrieval system that can easily perform retrieval. Another object of one embodiment of the present invention is to provide a novel image retrieval system.

Another object of one embodiment of the present invention is to provide an image retrieval method with high retrieval accuracy. Another object of one embodiment of the present invention is to provide an image retrieval method that can perform retrieval in a short time. Another object of one embodiment of the present invention is to provide an image retrieval method that can easily perform retrieval. Another object of one embodiment of the present invention is to provide a novel image retrieval method.

Note that the description of these objects does not preclude the existence of other objects. One embodiment of the present invention does not need to achieve all the objects. Other objects can be derived from the description of the specification, the drawings, and the claims.

Means for Solving the Problems

One embodiment of the present invention is an image retrieval system including a database, a processing portion, and an input portion, in which the database has a function of storing document data and a plurality of pieces of database image data; the processing portion has a function of obtaining database image feature value data representing a feature value of the database image data for each of the plurality of pieces of database image data; the processing portion has functions of generating a plurality of database tags using the document data and linking the database tags to the database image data; the processing portion has a function of obtaining a database tag vector representing the database tag for each of the plurality of database tags; when query image data is input to the input portion, the processing portion has a function of obtaining query image feature value data representing a feature value of the query image data; the processing portion has a function of calculating first similarity that is similarity of the database image data to the query image data for each of the plurality of pieces of database image data; the processing portion has a function of obtaining a query tag linked to the query image data using some of the database tags on the basis of the first similarity; the processing portion has a function of obtaining a query tag vector representing the query tag; the processing portion has a function of obtaining first data including the database image feature value data and the database tag vector; the processing portion has a function of obtaining second data including the query image feature value data and the query tag vector; and the processing portion has a function of calculating second similarity that is similarity of the first data to the second data.

In the above embodiment, the database tag may include a term.

In the above embodiment, the processing portion may have a function of generating the database tag by conducting morphological analysis on the document data.

In the above embodiment, the processing portion may include a first neural network and a second neural network, the database image feature value data and the query image feature value data may be obtained using the first neural network, and the database tag vector and the query tag vector may be obtained using the second neural network.

In the above embodiment, the first neural network may include a convolutional layer and a pooling layer, and the database image feature value data and the query image feature value data may be output from the pooling layer.

In the above embodiment, the database tag vector and the query tag vector may each be a distributed representation vector.

In the above embodiment, the first similarity and the second similarity may each be cosine similarity.

Another embodiment of the present invention is an image retrieval method using an image retrieval system including an input portion and a database storing document data and a plurality of database images, including the steps of obtaining database image feature value data representing a feature value of database image data for each of a plurality of pieces of database image data; generating a plurality of database tags using the document data and linking the database tags to the database image data; obtaining a database tag vector representing the database tag for each of the plurality of database tags; inputting query image data to the input portion; obtaining query image feature value data representing a feature value of the query image data; calculating first similarity that is similarity of the database image data to the query image data for each of the plurality of pieces of database image data; obtaining a query tag linked to the query image data using some of the database tags on the basis of the first similarity; obtaining a query tag vector representing the query tag; obtaining first data including the database image feature value data and the database tag vector and second data including the query image feature value data and the query tag vector; and calculating second similarity that is similarity of the first data to the second data.

In the above embodiment, the database tag may include a term.

In the above embodiment, the database tag may be generated by morphological analysis conducted on the document data.

In the above embodiment, the database image feature value data and the query image feature value data may be obtained using a first neural network, and the database tag vector and the query tag vector may be obtained using a second neural network.

In the above embodiment, the first neural network may include a convolutional layer and a pooling layer, and the database image feature value data and the query image feature value data may be output from the pooling layer.

In the above embodiment, the database tag vector and the query tag vector may each be a distributed representation vector.

In the above embodiment, the first similarity and the second similarity may each be cosine similarity.

Effect of the Invention

According to one embodiment of the present invention, an image retrieval system with high retrieval accuracy can be provided. According to another embodiment of the present invention, an image retrieval system that can perform retrieval in a short time can be provided. According to another embodiment of the present invention, an image retrieval system that can easily perform retrieval can be provided. According to another embodiment of the present invention, a novel image retrieval system can be provided.

According to another embodiment of the present invention, an image retrieval method with high retrieval accuracy can be provided. According to another embodiment of the present invention, an image retrieval method that can perform retrieval in a short time can be provided. According to another embodiment of the present invention, an image retrieval method that can easily perform retrieval can be provided. According to another embodiment of the present invention, a novel image retrieval method can be provided.

Note that the description of these effects does not preclude the existence of other effects. One embodiment of the present invention does not need to have all these effects. Other effects can be derived from the description of the specification, the drawings, and the claims.

BRIEF DESCRIPTION OF THE DRAWINGS

FIG. 8A and FIG. 8B are diagrams showing an example of a method for generating retrieval data.

FIG. 11A and FIG. 11B are diagrams showing an example of an image retrieval method.

FIG. 16A and FIG. 16B are diagrams showing an example of an image retrieval method.

FIG. 20A, FIG. 20B1, and FIG. 20B2 are diagrams illustrating an example of an image retrieval method.

FIG. 26 is a diagram illustrating an example of an image retrieval method.

MODE FOR CARRYING OUT THE INVENTION

Figure 1:
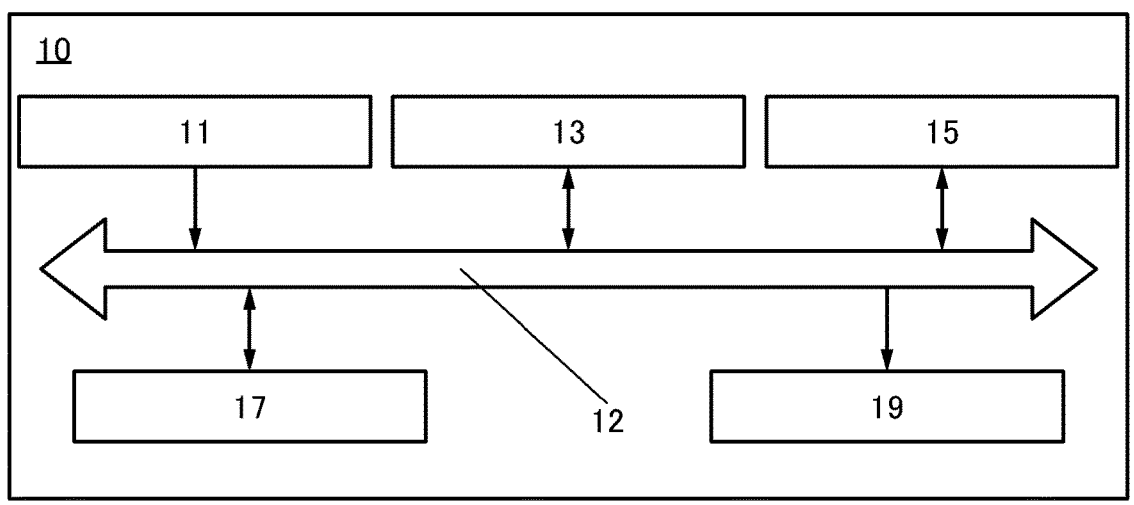
FIG. 1 is a block diagram illustrating a structure example of an image retrieval system.

Embodiments will be described in detail with reference to the drawings. Note that the present invention is not limited to the following description, and it will be readily appreciated by those skilled in the art that modes and details of the present invention can be modified in various ways without departing from the spirit and scope of the present invention. Thus, the present invention should not be construed as being limited to the description in the following embodiments.

Embodiment 1

In this embodiment, an image retrieval system and an image retrieval method of one embodiment of the present invention will be described.

The image retrieval system of one embodiment of the present invention includes an input portion, a database, and a processing portion. The processing portion includes a first neural network and a second neural network. In the first and second neural networks, layers including neurons are provided.

In this specification and the like, a neural network refers to a general model that is modeled on a biological neural network, determines the connection strength of neurons by learning, and has the capability of solving problems.

In the description of the neural network in this specification and the like, to determine a connection strength of neurons (also referred to as weight coefficient) from the existing information is referred to as "leaning".

In this specification and the like, to draw a new conclusion from the neural network formed using the connection strength obtained by the learning is referred to as "inference".

Image data is stored in the database. When a user of the image retrieval system of one embodiment of the present invention inputs image data to the input portion, the image retrieval system of one embodiment of the present invention retrieves and outputs, from the database, image data similar to the input image data.

In this specification and the like, image data stored in a database is referred to as database image data. In addition, image data input to an input portion is referred to as query image data. Moreover, database image data and query image data are collectively and simply referred to as image data in some cases.

An image retrieval method using the image retrieval system of one embodiment of the present invention will be described below.

Image data is input to the first neural network included in the processing portion, whereby image feature value data can be obtained.

In this specification and the like, data representing a feature value of image data is referred to as image feature value data. For example, data representing a feature value of database image data is referred to as database image feature value data, and data representing a feature value of query image data is referred to as query image feature value data.

A convolutional neural network including a convolutional layer and a pooling layer can be used as the first neural network, for example. In the case where a convolutional neural network is used as the first neural network, data output from a pooling layer when image data is input to the first neural network can be regarded as image feature value data.

A tag is linked to database image data. For example, document data linked to database image data has been stored in a database and morphological analysis is conducted on the document data, so that a tag can be linked. The tag can be a keyword representing a concept, technological contents, remarkable points, and the like of an image corresponding to the database image data. For example, one tag can represent one term. A plurality of tags can be linked to the database image data.

In this specification and the like, a tag linked to database image data is referred to as a database tag. In addition, a tag linked to query image data is referred to as a query tag.

A tag is input to the second neural network included in the processing portion, whereby the tag can be represented by a vector. For example, the tag can be represented by a 300-dimensional distributed representation vector.

In this specification and the like, a vector representing a tag is referred to as a tag vector. For example, a vector representing a database tag is referred to as a database tag vector, and a vector representing a query tag is referred to as a query tag vector. One tag vector represents a tag vector corresponding to one tag.

The term "vector" in this specification and the like represents a set of a plurality of values. In addition, the number of values constituting one vector is referred to as the number of dimensions. For example, a vector represented by (5, 1, 4, 3, 2) can be regarded as a 5-dimensional vector. Note that values constituting a vector are sometimes referred to as components.

In the image retrieval method using the image retrieval system of one embodiment of the present invention, database image data and database image feature value data representing a feature value of the database image are stored in the database in advance. A database tag linked to the database image data and a database tag vector representing the database tag are also stored in the database in advance. Note that the database tag itself is not necessarily stored in the database.

In the image retrieval method using the image retrieval system of one embodiment of the present invention, a user of the image retrieval system inputs query image data to the input portion, so that the query image data is input to the first neural network, and query image feature value data is generated. Next, with the use of the database image feature value data and the query image feature value data, similarity of the database image data to the query image data is calculated. For example, cosine similarity is calculated. Similarity to the query image data can be calculated for all the database image data, for example.

After that, on the basis of the similarity calculation results, a query tag is obtained using a database tag. For example, a database tag with a high appearance frequency among database tags linked to the database image data with high similarity can be used as the query tag. Note that the number of query tags can be equal to the number of database tags linked to one piece of database image data, for example.

In this specification and the like, one piece of image data refers to image data representing one image displayed in one frame period, for example.

Next, first data including the database image feature value data and the database tag vector is obtained. In addition, second data including the query image feature value data and the query tag vector is obtained. After that, similarity between the first data and the second data is calculated, and similarity of the database image data to the query image data is corrected. For example, the cosine similarity between the first data and the second data is calculated to perform the correction.

Here, one piece of the first data can include, for example, one piece of the database image feature value data and the database tag vectors corresponding to the database tags linked to the database image data corresponding to the database image feature value data. That is, the number of pieces of the first data can be equal to the number of pieces of the database image feature value data. Moreover, one piece of the second data can include the query image feature value data and the query tag vectors; the number of query tag vectors is equal to that of database tag vectors included in one piece of the first data.

Next, ranking data including information about ranks of similarity after the above-described correction is generated and is output as retrieval results to the outside of the image retrieval system of one embodiment of the present invention. The correction of the similarity of the database image data to the query image data in the above manner can inhibit retrieval of a database image that has a similar feature value to a query image but has a different concept from the query image, for example. This can inhibit a phenomenon in which an image to be noise is mixed in the retrieval results and an image that is desired to be retrieved is not output. Thus, the image retrieval system of one embodiment of the present invention can perform retrieval with high accuracy.

In the image retrieval method using the image retrieval system of one embodiment of the present invention, a query tag is obtained using a database tag. This method for obtaining a tag is a simple method as compared with a method for obtaining a query tag on the basis of query image feature value data, for example. Thus, the image retrieval system of one embodiment of the present invention can perform retrieval in a short time. The method for obtaining a query tag using a database tag enables tags representing a concept, technological contents, remarkable points, and the like of an image corresponding to query image data to be obtained inclusively as compared with a method in which a user of the image retrieval system of one embodiment of the present invention specifies all of query tags, for example. Thus, the image retrieval system of one embodiment of the present invention can perform retrieval easily with high accuracy.

<1-1. Image Retrieval System>

FIG. 1 is a block diagram illustrating a structure example of an image retrieval system 10. Note that in the drawings attached to this specification, the block diagram in which components are classified according to their functions and shown as independent blocks is illustrated; however, it is difficult to separate actual components completely according to their functions, and it is possible for one component to relate to a plurality of functions. Moreover, one function can relate to a plurality of components; for example, a plurality of processings conducted in a processing portion 13 can be executed on servers different from each other.

The image retrieval system 10 includes at least the processing portion 13. The image retrieval system 10 illustrated in FIG. 1 further includes an input portion 11, a transmission path 12, a memory portion 15, a database 17, and an output portion 19.

[Input Portion 11]

To the input portion 11, image data or the like is supplied from the outside of the image retrieval system 10. The image data or the like supplied to the input portion 11 is supplied to the processing portion 13, the memory portion 15, or the database 17 through the transmission path 12. As described above, the image data input to the input portion 11 is referred to as query image data.

[Transmission Path 12]

The transmission path 12 has a function of transmitting the image data or the like. Transmission and reception of information between the input portion 11, the processing portion 13, the memory portion 15, the database 17, and the output portion 19 can be performed through the transmission path 12.

[Processing Portion 13]

The processing portion 13 has a function of performing arithmetic operation, inference, or the like with use of the image data or the like supplied from the input portion 11, the memory portion 15, the database 17, or the like. The processing portion 13 includes a neural network and can perform arithmetic operation, inference, or the like using the neural network. The processing portion 13 can also perform arithmetic operation or the like without using the neural network. The processing portion 13 can supply an arithmetic operation result, an inference result, or the like to the memory portion 15, the database 17, the output portion 19, or the like.

A transistor including a metal oxide in a channel formation region is preferably used in the processing portion 13. The transistor has an extremely low off-state current; therefore, with the use of the transistor as a switch for retaining charge (data) which flows into a capacitor functioning as a memory element, a long data retention period can be ensured. When the transistor is used for at least one of a register and a cache memory included in the processing portion 13, the processing portion 13 can be operated only when needed, and otherwise can be off while information processed immediately before turning off the processing portion 13 is stored in the memory element. Accordingly, normally-off computing is possible and the power consumption of the image retrieval system can be reduced.

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is used in a semiconductor layer of a transistor, the metal oxide is referred to as an oxide semiconductor in some cases. That is, a metal oxide that has at least one of an amplifying function, a rectifying function, and a switching function can be referred to as a metal oxide semiconductor, or OS for short.

In this specification and the like, a transistor using an oxide semiconductor or a metal oxide in its channel formation region is referred to as an oxide semiconductor transistor or an OS transistor.

The metal oxide in the channel formation region preferably contains indium (In). The metal oxide in the channel formation region that contains indium increases the carrier mobility (electron mobility) of the OS transistor. The metal oxide in the channel formation region is preferably an oxide semiconductor containing an element M. The element M is preferably aluminum (Al), gallium (Ga), tin (Sn), or the like. Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that a plurality of the above elements may be used in combination as the element Min some cases. The element M is an element having high bonding energy with oxygen, for example. The element M is an element whose bonding energy with oxygen is higher than that of indium, for example. The metal oxide included in the channel formation region is preferably a metal oxide containing zinc (Zn). The metal oxide containing zinc is easily crystallized in some cases.

The metal oxide in the channel formation region is not limited to a metal oxide containing indium. The semiconductor layer may be, for example, a metal oxide that does not contain indium but contains at least one of zinc, gallium, and tin, e.g., zinc tin oxide or gallium tin oxide.

The processing portion 13 includes, for example, an operation circuit, a central processing unit (CPU), or the like.

The processing portion 13 may include a microprocessor such as a DSP (Digital Signal Processor) or a GPU (Graphics Processing Unit). The microprocessor may be constructed with a PLD (Programmable Logic Device) such as an FPGA (Field Programmable Gate Array) or an FPAA (Field Programmable Analog Array). The processing portion 13 can interpret and execute instructions from programs with the use of a processor to process various kinds of data and control programs. The programs to be executed by the processor are stored in at least one of a memory region of the processor or the memory portion 15.

The processing portion 13 may include a main memory. The main memory includes at least one of a volatile memory such as a RAM (Random Access Memory) and a nonvolatile memory such as a ROM (Read Only Memory).

For example, a DRAM (Dynamic Random Access Memory), an SRAM (Static Random Access Memory), or the like is used as the RAM, in which case a virtual memory space is assigned to the RAM to be used as a work space for the processing portion 13. An operating system, an application program, a program module, program data, a look-up table, and the like which are stored in the memory portion 15 are loaded into the RAM and executed. The data, program, and program module which are loaded into the RAM are each directly accessed and operated by the processing portion 13.

In the ROM, a BIOS (Basic Input/Output System), firmware, and the like for which rewriting is not needed can be stored. Examples of the ROM include a mask ROM, an OTPROM (One Time Programmable Read Only Memory), and an EPROM (Erasable Programmable Read Only Memory). Examples of the EPROM include a UV-EPROM (Ultra-Violet Erasable Programmable Read Only Memory) which can erase stored data by ultraviolet irradiation, an EEPROM (Electrically Erasable Programmable Read Only Memory), and a flash memory.

[Memory Portion 15]

The memory portion 15 has a function of storing a program to be executed by the processing portion 13. The memory portion 15 may have a function of storing an arithmetic result and an inference result generated by the processing portion 13, the image data or the like input to the input portion 11, and the like.

The memory portion 15 includes at least one of a volatile memory and a nonvolatile memory. For example, the memory portion 15 may include a volatile memory such as a DRAM or an SRAM. For example, the memory portion 15 may include a nonvolatile memory such as an ReRAM (Resistive Random Access Memory, also referred to as a resistance-change memory), a PRAM (Phase change Random Access Memory), an FeRAM (Ferroelectric Random Access Memory), an MRAM (Magnetoresistive Random Access Memory, also referred to as a magneto-resistive memory), or a flash memory. The memory portion 15 may include storage media drives such as a hard disk drive (HDD) and a solid state drive (SSD).

[Database 17]

The database 17 has a function of storing retrieval target image data. As described above, image data stored in the database is referred to as database image data. The database 17 also has a function of storing the arithmetic results and the inference results generated by the processing portion 13. Furthermore, the database 17 may have a function of storing the image data or the like input to the input portion 11. Note that the memory portion 15 and the database 17 are not necessarily separated from each other. For example, the image retrieval system 10 may include a memory unit that has both the functions of the memory portion 15 and the database 17.

[Output Portion 19]

The output portion 19 has a function of supplying information to the outside of the image retrieval system 10. For example, an arithmetic result, an inference result, or the like in the processing portion 13 can be supplied to the outside.

<1-2. Image Retrieval Method 1>

Figure 2:
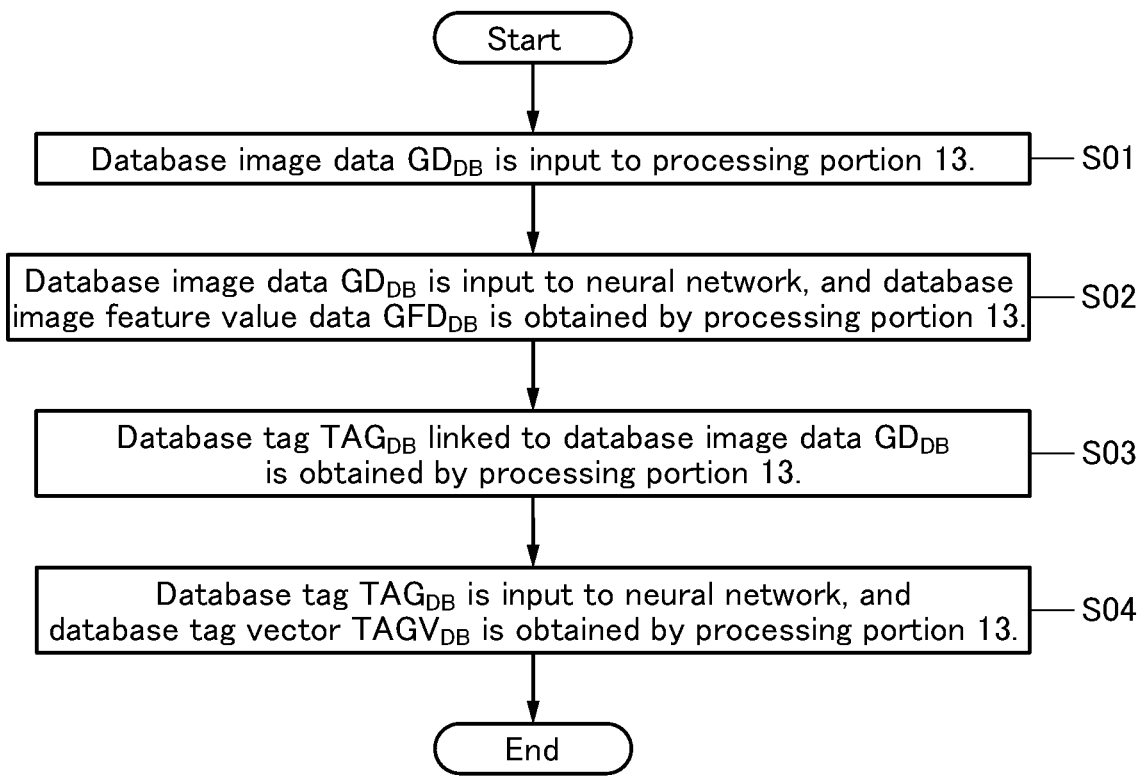
FIG. 2 is a flow chart showing an example of a method for generating retrieval data.

First, processing conducted in advance for retrieval using the image retrieval system 10 will be described. FIG. 2 is a flow chart showing an example of a processing method.

[Step S01]

First, database image data $GD_{DB}$ is input to the processing portion 13 from the database 17 through the transmission path 12. As the database image data $GD_{DB}$, data representing a drawing included in intellectual property information can be used. Here, examples of the intellectual property information include publications such as a patent document (a published application publication, a patent publication, and the like), a utility model publication, a design publication, and a paper. Not only publications issued domestically but also publications issued in foreign countries can be used as the intellectual property information.

The intellectual property information is not limited to publications. For example, a variety of files such as an image file independently possessed by a user or a user group of the image retrieval system can also be used as the database image data $GD_{DB}$. A drawing and the like illustrating an invention, a device, or a design can also be given as the intellectual property information.

The database image data $GD_{DB}$ can include, for example, data representing a drawing described in a patent document of a specific applicant or data representing a drawing described in a patent document of a specific technical field.

The image retrieval system 10 has a function of retrieving the database image data $GD_{DB}$ similar to query image data. Accordingly, with the use of the image retrieval system 10, a patent document, a paper, or an industrial product that is similar to an invention before application can be retrieved, for example. Thus, prior art relating to the invention before application can be retrieved. Knowing and reviewing relevant prior art strengthens the invention, leading to a strong patent that other companies are highly likely to infringe.

For example, a patent document, a paper, or an industrial product that is similar to an industrial product before sale can be retrieved by the image retrieval system 10. When the database image data $GD_{DB}$ includes data corresponding to images described in one's own patent documents, whether patent applications are appropriately filed in association with technologies for the one's own industrial product before sale can be confirmed. Alternatively, when the database image data $GD_{DB}$ includes data corresponding to images described in others' patent documents, whether or not the one's own industrial product before sale infringes the others' intellectual property right can be confirmed. Knowing and reviewing relevant prior art leads to discovery of a novel invention that is to be a strong patent contributing to one's own business. Note that retrieval of an industrial product after sale as well as retrieval of an industrial product before sale may be conducted.

For example, a patent document, a paper, or an industrial product that is similar to a specific patent can be retrieved by the image retrieval system 10. In particular, retrieval based on the filing date of the patent can reveal easily and accurately whether or not the patent includes grounds for invalidation.

[Step S02]

Next, the database image data $GD_{DB}$ is input to the neural network included in the processing portion 13.

Figure 3A:
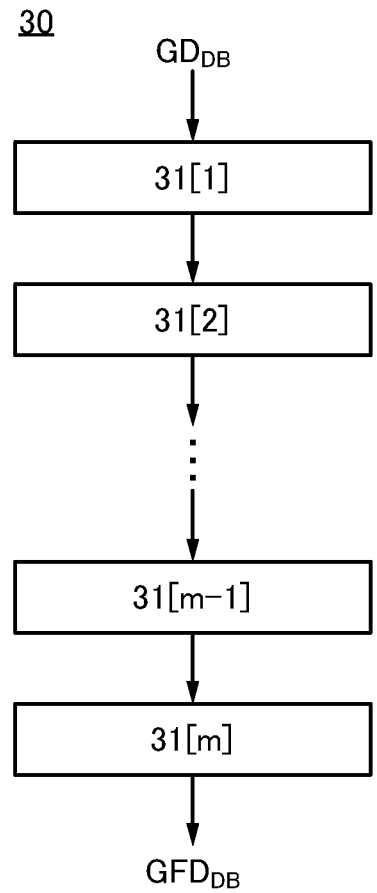
FIG. 3A and FIG. 3B are diagrams showing structure examples of neural networks.

FIG. 3A is a diagram showing a structure example of a neural network 30, which is the neural network included in the processing portion 13. The neural network 30 includes a layer 31[1] to a layer 31[m] (m is an integer greater than or equal to 1).

The layer 31[1] to the layer 31[m] include neurons and the neurons provided in the layers are connected to each other. For example, the neuron provided in the layer 31[1] is connected to the neuron provided in the layer 31[2]. The neuron provided in the layer 31[2] is connected to the neuron provided in the layer 31[1] and the neuron provided in the layer 31[3]. That is, the layer 31[1] to the layer 31[m] form a hierarchical neural network.

The database image data $GD_{DB}$ is input to the layer 31[1], and the layer 31[1] outputs data corresponding to the input image data. The data is input to the layer 31[2], and the layer 31[2] outputs data corresponding to the input data. Data output from the layer 31[m−1] is input to the layer 31[m], and the layer 31[m] outputs data corresponding to the input data. In this manner, the layer 31[1] can be the input layer, the layer 31[2] to the layer 31[m−1] can be the intermediate layers, and the layer 31[m] can be the output layer.

The neural network 30 has learned in advance such that, for example, the data output from the layer 31[1] to the layer 31[m] represents the feature value of the image data input to the neural network 30. Learning can be performed by unsupervised leaning, supervised learning, or the like. Unsupervised learning does not require teacher data (also referred to as a correct label) and thus is particularly preferred. When learning is performed by either unsupervised leaning or supervised learning, a backpropagation method or the like can be used as a learning algorithm.

Here, the database image data $GD_{DB}$ is preferably used as learning data. This enables, for example, the data output from the layer 31[1] to the layer 31[m] to accurately represent the feature value of the image data input to the neural network 30. For example, all the pieces of the database image data $GD_{DB}$ stored in the database 17 are used as the learning data so that the neural network 30 can perform learning. For example, some pieces of the database image data $GD_{DB}$ are used as the learning data so that the neural network 30 can perform learning. In addition to the database image data $GD_{DB}$, for example, the image data stored in the memory portion 15 and the image data input from the outside of the image retrieval system 10 to the processing portion 13 through the input portion 11 are used as the learning data so that the neural network 30 can perform learning.

Note that the use of the database image data $GD_{DB}$ as the learning data is not necessary. For example, only the image data input from the outside of the image retrieval system 10 to the processing portion 13 through the input portion 11 is used as the learning data so that the neural network 30 can perform learning.

Figure 3B:
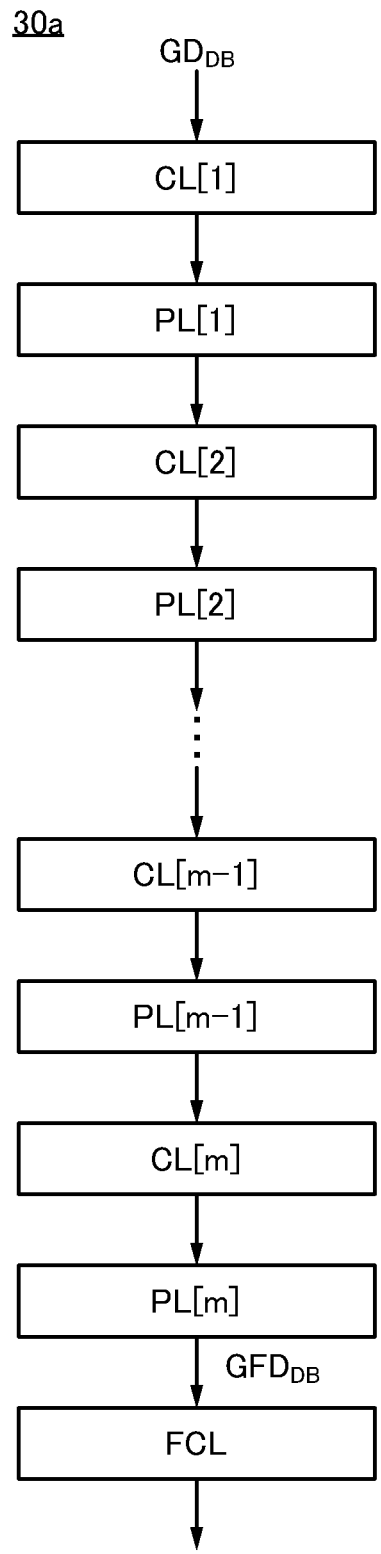

The neural network 30 can be a convolutional neural network (CNN). FIG. 3B is a diagram showing a structure example of the neural network 30 in the case where a CNN is used as the neural network 30. Here, the neural network 30 using a CNN is referred to as a neural network 30a.

The neural network 30a includes a convolutional layer CL, a pooling layer PL, and a fully connected layer FCL. FIG. 3B shows an example in which the neural network 30a includes m convolutional layers CL, m pooling layers PL (m is an integer greater than or equal to 1), and one fully connected layer FCL. Note that the neural network 30a may include two or more fully connected layers FCL.

The convolutional layer CL has a function of performing convolution on data input to the convolutional layer CL. A convolutional layer CL[1] has a function of performing convolution on image data input to the processing portion 13, for example. A convolutional layer CL[2] has a function of performing convolution on data output from a pooling layer PL[1]. A convolutional layer CL[m] has a function of performing convolution on data output from a pooling layer PL[m−1].

Convolution is performed by repetition of product-sum operation of the data input to the convolutional layer CL and a weight filter. By the convolution in the convolutional layer CL, a feature or the like of an image corresponding to the image data input to the neural network 30a is extracted.

The data subjected to the convolution is converted using an activation function, and then output to the pooling layer PL. As the activation function, ReLU (Rectified Linear Units) or the like can be used. ReLU is a function that outputs "0" when an input value is negative and outputs the input value as it is when the input value is greater than or equal to "0". As the activation function, a sigmoid function, a tan h function, or the like can be used as well.

The pooling layer PL has a function of performing pooling on the data input from the convolutional layer CL. Pooling is processing in which the data is partitioned into a plurality of regions, and predetermined data is extracted from each of the regions and arranged in a matrix. By the pooling, the size of the data can be reduced while the features extracted by the convolutional layer CL remain. Robustness for a minute difference of the input data can be increased. Note that as the pooling, max pooling, average pooling, Lp pooling, or the like can be used.

The fully connected layer FCL has a function of determining an image using the data output from the pooling layer PL[m]. The fully connected layer FCL has a structure in which all the nodes in one layer are connected to all the nodes in the next layer. The data output from the convolutional layer CL or the pooling layer PL is a two-dimensional feature map and is unfolded into a one-dimensional feature map when input to the fully connected layer FCL. Then, a vector obtained as a result of the inference by the fully connected layer FCL is output from the fully connected layer FCL.

Note that the structure of the neural network 30a is not limited to the structure in FIG. 3B. For example, the pooling layer PL may be provided for a plurality of convolutional layers CL. In other words, the number of pooling layers PL included in the neural network 30a may be smaller than the number of convolutional layers CL. In the case where the positional information of the extracted feature is desired to be left as much as possible, the pooling layer PL may be omitted.

Owing to the learning in the neural network 30a, the filter value of the weight filter, the weight coefficient of the fully connected layer FCL, or the like can be optimized.

Figure 4:
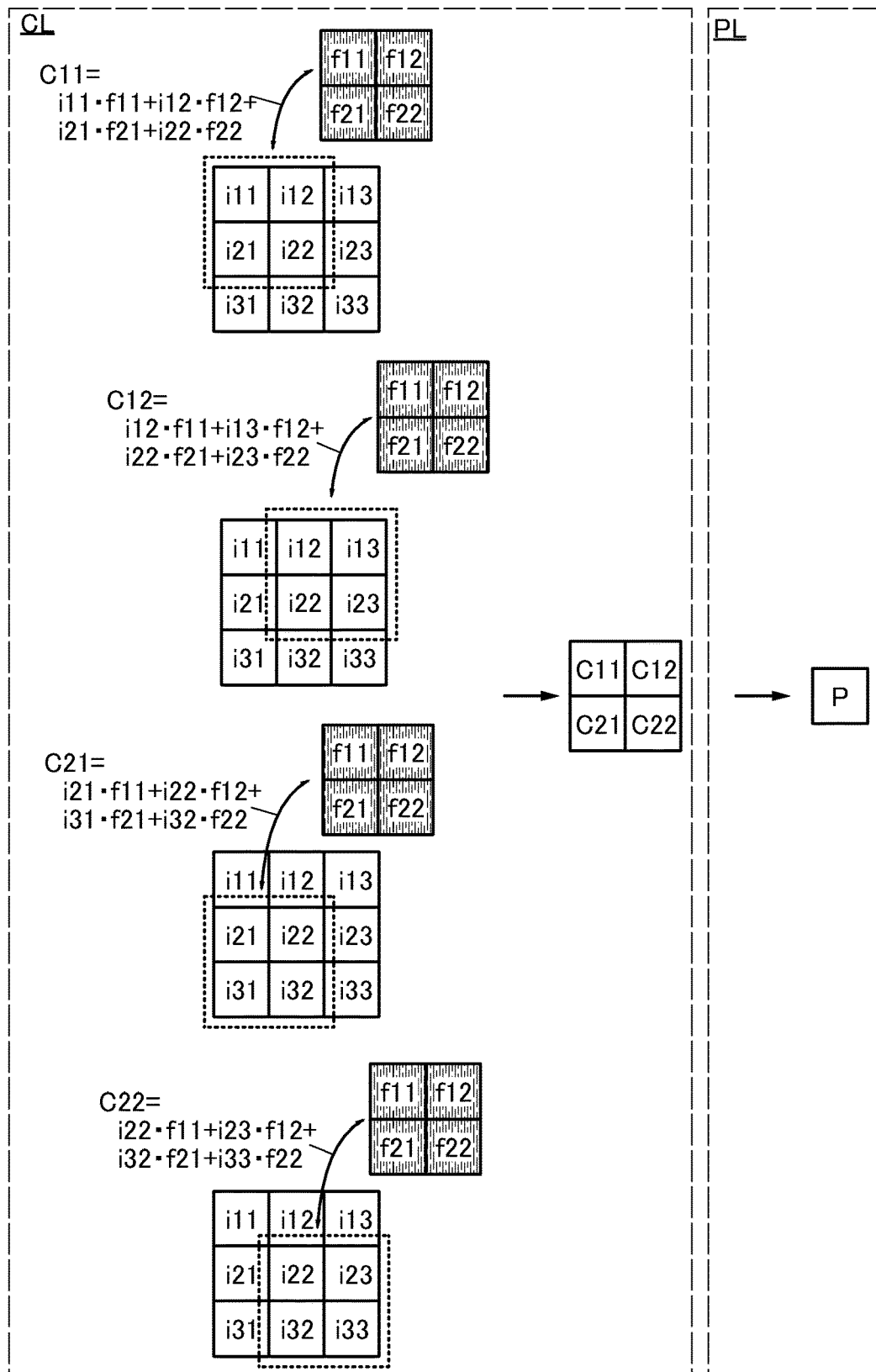
FIG. 4 is a diagram illustrating an example of convolution processing and pooling processing.

Next, an example of convolution processing performed in the convolutional layer CL and pooling processing performed in the pooling layer PL is described with reference to FIG. 4. In FIG. 4, data input to the convolutional layer CL includes input data values in three rows and three columns (an input data value i11, an input data value i12, an input data value i13, an input data value i21, an input data value i22, an input data value i23, an input data value i31, an input data value i32, and an input data value i33). The weight filter includes filter values in two rows and two columns (a filter value f11, a filter value f12, a filter value f21, and a filter value f22).

Here, for example, the data input to the convolutional layer CL[1] can be image data. In that case, the above input data values can be pixel values included in the image data.

In this specification and the like, a pixel value refers to a value representing a gray level of the luminance of light emitted from a pixel. For example, in the case where a pixel value is an 8-bit value, a pixel can emit light with a luminance of 256 gray levels. Image data can be regarded as including a set of pixel values and the number of pixel values can be equal to that of pixels, for example. In the case where the number of pixels of an image is 2×2, image data representing the image can be regarded as including 2×2 pixel values, for example.

For example, the above input data value input to the convolutional layer CL[2] can be an output value of a pooling layer PC[1], and the above input data value input to the convolutional layer CL[m] can be an output value of a pooling layer PC[m−1].

The convolution is performed by product-sum operation of the input data value and the filter value. The filter value can be data representing a prescribed feature (referred to as feature data). In that case, by comparison between the input data value and the filter value, feature extraction can be performed on the image data input to the neural network 30a.

FIG. 4 illustrates a state where the convolutional layer CL performs filter processing on the input data value i11, the input data value i12, the input data value i21, and the input data value i22 to acquire a convolution value C11 included in data output from the convolutional layer CL. FIG. 4 also illustrates a state where the convolutional layer CL performs filter processing on the input data value i12, the input data value i13, the input data value i22, and the input data value i23 to acquire a convolution value C12 included in the data output from the convolutional layer CL. FIG. 4 also illustrates a state where the convolutional layer CL performs filter processing on the input data value i21, the input data value i22, the input data value i31, and the input data value i32 to acquire a convolution value C21 included in the data output from the convolutional layer CL. FIG. 4 further illustrates a state where the convolutional layer CL performs filter processing on the input data value i22, the input data value i23, the input data value i32, and the input data value i33 to acquire a convolution value C22 included in the data output from the convolutional layer CL. The above indicates that a stride of the convolution processing illustrated in FIG. 4 is one.

The convolution value C11, the convolution value C12, the convolution value C21, and the convolution value C22 can be acquired by the product-sum operation shown below.

(Formula 1)

$$C11 = i11 \cdot f11 + i12 \cdot f2 + i21 \cdot f21 + i22 \cdot f22 \quad (1)$$

(Formula 2)

$$C12 = i12 \cdot f11 + i13 \cdot f2 + i22 \cdot f21 + i23 \cdot f22 \quad (2)$$

(Formula 3)

$$C21 = i21 \cdot f11 + i22 \cdot f12 + i31 \cdot f21 + i32 \cdot f22 \quad (3)$$

(Formula 4)

$$C22 = i22 \cdot f11 + i23 \cdot f12 + i32 \cdot f21 + i33 \cdot f22 \quad (4)$$

The convolution value C11, the convolution value C12, the convolution value C21, and the convolution value C22 acquired by the convolutional layer CL are arranged in a matrix according to an address and then output to the pooling layer PL. Specifically, the convolution value C11 is placed in a first row and a first column, the convolution value C12 is placed in the first row and a second column, the convolution value C21 is placed in a second row and the first column, and the convolution value C22 is placed in the second row and the second column.

FIG. 4 illustrates a state where the convolution value C11, the convolution value C12, the convolution value C21, and the convolution value C22 are input to the pooling layer PL and one value is set to a pooling value P on the basis of the four convolution values. For example, the highest value among the convolution value C11, the convolution value C12, the convolution value C21, and the convolution value C22 can be set to the pooling value P. Alternatively, an average value of the convolution value C11, the convolution value C12, the convolution value C21, and the convolution value C22 can be set to the pooling value P. The pooling value P is an output value output from the pooling layer PL.

Although FIG. 4 illustrates an example in which the data input to the convolutional layer CL is processed by one weight filter, the processing may be performed by two or more weight filters. In that case, a plurality of features included in the image data input to the neural network 30a can be extracted. In the case where the data input to the convolutional layer CL is processed by two or more weight filters, the processing illustrated in FIG. 4 is performed for each filter. Although the stride is one in FIG. 4 as described above, the stride may be two or more.

Figure 5:
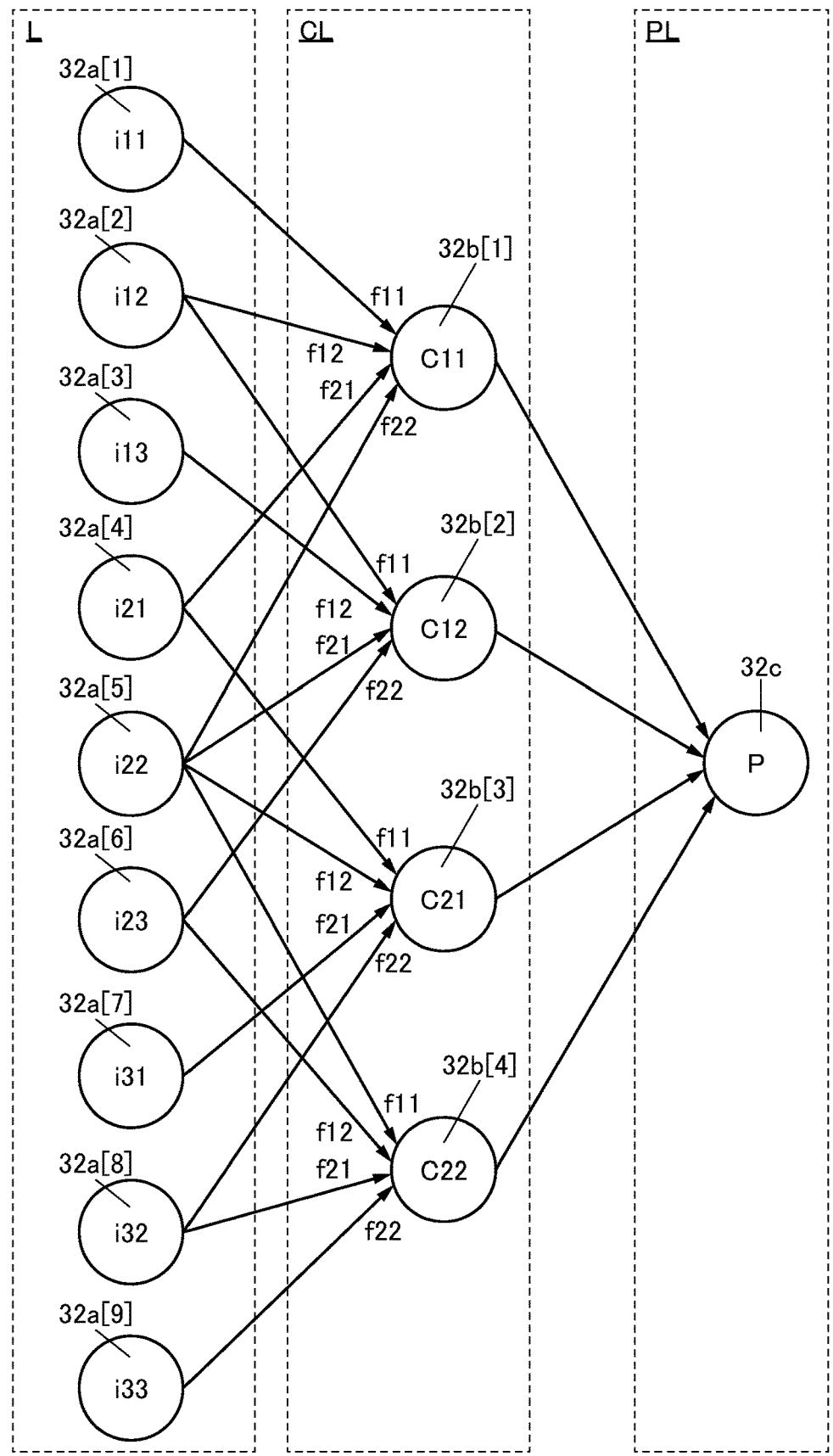
FIG. 5 is a diagram illustrating a structure example of a neural network.

FIG. 5 is a diagram illustrating a structure example of the convolutional layer CL and the pooling layer PL included in the neural network 30a. FIG. 5 illustrates an example in which the convolutional layer CL and the pooling layer PL perform the operation illustrated in FIG. 4.

FIG. 5 illustrates neurons 32. Specifically, neurons 32a, neurons 32b, and a neuron 32c are illustrated as the neurons 32. In FIG. 5, a value output from each of the neurons 32 is shown inside the corresponding neuron 32. The value is output in the direction of an arrow. In the case where the value is multiplied by a weight coefficient, the weight coefficient is described near the arrow. In FIG. 5, the filter value f11, the filter value f12, the filter value f21, and the filter value f22 are weight coefficients.

The neurons 32a are the neurons 32 included in a layer L which is a layer prior to the convolutional layer CL illustrated in FIG. 5. For example, the layer L can be an input layer when the convolutional layer CL illustrated in FIG. 5 is the convolutional layer CL[1], the layer L can be the pooling layer PL[1] when the convolutional layer CL is the convolutional layer CL[2], and the layer L can be the pooling layer PL[m−1] when the convolutional layer CL is the convolutional layer CL[m].

FIG. 5 illustrates a neuron 32a[1] to a neuron 32a[9] as the neurons 32a. In the case of FIG. 5, the neuron 32a[1] outputs the input data value i11, the neuron 32a[2] outputs the input data value i12, the neuron 32a[3] outputs the input data value i13, the neuron 32a[4] outputs the input data value i21, the neuron 32a[5] outputs the input data value i22, the neuron 32a[6] outputs the input data value i23, the neuron 32a[7] outputs the input data value i31, the neuron 32a[8] outputs the input data value i32, and the neuron 32a[9] outputs the input data value i33.

The neurons 32b are the neurons 32 included in the convolutional layer CL illustrated in FIG. 5. FIG. 5 illustrates a neuron 32b[1] to a neuron 32b[4] as the neurons 32b.

In the case of FIG. 5, a value obtained by multiplying the input data value i11 by the filter value f11, a value obtained by multiplying the input data value i12 by the filter value f12, a value obtained by multiplying the input data value i21 by the filter value f21, and a value obtained by multiplying the input data value i22 by the filter value f22 are input to the neuron 32b[1]. Then, the convolution value C11 which is the sum of these values is output from the neuron 32b[1].

A value obtained by multiplying the input data value i12 by the filter value f11, a value obtained by multiplying the input data value i13 by the filter value f12, a value obtained by multiplying the input data value i22 by the filter value f21, and a value obtained by multiplying the input data value i23 by the filter value f22 are input to the neuron 32b[2]. Then, the convolution value C12 which is the sum of these values is output from the neuron 32b[2].

A value obtained by multiplying the input data value i21 by the filter value f11, a value obtained by multiplying the input data value i22 by the filter value f12, a value obtained by multiplying the input data value i31 by the filter value f21, and a value obtained by multiplying the input data value i32 by the filter value f22 are input to the neuron 32b[3]. Then, the convolution value C21 which is the sum of these values is output from the neuron 32b[3].

A value obtained by multiplying the input data value i22 by the filter value f11, a value obtained by multiplying the input data value i23 by the filter value f12, a value obtained by multiplying the input data value i32 by the filter value f21, and a value obtained by multiplying the input data value i33 by the filter value f22 are input to the neuron 32b[4]. Then, the convolution value C22 which is the sum of these values is output from the neuron 32b[4].

As illustrated in FIG. 5, each of the neuron 32b[1] to the neuron 32b[4] is connected to some of the neuron 32a[1] to the neuron 32a[9]. Thus, the convolutional layer CL can be regarded as a partial connection layer.

The neuron 32c is the neuron 32 included in the pooling layer PL illustrated in FIG. 5. In the case of FIG. 5, the convolution value C11, the convolution value C12, the convolution value C21, and the convolution value C22 are input to the neuron 32c. Then, the pooling value P is output from the neuron 32c. Note that the convolution values output from the neurons 32b are not multiplied by weight coefficients. A weight coefficient is a parameter optimized by the learning in the neural network, as described above. Hence, the structure in which the parameter optimized by the learning is not used as a parameter used in the arithmetic operation by the pooling layer PL can be employed.

As described above, the database image data $GD_{DB}$ is input to the neural network 30, whereby the processing portion 13 can obtain database image feature value data $GFD_{DB}$ representing the feature value of the database image data $GD_{DB}$. For example, as shown in FIG. 3A, the data output from the layer 31[m] can be used as the database image feature value data $GFD_{DB}$. Alternatively, as shown in FIG. 3B, the data output from the pooling layer PL[m] can be used as the database image feature value data $GFD_{DB}$. Note that the database image feature value data $GFD_{DB}$ may include output data of two or more layers. When the database image feature value data $GFD_{DB}$ includes output data of a larger number of layers, the database image feature value data $GFD_{DB}$ can represent the feature of the database image data $GD_{DB}$ more accurately. The database image feature value data $GFD_{DB}$ obtained by the processing portion 13 can be stored in the database 17.

[Step S03]

Figure 6A:
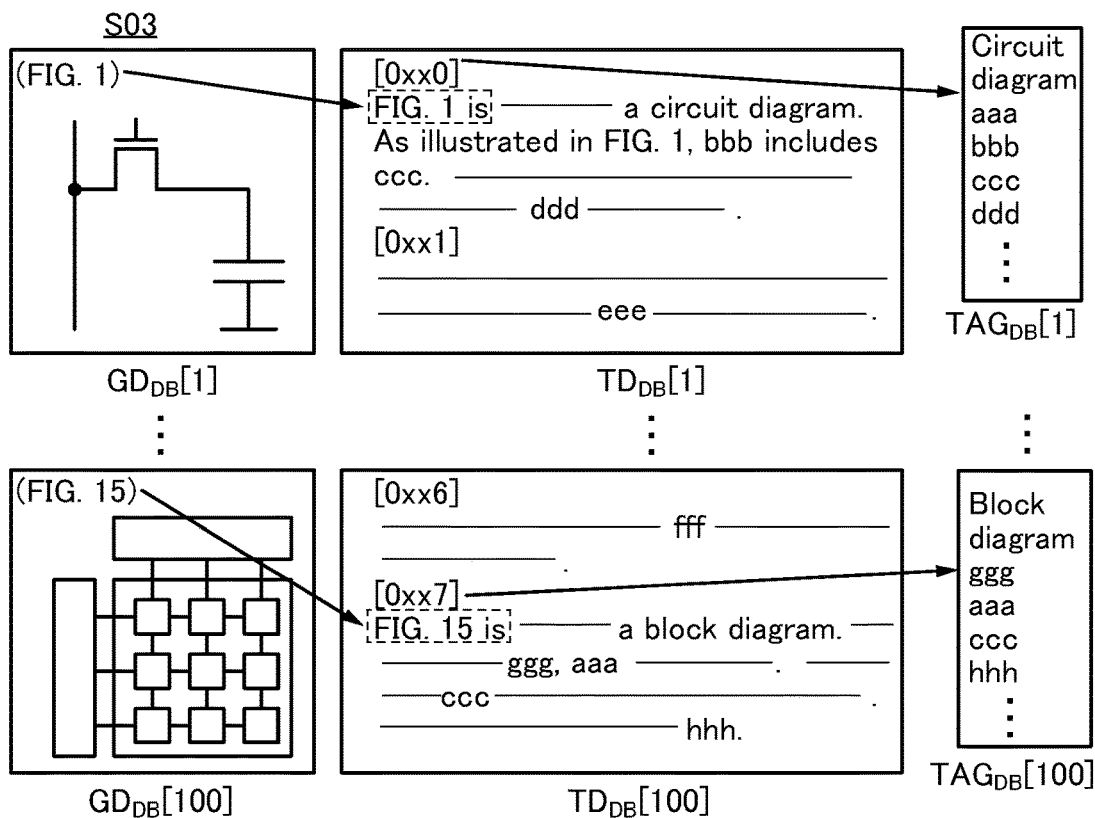
FIG. 6A and FIG. 6B are diagrams illustrating examples of a method for generating retrieval data.

Next, the processing portion 13 obtains database tags $TAG_{DB}$ linked to the database image data $GD_{DB}$. The database tags $TAG_{DB}$ are preferably obtained such that the database tags $TAG_{DB}$ are tags representing a concept, technological contents, remarkable points, and the like of images corresponding to the database image data $GD_{DB}$. FIG. 6A is a drawing illustrating an example of a method for obtaining the database tags $TAG_{DB}$. Note that the illustration of data in FIG. 6A is just an example, and the data is not limited thereto. The illustration of data, vectors, and the like in other drawings is also just an example, and the data, the vectors, and the like are not limited to those illustrated in the drawings.

In this specification and the like, when a plurality of components are denoted by the same reference numerals, and in particular need to be distinguished from each other, an identification numeral such as [1] or [2] is added to the reference numerals.

In the method illustrated in FIG. 6A, for example, a tag is linked to each of database image data $GD_{DB}$[1] to database image data $GD_{DB}$[100]. In addition, document data $TD_{DB}$ corresponding to the database image data $GD_{DB}$ are stored in the database 17 in advance. Moreover, figure numbers are linked to the database image data $GD_{DB}$.

The document data $TD_{DB}$ can be, for example, data corresponding to documents in publications such as a patent document, a utility model publication, a design publication, and a paper disclosing drawings represented by the database image data $GD_{DB}$. In the case where a publication disclosing the drawings represented by the database image data $GD_{DB}$ is a patent document or a utility model publication, for example, data corresponding to a specification can be used as the document data $TD_{DB}$. Alternatively, data corresponding to the scope of claims of a patent, the scope of claims of a utility model registration, or an abstract can be used as the document data $TD_{DB}$. In the case where a publication disclosing the database image data $GD_{DB}$ is a design publication, data corresponding to an application can be used as the document data $TD_{DB}$.

In the case where the document data $TD_{DB}$ are data corresponding to a specification, a paper, or the like, for example, the database tags $TAG_{DB}$ can be obtained by morphological analysis conducted on paragraphs describing the drawings represented by the database image data $GD_{DB}$. FIG. 6A illustrates an example in which the figure number of an image corresponding to the database image data $GD_{DB}$[1] is "FIG. 1", and "FIG. 1 is . . . " is written in a paragraph [0xx0] of a document represented by the document data $TD_{DB}$[1] linked to the database image data $GD_{DB}$[1]. Thus, when the morphological analysis is conducted on text in the paragraph [0xx0] on the assumption that the explanation of the drawing represented by the database image data $GD_{DB}$[1] is described in the paragraph

Figure 15:
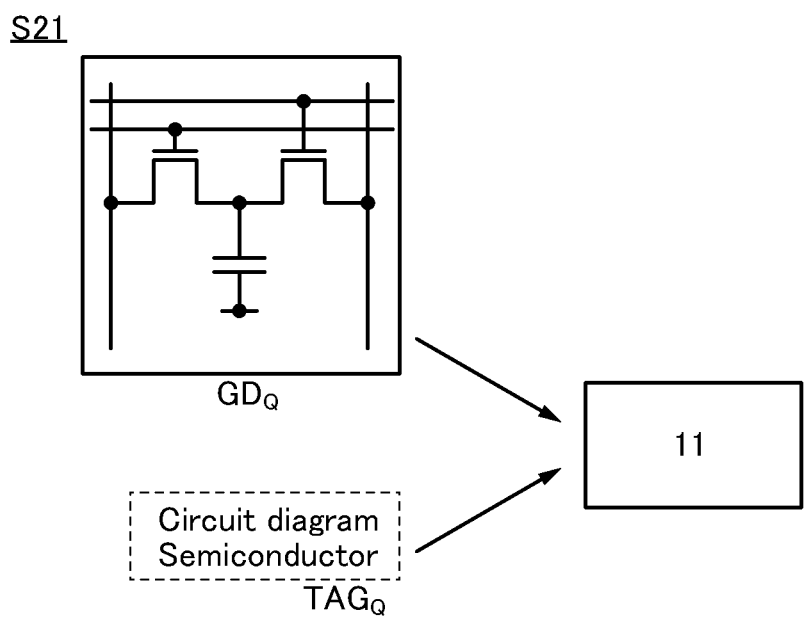
FIG. 15 is a diagram illustrating an example of an image retrieval method.

[0xx0], for example, database tags $TAG_{DB}[1]$ can be obtained. In addition, FIG. 6A illustrates an example in which the figure number of an image corresponding to the image data $GD_{DB}[100]$ is "FIG. 15", and "FIG. 15 is . . . " is written in a paragraph [0xx7] of a document represented by the document data $TD_{DB}[100]$ linked to the database image data $GD_{DB}[100]$. Thus, when the morphological analysis is conducted on text in the paragraph [0xx7] on the assumption that the explanation of the drawing represented by the database image data $GD_{DB}[100]$ is described in the paragraph [0xx7], for example, database tags $TAG_{DB}[100]$ can be obtained.

Note that all the pieces of the document data $TD_{DB}$ are not necessarily different from each other. For example, when the database image data $GD_{DB}[1]$ corresponds to "FIG. 1" of a predetermined publication and the database image data $GD_{DB}[2]$ corresponds to "FIG. 2" of the identical publication, a document represented by the document data $TD_{DB}[1]$ can be the same as a document represented by the document data $TD_{DB}[2]$.

In the morphological analysis, text written in a natural language is divided into morphemes (smallest meaningful units in a language), and parts of speech in the morphemes can be distinguished, for example. Thus, for example, only nouns described in the paragraph [0xx0] are extracted, so that the database tags $TAG_{DB}[1]$ can be obtained. In the case of FIG. 6A, terms such as "circuit diagram", "aaa", "bbb", "ccc", and "ddd" are regarded as the database tags $TAG_{DB}[1]$. In addition, terms such as "block diagram", "ggg", "aaa", "ccc", and "hhh" are regarded as the database tags $TAG_{DB}[100]$.

As described above, the database tags $TAG_{DB}$ can be obtained by the morphological analysis conducted on the document data $TD_{DB}$ linked to the database image data $GD_{DB}$, for example. When the database tags $TAG_{DB}$ are obtained by the above-described method, tags representing a concept, technological contents, remarkable points, and the like of images corresponding to the database image data $GD_{DB}$ can be obtained inclusively.

In this specification and the like, one tag means one term, for example. In the case of FIG. 6A, for example, the number of database tags $TAG_{DB}[1]$ can be five or more. In addition, the number of database tags $TAG_{DB}[100]$ can be five or more.

Note that, for example, all the terms extracted by the morphological analysis are not necessarily used as the database tags $TAG_{DB}$. For example, a predetermined number of terms can be extracted from the extracted terms, and can be used as the database tags $TAG_{DB}$. For example, only a predetermined number of terms with a high TF-IDF (Term Frequency-Inverse Document Frequency) can be extracted from the extracted terms, and can be used as the database tags $TAG_{DB}$. When the number of database tags $TAG_{DB}$ linked to the database image data $GD_{DB}$ is equal to that of pieces of the database image data $GD_{DB}$, the image retrieval method using the image retrieval system 10 can be simplified.

A TF-IDF is calculated on the basis of two indexes of a term frequency (TF) and an inverse document frequency (IDF). Thus, a term frequently appearing in the whole document has a high TF but has a low IDF. Hence, such a term has a lower TF-IDF than a term with high appearance frequencies in paragraphs or the like from which terms being the candidate for the database tags $TAG_{DB}$ are extracted and with low appearance frequencies in the other paragraphs or the like. For example, the term frequently appearing in the whole document is possibly a term that does not strongly represent the features of an image, such as a concept, technological contents, and remarkable points. Thus, in the case where the database tags $TAG_{DB}$ are obtained using a TF-IDF, the database tags $TAG_{DB}$ that represent the features of a database image strongly can be obtained as compared with the case where the database tags $TAG_{DB}$ are obtained using only a TF, for example. Accordingly, the image retrieval system 10 can perform retrieval with high accuracy. Note that the database tags $TAG_{DB}$ may be obtained using only a TF without calculation of a TF-IDF, for example. In that case, calculation by the processing portion 13 can be simplified.

Note that the morphological analysis may be conducted on text in two or more paragraphs. For example, the morphological analysis may also be conducted on paragraphs that would describe drawings represented by the database image data $GD_{DB}$ and previous and next paragraphs of such paragraphs. For example, in the case where the morphological analysis is conducted on the document data $TD_{DB}[1]$ illustrated in FIG. 6A, the morphological analysis may be conducted on the paragraph [0xx0] and the next paragraph [0xx1]. In that case, the term "eee" described in the paragraph [0xx1] can be used as the database tag $TAG_{DB}[1]$, for example. In the case where the morphological analysis is conducted on the document data $TD_{DB}[100]$ illustrated in FIG. 6A, for example, the morphological analysis may be conducted on the paragraph [0xx7] and the previous paragraph [0xx6]. In that case, the term "fff" described in the paragraph [0xx6] can be used as the database tag $TAG_{DB}[100]$, for example.

Alternatively, the morphological analysis may be conducted on all the paragraphs describing the figure numbers linked to the database image data $GD_{DB}$. Further alternatively, the morphological analysis may be conducted on paragraphs that describe the figure numbers linked to the database image data $GD_{DB}$ and do not describe the other figure numbers.

Alternatively, the morphological analysis may be conducted only on some sentences included in text described in a predetermined paragraph. For example, in the case of FIG. 6A, the morphological analysis may be conducted only on the sentence including "FIG. 1 is . . . " among the text described in the paragraph [0xx0]. In that case, the term "ddd" is not used as the database tag $TAG_{DB}[1]$.

Note that not only the term itself described in the document represented by the document data $TD_{DB}$ but also a synonym of the term may be used as the database tags $TAG_{DB}$. For example, synonym dictionary data is stored in the memory portion 15 or the database 17 in advance, and a term extracted by the morphological analysis and a term registered as a synonym of the term in a synonym dictionary can be used as the database tags $TAG_{DB}$. As a synonym here, a generally available synonym dictionary may be used, and a synonym extracted using distributed representation of terms may be used. The extraction of a synonym using distributed representation may be performed using a database including other documents in the field to which retrieval target documents belong.

When not only the term itself described in the document represented by the document data $TD_{DB}$ but also a synonym of the term is used as the database tags $TAG_{DB}$, the database tags $TAG_{DB}$ can strongly represent the features, such as a concept, technological contents, and remarkable points, of the database image data $GD_{DB}$.

Note that the database tags $TAG_{DB}$ may be obtained without the use of the morphological analysis. For example, the database tags TAG$_{DB}$ may be obtained on the basis of the database image feature value data GFD$_{DB}$.

Figure 6B:
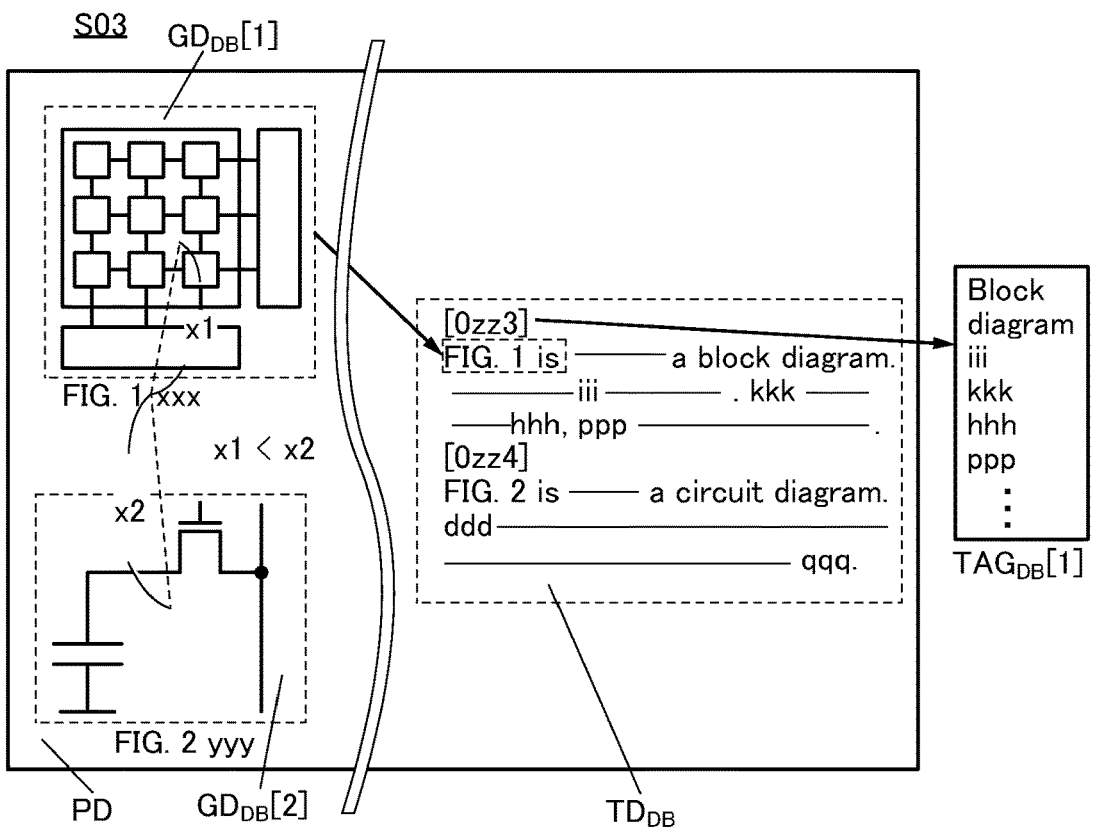

FIG. 6B is a diagram illustrating an example of a method for linking figure numbers to the database image data GD$_{DB}$. In FIG. 6B, publication data PD includes the image data GD$_{DB}$[1], the image data GD$_{DB}$[2], and the document data TD$_{DB}$. In a publication represented by the publication data PD, text "FIG. 1 xxx" and text "FIG. 2 yyy" are described. Note that data representing the text "FIG. 1 xxx" and data representing the text "FIG. 2 yyy" are not included in the document data TD$_{DB}$. Furthermore, "x1", "x2", "x1<x2", dashed lines, arrows, and the like in FIG. 6B are used for convenience of description, and they are actually not described in the publication represented by the publication data PD.

In the method illustrated in FIG. 6B, in the case where text "FIG. N" is described within a predetermined distance from a drawing, for example, the figure number of a drawing closest to the text "FIG. N" can be set to "N". Here, for example, a distance between coordinates representing the center of text (center coordinates) and the center coordinates of a drawing can be a distance from text to a drawing. Note that "N" is not limited to an integer and may include, for example, a character. For example, N may be "1(A)".

In the case of FIG. 6B, a distance x1 between the center coordinates of the text "FIG. 1 xxx" and the center coordinates of the drawing corresponding to the database image data GD$_{DB}$[1] is shorter than a distance x2 between the center coordinates of the text "FIG. 1 xxx" and the center coordinates of the drawing corresponding to the database image data GD$_{DB}$[2]. Thus, the drawing closest to the text "FIG. 1 xxx" can be regarded as the database image data GD$_{DB}$[1]. Accordingly, the figure number linked to the database image data GD$_{DB}$[1] can be set to "1".

FIG. 6B illustrates an example in which "FIG. 1 is . . . " is described in a paragraph [0zz3] in the document represented by the document data TD$_{DB}$, and "FIG. 2 is . . . " is described in a paragraph [0zz4]. As described above, in the case of FIG. 6B, the database tags TAG$_{DB}$[1] linked to the database image data GD$_{DB}$[1] can be obtained by the morphological analysis conducted on text described in the paragraph [0zz3], for example. In FIG. 6B, terms such as "block diagram", "iii", "kkk", "hhh", and "ppp" described in the paragraph [0zz3] are used as the database tags TAG$_{DB}$[1].

Note that the center coordinates of all the drawings may be arranged to form first one-dimensional arrangement, and the center coordinates of all the text "FIG. N" may be arranged to form second one-dimensional arrangement, for example. Then, the coordinates included in the first one-dimensional arrangement may be compared with the coordinates included in the second one-dimensional arrangement, and the text "FIG. N" described at the closest coordinates may be linked to each of the drawings. That is, the figure number of the drawing whose coordinates are closest to the coordinates representing the position of the text "FIG. N" can be set to "N". The coordinates included in the first one-dimensional arrangement can be compared with the coordinates included in the second one-dimensional arrangement by calculation of the sum of the square of a difference between the x coordinates and the square of a different between the y coordinates, for example. In the case where the comparison is performed by the above-described method, an element with the smallest sum can be an element positioned at the closest coordinates, for example.

By the above-described method, the processing portion 13 can obtain the database tags TAG$_{DB}$. The database tags TAG$_{DB}$ obtained by the processing portion 13 can be stored in the database 17.

[Step S04]

Figures 7A, 7B:
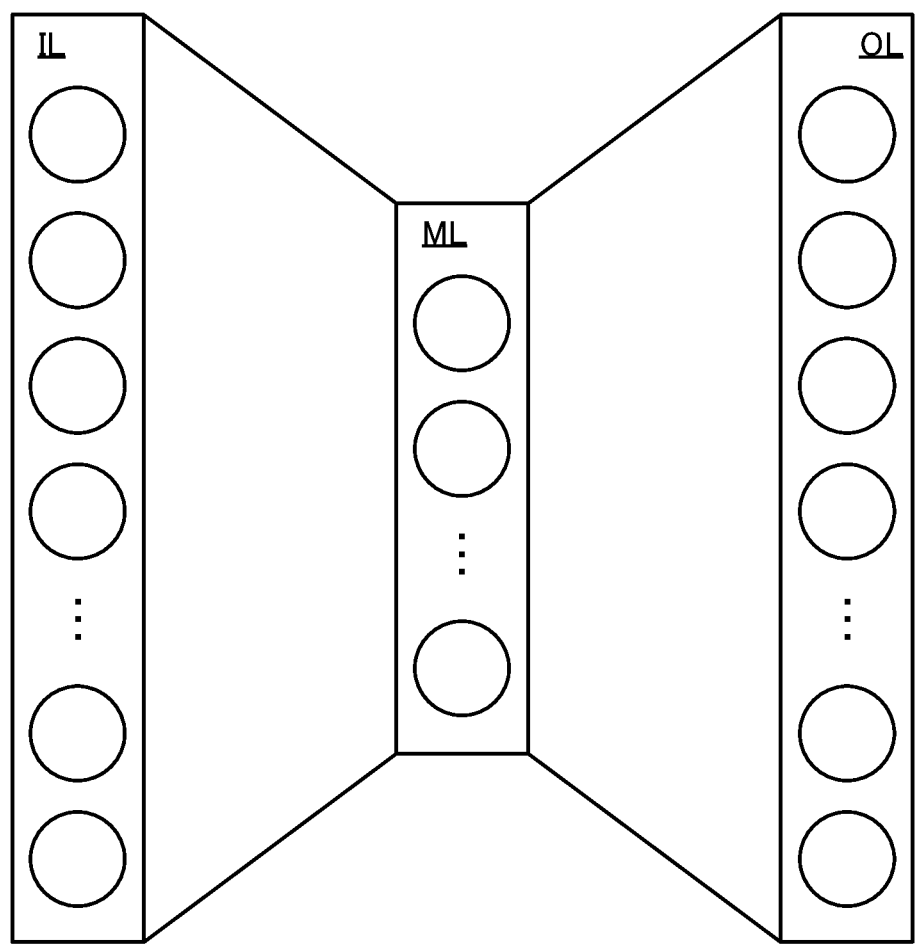
FIG. 7A is a diagram showing an example of a method for generating retrieval data.
FIG. 7B is a diagram illustrating a structure example of a neural network.

Next, the database tags TAG$_{DB}$ are represented by vectors. Vectors representing the database tags TAG$_{DB}$ are referred to as database tag vectors TAGV$_{DB}$. FIG. 7A is a diagram showing a state where the database tags TAG$_{DB}$ illustrated in FIG. 6A are represented by vectors.

The database tag vectors TAGV$_{DB}$ can be obtained by input of the database tags TAG$_{DB}$ to the neural network included in the processing portion 13, for example. In that case, the database tag vectors TAGV$_{DB}$ can each be a distributed representation vector, for example. A distributed representation vector is a vector that represents a term with continuous values quantified with respect to feature elements (dimensions). Vectors of terms with similar meanings become close to each other.

A neural network used for obtaining the distributed representation vector can have a different structure from the neural network used for obtaining the aforementioned image feature value data. FIG. 7B is a diagram illustrating a structure example of a neural network 40, which is the neural network used for obtaining the distributed representation vector.

In this specification and the like, for example, a neural network used for obtaining image feature value data is referred to as a first neural network, and a neural network used for obtaining a distributed representation vector is referred to as a second neural network in some cases. Note that the ordinal numbers are just an example, and the neural network used for obtaining a distributed representation vector may be referred to as a first neural network, and the neural network used for obtaining image feature value data may be referred to as a second neural network, for example. For another example, the neural network used for obtaining image feature value data may be referred to as a third neural network or the like, and the neural network used for obtaining a distributed representation vector may be referred to as a third neural network or the like.

As illustrated in FIG. 7B, the neural network 40 includes an input layer IL, an intermediate layer ML, and an output layer OL. Here, the neural network 40 can have a structure including one intermediate layer ML. With the use of an opened-sourced algorithm Word2Vec, for example, the neural network 40 can obtain a distributed representation vector representing a term input to the input layer IL. An example of a method in which the neural network 40 having the structure illustrated in FIG. 7B obtains the database tag vectors TAGV$_{DB}$ representing the database tags TAG$_{DB}$ input to the input layer IL will be described below.

Vectors, which are one-hot vectors representing the database tags TAG$_{DB}$, are input to the input layer IL. Here, in a one-hot vector, one component represents one term, and a component corresponding to a term to be input to the input layer IL can be 1 and the other components can be 0. That is, a one-hot vector can be regarded as a vector in which one component is 1 and the other components are 0. The number of neurons included in the input layer IL can be equal to that of components of the one-hot vector.

The intermediate layer ML has a function of generating a distributed representation vector on the basis of a one-hot vector input to the input layer IL. For example, when the one-hot vector is multiplied by a predetermined weight, the intermediate layer ML can generate the distributed representation vector. The weight can be represented by a matrix;

thus, the neural network 40 can generate the distributed representation vector by performing product-sum operation between the one-hot vector and a weight matrix.

Note that the number of neurons included in the intermediate layer ML can be equal to the number of dimensions of the distributed representation vector. In the case where the number of dimensions of the distributed representation vector is 300, for example, the intermediate layer ML can have a structure including 300 neurons.

The above-described weight matrix can be obtained by learning, for example, supervised learning. Specifically, a term is represented by the one-hot vector and is input to the input layer IL, and surrounding terms of the term input to the input layer IL are represented by the one-hot vectors and are input to the output layer OL. Here, a plurality of surrounding terms per term input to the input layer IL are input to the output layer OL. Then, the value of the weight matrix of the neural network 40 is adjusted such that the probability of the surrounding terms of the term input to the input layer IL can be output from the output layer OL. Note that one neuron included in the output layer OL corresponds to one term, for example. The above is an example of the learning method of the neural network 40.

As described above, one neuron of each of the input layer IL and the output layer OL can correspond to one term. Thus, the number of neurons included in the input layer IL can be equal to the number of neurons included in the output layer OL.

The number of neurons included in the intermediate layer ML can be smaller than the number of neurons included in the input layer IL. For example, the number of terms that can be processed by the neural network 40, i.e., the number of neurons included in the input layer IL, can be 10000, and the number of dimensions of the distributed representation vector, i.e., the number of neurons included in the intermediate layer ML, can be 300. Thus, in distributed representation, the number of dimensions can be kept small even when the number of representable terms increases; hence, the amount of calculation is less likely to increase even when the number of representable terms increases. Accordingly, the image retrieval system 10 can perform retrieval in a short time.

By the above-described method, the processing portion 13 can obtain the database tag vectors $TAGV_{DB}$. The database tag vectors $TAGV_{DB}$ obtained by the processing portion 13 can be stored in the database 17.

Through Step S01 to Step S04 described above, the database image feature value data $GFD_{DB}$, the database tags $TAG_{DB}$, and the database tag vectors $TAGV_{DB}$ are obtained by the processing portion 13 and stored in the database 17. This enables the image retrieval system 10 to retrieve a database image similar to a query image. Note that the database tags $TAG_{DB}$ are not necessarily stored in the database 17.

In the method illustrated in FIG. 2, the database image feature value data $GFD_{DB}$ is obtained by the processing portion 13 through Step S01 and Step S02, and then the database tags $TAG_{DB}$ and the database tag vectors $TAGV_{DB}$ are obtained by the processing portion 13 through Step S03 and Step S04; however, one embodiment of the present invention is not limited thereto. For example, the database image feature value data $GFD_{DB}$ may be obtained after the database tags $TAG_{DB}$ and the database tag vectors $TAGV_{DB}$ are obtained by the processing portion 13.

In addition, in the method shown in FIG. 2, vectors themselves output from the neural network 40 by input of the database tags $TAG_{DB}$ to the neural network 40 are used as the database tag vectors $TAGV_{DB}$; however, one embodiment of the present invention is not limited thereto. A modification example of the method for obtaining the database tag vectors $TAGV_{DB}$ will be described below.

First, terms to be candidate for the database tags $TAG_{DB}$ are obtained by the processing portion 13. The terms to be candidate for the database tags $TAG_{DB}$ can be obtained by the morphological analysis as illustrated in FIG. 6A and FIG. 6B, for example.

Next, the obtained terms are represented by vectors. For example, the obtained terms are input to the neural network 40, whereby the terms can each be represented by the distributed representation vector.

After that, clustering is performed on the distributed representation vector to generate a predetermined number of clusters. For example, clusters whose number is equal to that of database tags $TAG_{DB}$ to be obtained are generated. The clustering can be performed by K-means, DBSCAN (Density-Based Spatial Clustering of Applications with Noise), or the like.

FIG. 8A illustrates an example in which, as the candidate for tags linked to the database image data $GD_{DB}[1]$, 20 terms are obtained by the processing portion 13 and these terms are represented by database term vectors $WORDV_{DB}$. FIG. 8A also illustrates an example in which five clusters (a cluster CST1, a cluster CST2, a cluster CST3, a cluster CST4, and a cluster CST5) are generated on the basis of the 20 database term vectors $WORDV_{DB}$. Note that for convenience of description, the vectors illustrated in FIG. 8A are each a two-dimensional vector, and the horizontal axis direction represents one component of the two-dimensional vector and the vertical axis direction represents the other component of the two-dimensional vector; actually, the database term vectors $WORDV_{DB}$ or the like can each be a 300-dimensional vector, for example.

Next, a vector representing a representative point is obtained for each of the cluster CST1 to the cluster CST5. The vector representing the representative point can be a database tag vector $TAGV_{DB}[1]$. FIG. 8A illustrates an example in which a vector representing a representative point of the cluster CST1 is a database tag vector $TAGV1_{DB}[1]$, a vector representing a representative point of the cluster CST2 is a database tag vector $TAGV2_{DB}[1]$, a vector representing a representative point of the cluster CST3 is a database tag vector $TAGV3_{DB}[1]$, a vector representing a representative point of the cluster CST4 is a database tag vector $TAGV4_{DB}[1]$, and a vector representing a representative point of the cluster CST5 is a database tag vector $TAGV5_{DB}[1]$.

The component of the vector representing the representative point can be the average value of the components of the database term vectors $WORDV_{DB}$ included in the cluster, for example. In the case where five database term vectors $WORDV_{DB}$ of (0.1, 0.7), (0.2, 0.5), (0.3, 0.5), (0.4, 0.2), and (0.5, 0.1) are included in a cluster, for example, a vector representing a representative point of the cluster can be, for example, (0.3, 0.4). Through the above steps, the database tag vector $TAGV_{DB}[1]$ can be obtained by the processing portion 13.

A database tag vector $TAGV_{DB}[2]$ and subsequent vectors can be obtained in a similar manner. FIG. 8B is a table showing components of vectors in the case where five database tag vectors $TAGV_{DB}$ (the database tag vector $TAGV1_{DB}$, the database tag vector $TAGV2_{DB}$, the database tag vector $TAGV3_{DB}$, the database tag vector $TAGV4_{DB}$, and the database tag vector $TAGV5_{DB}$) are obtained for each of the database image data $GD_{DB}[1]$ to the database image data $GD_{DB}[100]$. Note that the components shown in FIG. 8B are examples for convenience of description.

As shown in FIG. 8B, the database tag vectors $TAGV_{DB}$ can be weighted. The weight can be a value obtained by dividing the number of database term vectors $WORDV_{DB}$ included in one cluster by the sum of the number of terms obtained as the candidate for tags linked to the database image data $GD_{DB}$ by the processing portion 13, for example. FIG. 8A and FIG. 8B show an example in which 20 terms are obtained as the candidate for the tags linked to the database image data $GD_{DB}[1]$ by the processing portion 13, for example. An example is shown in which eight database term vectors $WORDV_{DB}$ are included in the cluster CST1, four database term vectors $WORDV_{DB}$ are included in the cluster CST2, two database term vectors $WORDV_{DB}$ are included in the cluster CST3, three database term vectors $WORDV_{DB}$ are included in the cluster CST4, and three database term vectors $WORDV_{DB}$ are included in the cluster CST5. Thus, as for the database image data $GD_{DB}[1]$ shown in FIG. 8B, for example, the weight of the database tag vector $TAGV1_{DB}[1]$ included in the cluster CST1 can be 8/20, the weight of the database tag vector $TAGV2_{DB}[1]$ included in the cluster CST2 can be 4/20, the weight of the database tag vector $TAGV3_{DB}[1]$ included in the cluster CST3 can be 2/20, the weight of the database tag vector $TAGV4_{DB}[1]$ included in the cluster CST4 can be 3/20, and the weight of the database tag vector $TAGV5_{DB}[1]$ included in the cluster CST5 can be 3/20.

With the above-described method, the weight of the tag vectors that strongly represent the features, such as a concept, technological contents, and remarkable points, of the database image data $GD_{DB}$ can be increased, for example. Accordingly, the image retrieval system 10 can perform retrieval with high accuracy.

Figure 9:
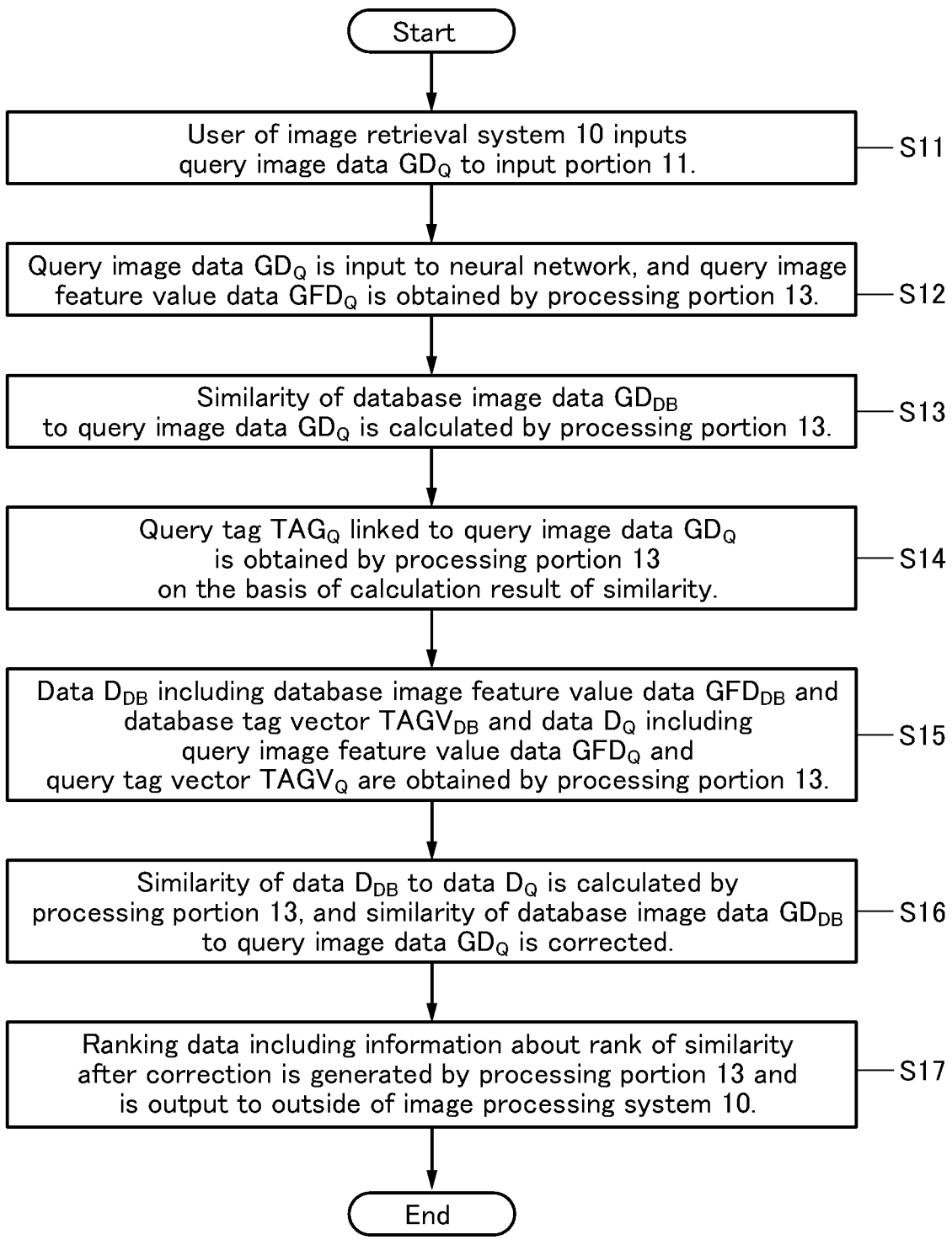
FIG. 9 is a flow chart showing an example of an image retrieval method.

Next, the image retrieval method using the image retrieval system 10 will be described. FIG. 9 is a flow chart showing an example of the processing method.

[Step S11]

First, a user of the image retrieval system 10 inputs query image data $GD_Q$ to the input portion 11. The query image data $GD_Q$ is supplied from the input portion 11 to the processing portion 13 through the transmission path 12. Alternatively, the query image data $GD_Q$ may be stored in the memory portion 15 or the database 17 through the transmission path 12, and supplied from the memory portion 15 or the database 17 to the processing portion 13 through the transmission path 12.

The query image data $GD_Q$ can include, for example, images and the like describing an invention, a device, or a design that is before application, an industrial product before sale, technical information, or technical thought.

[Step S12]

Next, the query image data $GD_Q$ is input to the neural network included in the processing portion 13. For example, the query image data $GD_Q$ can be input to the neural network 30 having the structure illustrated in FIG. 3A or FIG. 3B. This allows the processing portion 13 to obtain query image feature value data $GFD_Q$ representing a feature value of the query image data $GD_Q$. For example, the data output from the layer 31[m] illustrated in FIG. 3A can be used as the query image feature value data $GFD_Q$. Alternatively, the data output from the pooling layer PL[m] illustrated in FIG. 3B can be used as the query image feature value data $GFD_Q$. Note that the query image feature value data $GFD_Q$ may include output data of two or more layers like the database image feature value data $GFD_{DB}$. When the query image feature value data $GFD_Q$ includes output data from a larger number of layers, the query image feature value data $GFD_Q$ can represent the feature of the query image data $GD_Q$ more accurately.

[Step S13]

Next, the processing portion 13 calculates similarity of the database image data $GD_{DB}$ to the query image data $GD_Q$.

Figure 10:
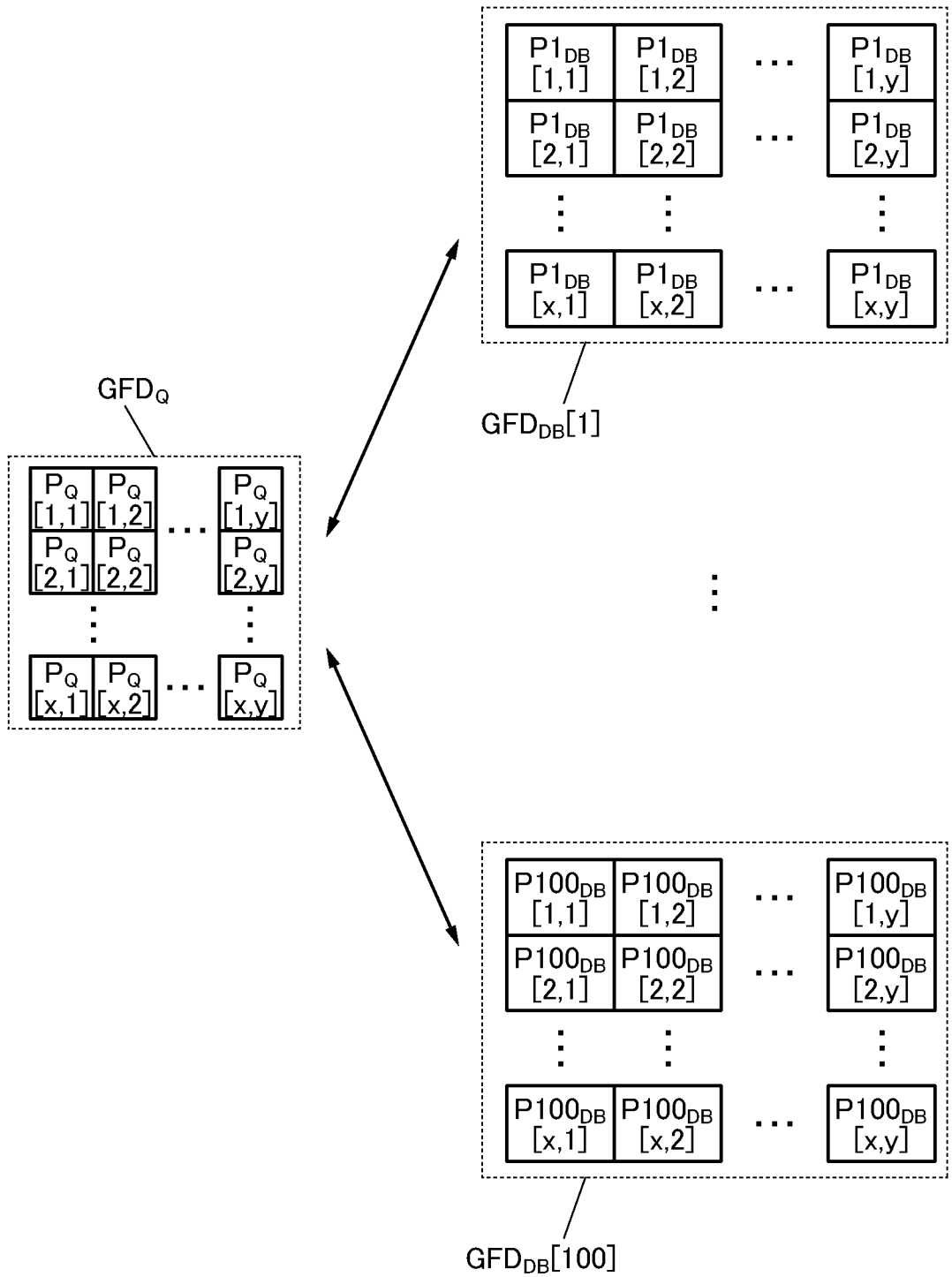
FIG. 10 is a diagram illustrating an example of an image retrieval method.

FIG. 10 is a diagram illustrating calculation of the similarity of the database image data $GD_{DB}$ to the query image data $GD_Q$. FIG. 10 illustrates an example in which one piece of the query image data $GD_Q$ and 100 pieces of the database image data $GD_{DB}$ are input to the neural network 30a illustrated in FIG. 3B. FIG. 10 also illustrates an example in which the query image feature value data $GFD_Q$ and the database image feature value data $GFD_{DB}$ each have pooling values P of x rows and y columns (x and y are each an integer greater than or equal to 1).

In this specification and the like, a pooling value of the query image feature value data $GFD_Q$ is referred to as a pooling value $P_Q$, and a pooling value of the database image feature value data $GFD_{DB}$ is referred to as a pooling value $P_{DB}$. For example, a pooling value of the database image feature value data $GFD_{DB}[1]$ is referred to as a pooling value $P1_{DB}$, and a pooling value of the database image feature value data $GFD_{DB}[100]$ is referred to as a pooling value $P100_{DB}$.

In the case of FIG. 10, the similarity of each of the database image feature value data $GFD_{DB}[1]$ to the database image feature value data $GFD_{DB}[100]$ to the query image feature value data $GFD_Q$ is calculated. Then, the similarity can be used as the similarity of the database image data $GD_{DB}[1]$ to the database image data $GD_{DB}[100]$ to the query image data $GD_Q$. Note that the similarity of all the pieces of the database image feature value data $GFD_{DB}$ stored in the database 17 to the query image feature value data $GFD_Q$ may be calculated. Alternatively, the similarity of some pieces of the database image feature value data $GFD_{DB}$ stored in the database 17 to the query image feature value data $GFD_Q$ may be calculated.

Cosine similarity is preferably used as the above-described similarity, for example. Alternatively, Euclidean similarity or Minkowski similarity may be used. For example, the cosine similarity of the database image feature value data $GFD_{DB}[1]$ to the query image feature value data $GFD_Q$ can be calculated by the following formula. As the value of the cosine similarity is larger, the database image data $GD_{DB}$ is more similar to the query image data $GD_Q$.

(Formula 5)

$$\frac{\sum_{i=1,j=1}^{x,y}(P_Q[i,j] \cdot P1_{DB}[i,j])}{\sqrt{\sum_{i=1,j=1}^{x,y}P_Q^2[i,j]} \cdot \sqrt{\sum_{i=1,j=1}^{x,y}P1_{DB}^2[i,j]}} \quad (5)$$

The cosine similarity of the database image feature value data $GFD_{DB}[2]$ to the database image feature value data $GFD_{DB}[100]$ to the query image feature value data $GFD_Q$ can be calculated in a similar manner. Through the above steps, the similarity of the database image data $GD_{DB}[1]$ to the database image data $GD_{DB}[100]$ to the query image data $GD_Q$ can be calculated.

Calculation of cosine similarity as similarity enables the image retrieval system 10 to perform retrieval with high accuracy. Cosine similarity can be obtained by simple calculation. Thus, in the case where the processing portion 13 includes a GPU, similarity can be obtained by the GPU.

Accordingly, similarity can be calculated in a short time, and the image retrieval system 10 can perform retrieval in a short time.

[Step S14]

Next, on the basis of calculation results of the similarity of the database image data $GD_{DB}$ to the query image data $GD_Q$, query tags $TAG_Q$, which are tags linked to the query image data $GD_Q$, are obtained by the processing portion 13.

FIG. 11A and FIG. 11B are diagrams showing an example of a method for obtaining the query tags $TAG_Q$. First, as shown in FIG. 11A, the database image data $GD_{DB}[1]$ to the database image data $GD_{DB}[100]$ are sorted on the basis of the similarity calculated in Step S13. For example, the database image data $GD_{DB}$ are sorted in descending order of the similarity to the query image data $GD_Q$. In the case of FIG. 11A, the database image data $GD_{DB}[2]$ has the highest similarity of 0.999, the database image data $GD_{DB}[31]$ has the second highest similarity of 0.971, the database image data $GD_{DB}[73]$ has the third highest similarity of 0.964, the database image data $GD_{DB}[52]$ has the fourth highest similarity of 0.951, and the database image data $GD_{DB}[28]$ has the fifth highest similarity of 0.937.

Next, the database tags $TAG_{DB}$ linked to the database image data $GD_{DB}$ with high similarity are extracted. In the case of FIG. 11A, the database tags $TAG_{DB}$ linked to the database image data $GD_{DB}$ with the highest similarity to the fifth highest similarity are extracted. Specifically, tags "aaa", "bbb", "ccc", "ddd", and "eee" linked to the database image data $GD_{DB}[2]$, tags "aaa", "ccc", "fff", "ggg", and "hhh" linked to the database image data $GD_{DB}[31]$, tags "aaa", "bbb", "fff", "iii", and "kkk" linked to the database image data $GD_{DB}[73]$, tags "aaa", "ccc", "ggg", "ppp", and "qqq" linked to the database image data $GD_{DB}[52]$, and tags "aaa", "kkk", "rrr", "sss", and "ttt" linked to the database image data $GD_{DB}[28]$ are extracted. As shown in FIG. 11A, some of the extracted tags may be identical.

Although the number of pieces of the database image data $GD_{DB}$ from which the database tags $TAG_{DB}$ are extracted is set to a predetermined number in the above description, one embodiment of the present invention is not limited thereto. For example, the database tags linked to the database image data $GD_{DB}$ with similarity higher than or equal to predetermined similarity may be extracted. That is, the number of pieces of the database image data $GD_{DB}$ from which the database tags $TAG_{DB}$ are extracted is not necessarily fixed.

After that, the number of appearances of each of the extracted tags is calculated as shown in FIG. 11B. For example, the tag "aaa" is linked to each of the database image data $GD_{DB}[2]$, the database image data $GD_{DB}[31]$, the database image data $GD_{DB}[73]$, the database image data $GD_{DB}[52]$, and the database image data $GD_{DB}[28]$; thus, the number of appearances of the tag "aaa" is 5. The tag "ddd" is linked to only the database image data $GD_{DB}[2]$ among the database image data $GD_{DB}[2]$, the database image data $GD_{DB}[31]$, the database image data $GD_{DB}[73]$, the database image data $GD_{DB}[52]$, and the database image data $GD_{DB}[28]$; thus, the number of appearances of the tag "ddd" is 1.

Next, as shown in FIG. 11B, a predetermined number of tags is further extracted in descending order of the number of appearances, for example, and the extracted tags are used as the query tags $TAG_Q$. In the case of FIG. 11B, five tags are extracted as the query tags $TAG_Q$ in descending order of the number of appearances. Specifically, the tag "aaa" with the largest number of appearances of 5 and the tag "ccc" with the second largest number of appearances of 3 are extracted.

In the case where a plurality of tags with the same number of appearances exist but not all of the plurality of tags can be extracted, the tags linked to the database image data $GD_{DB}$ with higher similarity can be extracted, for example. For example, the rank of the similarity of the database image data $GD_{DB}$ is represented by a numerical value. Then, the sum of the numerical values representing the ranks of the similarity of the database image data $GD_{DB}$ is compared between the tags with the same number of appearances, and the tags can be extracted in ascending order of the sum of the numerical values.

In the case of FIG. 11B, the number of query tags $TAG_Q$ is 5, the number of appearances of the tag "aaa" is 5, and the number of appearances of the tag "ccc" is 3. Thus, three tags with the number of appearances of 2 or less need to be extracted. However, there are four tags with the number of appearances of 2, "bbb", "fff", "ggg", and "kkk". Accordingly, three tags need to be selected from the four tags. Here, the rank of the similarity of the database image data $GD_{DB}[2]$ to which the tag "bbb" is linked is 1, and the rank of the similarity of the database image data $GD_{DB}[73]$ to which the tag "bbb" is linked is 3. Hence, the sum of the ranks of the similarity relating to the tag "bbb" is 4. Similarly, the sum of the ranks of the similarity relating to the tag "fff" is 5, the sum of the ranks of the similarity relating to the tag "ggg" is 6, and the sum of the ranks of the similarity relating to the tag "kkk" is 8. As described above, the ascending order of the sum of the ranks of the similarity relating to the tags with the number of appearances of 2 is as follows: the tag "bbb", the tag "fff", the tag "ggg", and the tag "kkk". Thus, the tags "bbb", "fff", and "ggg" can be used as the query tags $TAG_Q$.

The summary of the above description is as follows: in the case of FIG. 11B, the tag "aaa" with the number of appearances of 5, the tag "ccc" with the number of appearances of 3, and the tags "bbb", "fff", and "ggg" with the smallest to the third smallest sum of the ranks of the similarity among the tags with the number of appearances of 2 can be used as the query tags $TAG_Q$.

Note that not only terms themselves included in the database tags $TAG_{DB}$ but also synonyms of the terms included in the database tags $TAG_{DB}$ may be included in the query tags $TAG_Q$. For example, synonym dictionary data is stored in the memory portion 15 or the database 17 in advance, and the terms included in the database tags $TAG_{DB}$ and terms registered as synonyms of the terms in a synonym dictionary can be included in the query tags $TAG_Q$.

In the case of FIG. 11B, the query tags $TAG_Q$ are automatically selected from the extracted database tags $TAG_{DB}$ by the processing portion 13; however, one embodiment of the present invention is not limited thereto. For example, the extracted database tags $TAG_{DB}$ may be presented to a user of the image retrieval system 10, and the tags to be used as the query tags $TAG_Q$ may be selected from the presented tags by the user of the image retrieval system 10. Alternatively, database images with high similarity may be presented to the user of the image retrieval system 10, and the presented database images may be selected by the user of the image retrieval system 10, for example. Then, some or all of the database tags $TAG_{DB}$ linked to the database image data $GD_{DB}$ representing the selected database images may be used as the query tags $TAG_Q$.

Although the query tags $TAG_Q$ are selected from the database tags $TAG_{DB}$ in the method shown in FIG. 11A and FIG. 11B, one embodiment of the present invention is not limited thereto. For example, new tags may be generated on the basis of the database tags $TAG_{DB}$, and the tags may be used as the query tags $TAG_Q$. An example of a method in which query tag vectors $TAGV_Q$ representing the query tags $TAG_Q$ are obtained by the processing portion 13 using the database tag vectors $TAGV_{DB}$ representing the database tags $TAG_{DB}$ will be described below.

The method shown in FIG. 11A can be used in the case where the query tag vectors $TAGV_Q$ are obtained by a method described below. That is, the database tags $TAG_{DB}$ can be extracted by a method similar to the method shown in FIG. 11A.

After the database tags $TAG_{DB}$ are extracted, clustering is performed on the database tag vectors $TAGV_{DB}$ representing the extracted database tags $TAG_{DB}$ to generate a predetermined number of clusters. For example, clusters whose number is equal to the number of query tags $TAG_Q$ to be obtained are generated. The clustering can be performed by K-means, DBSCAN, or the like.

Figures 12A, 12B:
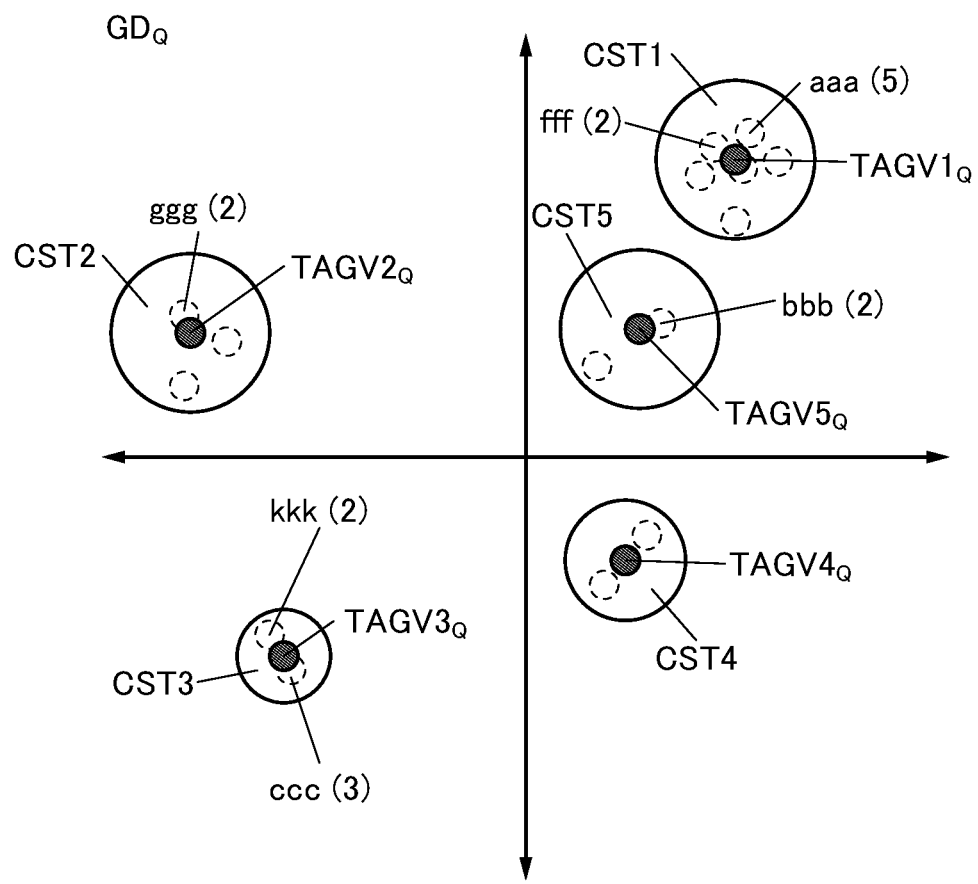
FIG. 12A and FIG. 12B are diagrams showing an example of an image retrieval method.

FIG. 12A illustrates an example in which the 25 database tags $TAG_{DB}$ shown in FIG. 11A are obtained by the processing portion 13. FIG. 12A also illustrates an example in which the five clusters (the cluster CST1, the cluster CST2, the cluster CST3, the cluster CST4, and the cluster CST5) are generated on the basis of the database tag vectors $TAGV_{DB}$ corresponding to the database tags $TAG_{DB}$ shown in FIG. 11A. Note that for convenience of description, the vector illustrated in FIG. 12A is a two-dimensional vector, and the horizontal axis direction represents one component of the two-dimensional vector and the vertical axis direction represents the other component of the two-dimensional vector; actually, the vector can be a 300-dimensional vector, for example. Furthermore, numbers in parentheses in FIG. 12A show the number of appearances of the extracted database tags $TAG_{DB}$. For example, "aaa (5)" means that the number of appearances of the tag "aaa" is 5.

Next, a vector representing a representative point is obtained for each of the cluster CST1 to the cluster CST5. The vector representing the representative point can be the query tag vector $TAGV_Q$. FIG. 12A illustrates an example in which a vector representing a representative point of the cluster CST1 is a query tag vector $TAGV1_Q$, a vector representing a representative point of the cluster CST2 is a query tag vector $TAGV2_{DB}$, a vector representing a representative point of the cluster CST3 is a query tag vector $TAGV3_Q$, a vector representing a representative point of the cluster CST4 is a query tag vector $TAGV4_Q$, and a vector representing a representative point of the cluster CST5 is a query tag vector $TAGV5_Q$.

The component of the vector representing the representative point can be the average value of the components of the database tag vectors $TAGV_{DB}$ included in the cluster, for example. Through the above steps, the query tag vectors $TAGV_Q$ can be obtained by the processing portion 13.

FIG. 12B is a table showing components of the query tag vector $TAGV1_Q$ to the query tag vector $TAGV5_Q$. Note that the components shown in FIG. 12B are examples for convenience of description.

As shown in FIG. 12B, the query tag vectors $TAGV_Q$ can be weighted. The weight can be a value obtained by dividing the number of database tag vectors $TAGV_{DB}$ included in one cluster by the sum of the number of database tags $TAG_{DB}$ extracted by the method illustrated in FIG. 12A, for example. FIG. 12A and FIG. 12B show an example in which 25 database tags $TAG_{DB}$ are extracted, for example. An example is shown in which 11 database tag vectors $TAGV_{DB}$ are included in the cluster CST1, 4 database tag vectors $TAGV_{DB}$ are included in the cluster CST2, 5 database tag vectors $TAGV_{DB}$ are included in the cluster CST3, 2 database tag vectors $TAGV_{DB}$ are included in the cluster CST4, and 3 database tag vectors $TAGV_{DB}$ are included in the cluster CST5. Thus, as shown in FIG. 12B, the weight of the query tag vector $TAGV1_Q$ included in the cluster CST1 can be 11/25, the weight of the query tag vector $TAGV2_Q$ included in the cluster CST2 can be 4/25, the weight of the query tag vector $TAGV3_Q$ included in the cluster CST3 can be 5/25, the weight of the query tag vector $TAGV4_Q$ included in the cluster CST4 can be 2/25, and the weight of the query tag vector $TAGV5_Q$ included in the cluster CST5 can be 3/25.

With the above-described method, the weight of the tag vectors that strongly represent the features, such as a concept, technological contents, and remarkable points, of the query image data $GD_Q$ can be increased, for example. Accordingly, the image retrieval system 10 can perform retrieval with high accuracy.

The method for obtaining the query tags $TAG_Q$ in Step S13 and Step S14 is a simple method as compared with the method for obtaining the query tags $TAG_Q$ not on the basis of the database tags $TAG_{DB}$, for example. Thus, the image retrieval system 10 can perform retrieval in a short time. The method for obtaining the query tags $TAG_Q$ in Step S13 and Step S14 enables tags representing a concept, technological contents, remarkable points, and the like of an image corresponding to the query image data $GD_Q$ to be obtained inclusively as compared with the case where a user of the image retrieval system 10 specifies all the query tags $TAG_Q$ and the candidate for the query tags $TAG_Q$ is not presented to the user, for example. Accordingly, the image retrieval system 10 can perform retrieval easily with high accuracy.

[Step S15]

Next, data $D_{DB}$ including the database image feature value data $GFD_{DB}$ and the database tag vectors $TAGV_{DB}$ is obtained by the processing portion 13. In addition, data $D_Q$ including the query image feature value data $GFD_Q$ and the query tag vectors $TAGV_Q$ is obtained by the processing portion 13.

Figure 13:
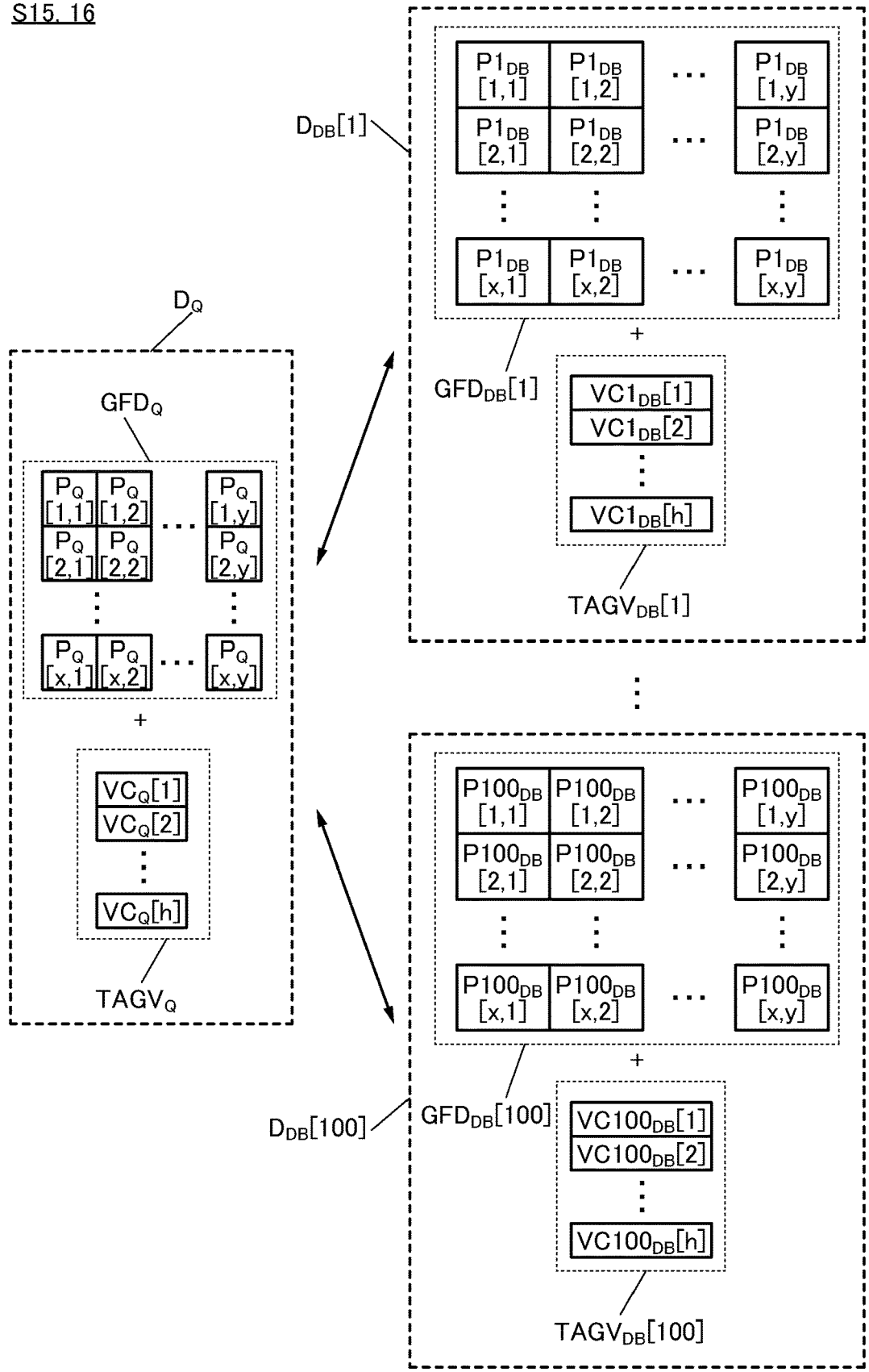
FIG. 13 is a diagram illustrating an example of an image retrieval method.

FIG. 13 is a diagram illustrating structure examples of the data $D_{DB}$ and the data $D_Q$. The database image feature value data $GFD_{DB}$ and the query image feature value data $GFD_Q$ can have structures similar to the structures illustrated in FIG. 10. The database tag vectors $TAGV_{DB}$ can include a component $VC_{DB}[1]$ to a component $VC_{DB}[h]$ (h is an integer of 2 or more). The query tag vector $TAGV_Q$ can include a component $VC_Q[1]$ to a component $VC_Q[h]$. Here, in the case where five tags each represented by a 300-dimensional vector are linked to one piece of image data, for example, h is 1500.

In this specification and the like, for example, a component included in the database tag vector $TAGV_{DB}[1]$ is referred to as a component $VC1_{DB}$, and a component included in the database tag vector $TAGV_{DB}[100]$ is referred to as a component $VC100_{DB}$.

As described above, the term "component" can be replaced with the term "value" in some cases. In that case, image feature value data and a tag vector can each be regarded as a set of a plurality of values. Thus, the term "data" can be replaced with the term "vector" in some cases.

[Step S16]

Next, the processing portion 13 calculates similarity of the data $D_{DB}$ to the data $D_Q$. In the case of FIG. 13, the similarity of each of the data $D_{DB}[1]$ to the data $D_{DB}[100]$ to the data $D_Q$ is calculated. Then, the similarity can be used as the similarity of the database image data $GD_{DB}[1]$ to the database image data $GD_{DB}[100]$ to the query image data $GD_Q$. Thus, the similarity of the database image data $GD_{DB}$ to the query image data $GD_Q$ calculated by the processing portion 13 in Step S13 can be corrected.

Here, when tag vectors are weighted as shown in FIG. 8B and FIG. 12B, for example, components included in the tag vectors are multiplied by weight, so that weighting can be performed.

The similarity of the data $D_{DB}$ to the data $D_Q$ is preferably the same kind as the similarity calculated by the processing portion 13 in Step S13. For example, in the case where the cosine similarity is calculated in Step S13, the cosine similarity is preferably calculated as the similarity of the data $D_{DB}$ to the data $D_Q$.

For example, the cosine similarity of the data $D_{DB}[1]$ to the data $D_Q$ can be calculated by the following formula.

(Formula 6)

$$\frac{\sum_{i=1,j=1}^{x,y}(P_Q[i,j] \cdot P1_{DB}[i,j]) + \sum_{i=1}^{h}(VC_Q[i] \cdot VC1_{DB}[i])}{\sqrt{\sum_{i=1,j=1}^{x,y}P_Q^2[i,j] + \sum_{i=1}^{h}VC_Q^2[i]} \cdot \sqrt{\sum_{i=1,j=1}^{x,y}P1_{DB}^2[i,j] + \sum_{i=1}^{h}VC1_{DB}^2[i]}} \quad (6)$$

The cosine similarity of the data $D_{DB}[2]$ to the data $D_{DB}[100]$ to the data $D_Q$ can be calculated by a similar method. Through the above steps, the similarity of the data $D_{DB}[1]$ to the data $D_{DB}[100]$ to the data $D_Q$ can be calculated. Thus, the similarity of the database image data $GD_{DB}[1]$ to the database image data $GD_{DB}[100]$ to the query image data $GD_Q$ calculated in Step S13 can be corrected.

Note that the ratio of the number of values of image feature value data to the number of components included in a tag vector is adjusted, so that retrieval results can be changed. For example, when the number of values of the query image feature value data $GFD_Q$ and the number of values of the database image feature value data $GFD_{DB}$ are increased or the number of components included in the query tag vectors $TAGV_Q$ and the number of components included in the database tag vectors $TAGV_{DB}$ are decreased, the similarity after the correction emphasizes the image feature value. For example, when the feature value of the database image data $GD_{DB}$ is similar to the feature value of the query image data $GD_Q$, the similarity of the database image data $GD_{DB}$ to the query image data $GD_Q$ after the correction is increased even when the database tags $TAG_{DB}$ are somewhat different from the query tags $TAG_Q$. By contrast, when the number of values of the query image feature value data $GFD_Q$ and the number of values of the database image feature value data $GFD_{DB}$ are decreased or the number of components included in the query tag vectors $TAGV_Q$ and the number of components included in the database tag vectors $TAGV_{DB}$ are increased, the similarity after the correction emphasizes the tags. For example, when the database tags $TAG_{DB}$ are similar to the query tags $TAG_Q$, the similarity of the database image data $GD_{DB}$ to the query image data $GD_Q$ after the correction is increased even when the feature value of the database image data $GD_{DB}$ is somewhat different from the feature value of the query image data $GD_Q$.

In order to increase or decrease the number of components included in a tag vector, the number of tags linked to image data is increased or decreased. When some of the values of image feature value data are used for calculation of similarity, for example, the similarity emphasizing tags can be calculated. For example, in the case where a value representing a feature value of a portion that does not give a strong impression when an image is seen is not used for the calculation of similarity, an increase in similarity of a database image whose impression of appearance is significantly different from that of a query image is inhibited and the similarity emphasizing tags can be calculated. Thus, the image retrieval system 10 can perform retrieval with high accuracy.

Moreover, a value of image feature value data or a component included in a tag vector is multiplied by a predetermined coefficient, so that retrieval results can be changed. For example, the value of the query image feature value data $GFD_Q$ and the value of the database image feature value data $GFD_{DB}$ are multiplied by a real number greater than 1, so that the similarity after the correction emphasizes an image feature value. In addition, the components included in the query tag vectors $TAGV_Q$ and the components included in the database tag vectors $TAGV_{DB}$ are multiplied by a real number greater than or equal to 0 and less than 1, so that the similarity after the correction emphasizes an image feature value. For example, the value of the query image feature value data $GFD_Q$ and the value of the database image feature value data $GFD_{DB}$ are multiplied by a real number greater than or equal to 0 and less than 1, so that the similarity after the correction emphasizes tags. In addition, the components included in the query tag vectors $TAGV_Q$ and the components included in the database tag vectors $TAGV_{DB}$ are multiplied by a real number greater than 1, so that the similarity after the correction emphasizes tags.

[Step S17]

Next, ranking data including information about ranks of the similarity after the correction calculated in Step S16 is generated by the processing portion 13 and is output as retrieval results to the outside of the image retrieval system 10.

The processing portion 13 enables the ranking data to be supplied to the memory portion 15 or the database 17 through the transmission path 12. In addition, the processing portion 13 enables the ranking data to be supplied to the output portion 19 through the transmission path 12. Thus, the output portion 19 enables the ranking data to be supplied to the outside of the image retrieval system 10.

The ranking data can include ranks of the similarity of the database images to the query image, the values of the similarity, and the like. Note that the ranking data preferably includes file paths to the database images. Thus, a user of the image retrieval system 10 can easily access a target image from the ranking data. The query image and tags linked to the output database images may be checked. Furthermore, for example, in the case where document data representing a document disclosing the database image is stored in the database 17 or the like, the user of the image retrieval system 10 can easily access the document disclosing the database image linked to the ranking data. The above is an example of the image retrieval method using the image retrieval system 10.

In the image retrieval method using the image retrieval system 10, first, the similarity of the database image data $GD_{DB}$ to the query image data $GD_Q$ is calculated without linking tags. After that, tags are linked to correct the similarity. Thus, for example, a database image that has a feature value similar to that of a query image but has a concept, technological contents, remarkable points, and the like different from those of the query image can be inhibited from being retrieved.

For example, the query tags $TAG_Q$ are obtained by the processing portion 13 on the basis of the database tags $TAG_{DB}$ linked to the database image data $GD_{DB}$ with the highest similarity to the fifth highest similarity to the query image data $GD_Q$. In that case, image data that has a concept, technological contents, remarkable points, and the like different from those of the query image can be inhibited from being mixed in the database image data $GD_{DB}$ with the similarity under the sixth highest similarity. This can inhibit a phenomenon in which an image to be noise is mixed in the retrieval results and an image that is desired to be retrieved is not output. Accordingly, the image retrieval system 10 can perform retrieval with high accuracy.

In the image retrieval method using the image retrieval system 10, the query tags $TAG_Q$ are obtained on the basis of the database tags $TAG_{DB}$. This obtaining method is a simple method as compared with the method for obtaining the query tags $TAG_Q$ not on the basis of the database tags $TAG_{DB}$. Thus, the image retrieval system 10 can perform retrieval in a short time. The method for obtaining the query tags $TAG_Q$ on the basis of the database tags $TAG_{DB}$ enables tags representing a concept, features, technological contents, remarkable points, and the like of an image corresponding to the query image data $GD_Q$ to be obtained inclusively as compared with the case where a user of the image retrieval system 10 specifies all the query tags $TAG_Q$ and the candidate for the query tags $TAG_Q$ is not presented to the user, for example. Accordingly, the image retrieval system 10 can perform retrieval easily with high accuracy.

<1-3. Image Retrieval Method 2>

Figure 14:
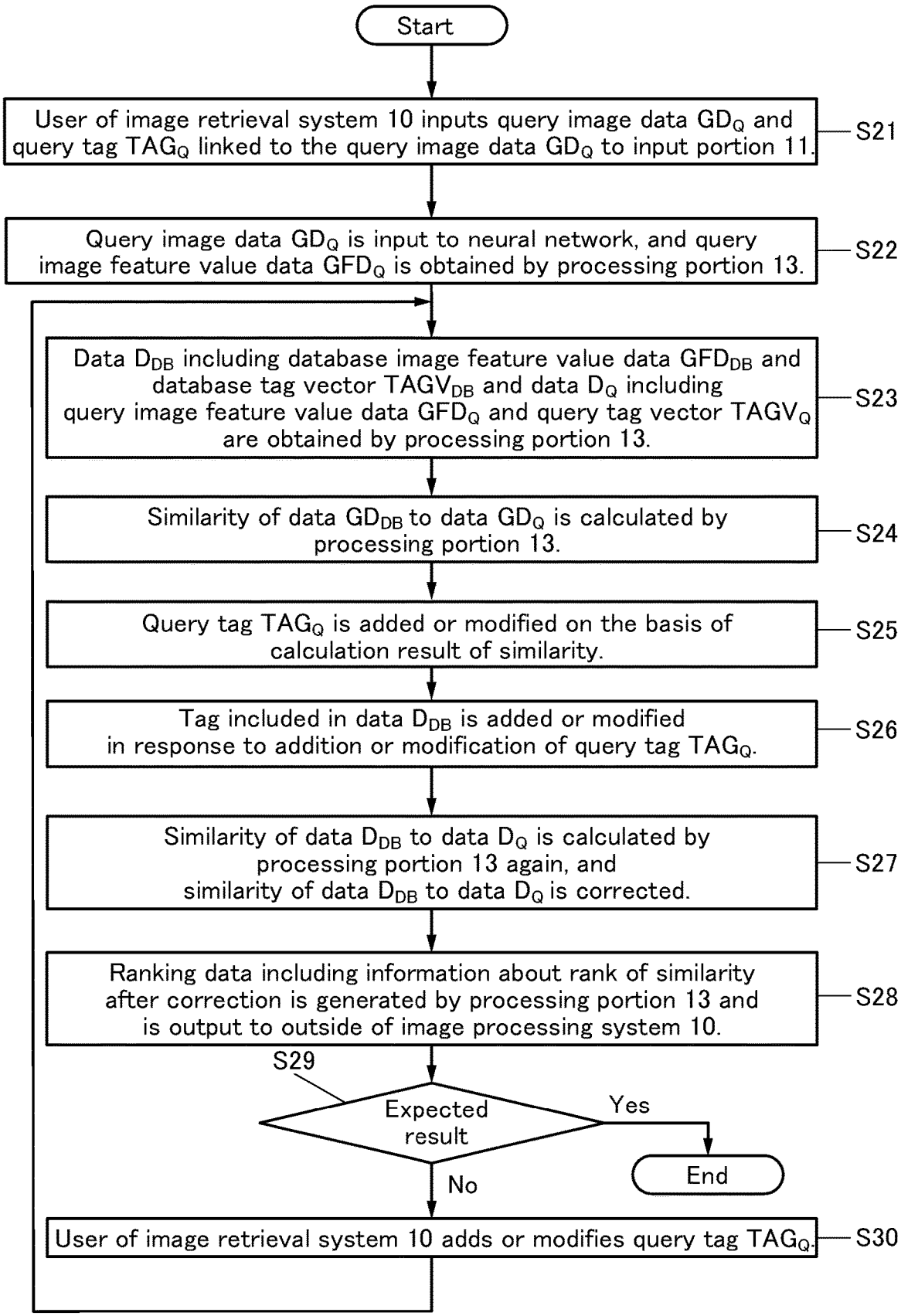
FIG. 14 is a flow chart showing an example of an image retrieval method.

In the image retrieval method shown in FIG. 9 or the like, a user of the image retrieval system 10 does not input the query tags $TAG_Q$; however, one embodiment of the present invention is not limited thereto. FIG. 14 is a flow chart showing an example of the image retrieval method using the image retrieval system 10 in the case where the user of the image retrieval system 10 inputs some of the query tags $TAG_Q$ manually. Note that in the case where the image retrieval system 10 is operated by the method shown in FIG. 14, the processing shown in FIG. 2 is preferably performed in advance, as in the case where the image retrieval system 10 is operated by the image retrieval method shown in FIG. 9.

[Step S21]

First, the user of the image retrieval system 10 inputs the query image data $GD_Q$ and the query tags $TAG_Q$ to the input portion 11. The number of query tags $TAG_Q$ and the contents of the query tags $TAG_Q$ input by the user of the image retrieval system 10 can be freely set by the user. The number of query tags $TAG_Q$ including the query tags $TAG_Q$ obtained automatically in a later step may be set by the user.

FIG. 15 is a diagram illustrating the input of the query image data $GD_Q$ and the query tags $TAG_Q$ to the input portion 11. In the case of FIG. 15, the user of the image retrieval system 10 inputs the query image data $GD_Q$ and two query tags $TAG_Q$, "circuit diagram" and "semiconductor", representing the query image data $GD_Q$.

Here, a change of the query tags $TAG_Q$ input to the input portion 11 can change the calculation results of the similarity of the database image data $GD_{DB}$ to the query image data $GD_Q$. For example, in the case where the query tag $TAG_Q$ "capacitor" is input to the input portion 11, the similarity of database image data representing a circuit diagram in which a capacitor is not illustrated can be decreased.

[Step S22]

Next, the query image data $GD_Q$ is input to the neural network included in the processing portion 13. For example, the query image data $GD_Q$ can be input to the neural network 30 having the structure illustrated in FIG. 3A or FIG. 3B.

This allows the processing portion 13 to obtain the query image feature value data $GFD_Q$ representing the feature value of the query image data $GD_Q$.

[Step S23]

Next, the data $D_{DB}$ including the database image feature value data $GFD_{DB}$ and the database tag vectors $TAGV_{DB}$ is obtained by the processing portion 13. In addition, the data $D_Q$ including the query image feature value data $GFD_Q$ and the query tag vectors $TAGV_Q$ is obtained by the processing portion 13.

Here, in the case where the number of database tags $TAG_{DB}$ linked to one piece of the database image data $GD_{DB}$ is larger than the number of query tags $TAG_Q$ input to the input portion 11, the tags included in the data $D_{DB}$ are selected from the tags linked to the database image data $GD_{DB}$. For example, five database tags $TAG_{DB}$ are linked to one piece of the database image data $GD_{DB}$. The number of query tags $TAG_Q$ input to the input portion 11 is two. In that case, the tag with the highest TF-IDF and the tag with the second highest TF-IDF among the five database tags $TAG_{DB}$ are used as the tags included in the data $D_{DB}$, for example.

[Step S24]

Next, the processing portion 13 calculates similarity of the data $GD_{DB}$ to the data $GD_Q$. The similarity can be calculated by a method similar to the method illustrated in FIG. 13.

[Step S25]

Next, the query tags $TAG_Q$ are added or modified on the basis of the calculation results of the similarity of the data $D_{DB}$ to the data $D_Q$.

FIG. 16A and FIG. 16B are diagrams showing an example of a method for adding the query tags $TAG_Q$. First, as shown in FIG. 16A, the data $D_{DB}$ are sorted on the basis of the similarity calculated in Step S24. FIG. 16A shows an example in which 100 pieces of the data $D_{DB}$ are sorted. For example, the data $D_{DB}$ are sorted in descending order of the similarity to the data $D_Q$. In the case of FIG. 16A, the data $D_{DB}[2]$ has the highest similarity of 0.999, the data $D_{DB}[41]$ has the second highest similarity of 0.971, the data $D_{DB}[53]$ has the third highest similarity of 0.964, the data $D_{DB}[22]$ has the fourth highest similarity of 0.951, and the data $D_{DB}[88]$ has the fifth highest similarity of 0.937.

Next, the database tags $TAG_{DB}$ linked to the database image data $GD_{DB}$ with high similarity included in the data $D_{DB}$ are extracted. In the case of FIG. 16A, the database tags $TAG_{DB}$ linked to the database image data $GD_{DB}$ with the highest similarity to the fifth highest similarity included in the data $D_{DB}$ are extracted. Specifically, the tags "aaa", "bbb", "ccc", "ddd", and "eee" linked to the database image data $GD_{DB}[2]$, the tags "aaa", "ccc", "fff", "ggg", and "hhh" linked to the database image data $GD_{DB}[41]$, the tags "aaa", "bbb", "fff", "iii", and "kkk" linked to the database image data $GD_{DB}[53]$, the tags "aaa", "ccc", "ggg", "ppp", and "qqq" linked to the database image data $GD_{DB}[22]$, and the tags "aaa", "kkk", "rrr", "sss", and "ttt" linked to the database image data $GD_{DB}[88]$ are extracted. As in the case of FIG. 11A, some of the extracted tags may be identical.

After that, the number of appearances of each of the extracted tags is calculated as shown in FIG. 16B.

Next, as shown in FIG. 16B, a predetermined number of tags is further extracted from the extracted tags, and the extracted tags are used as new query tags $TAG_Q$. In the case of FIG. 16B, two tags ("circuit diagram" and "semiconductor") have been obtained as the query tags $TAG_Q$ in Step S21. Then, three tags are added, so that the number of query tags $TAG_Q$ can be five, which is the same as the number of database tags $TAG_{DB}$ linked to one piece of the database image data $GD_{DB}$.

The new query tags $TAG_Q$ can be extracted by a method similar to the method shown in FIG. 11B. For example, the tags can be extracted in descending order of the number of appearances. In the case where a plurality of tags with the same number of appearances exist but not all of the plurality of tags can be extracted, the tags linked to the database image data $GD_{DB}$ included in the data $D_{DB}$ with higher similarity can be extracted, for example. In the case of FIG. 16B, the tags "aaa", "bbb", and "ccc" can be extracted as the new query tags $TAG_Q$.

The summary of the above description is as follows: in the case of FIG. 16B, five tags, i.e., the tags "circuit diagram" and "semiconductor" input to the input portion 11 by the user of the image retrieval system 10 in Step S21 and the tags "aaa", "bbb", and "ccc", can be used as the new query tags $TAG_Q$.

Note that some or all of the tags input to the input portion 11 by the user of the image retrieval system 10 may be deleted from the query tags $TAG_Q$. For example, the tags "circuit diagram" and "semiconductor" may be deleted from the tags $TAG_Q$ and five tags may be extracted as new tags $TAG_Q$ from the tags shown in FIG. 16B. In that case, for example, the tags "aaa", "bbb", "ccc", "fff", and "ggg" can be used as new tags $TAG_Q$.

[Step S26]

Next, the tags included in the data $D_{DB}$ are added or modified in response to the addition or modification of the query tags $TAG_Q$. For example, the number of database tag vectors $TAGV_{DB}$ included in one piece of the data $D_{DB}$ is made to be equal to the number of query tags $TAG_Q$.

[Step S27]

Next, the processing portion 13 calculates the similarity of the data $GD_{DB}$ to the data $GD_Q$ again. The similarity can be calculated by a method similar to the method in Step S24. Thus, the similarity of the data $GD_{DB}$ to the data $GD_Q$ can be corrected.

[Step S28]

Next, ranking data including information about ranks of the similarity after the correction calculated in Step S27 is generated by the processing portion 13 and is output as retrieval results to the outside of the image retrieval system 10. Accordingly, the user of the image retrieval system 10 can check ranks of the similarity of the database images to the query image, the values of the similarity, the retrieved database images, the tags, and the like, for example.

[Step S29 and Step S30]

Next, whether the ranking data matches an expected result is checked by the user of the image retrieval system 10. In the case of the expected result, the retrieval is finished. In the case where the expected result is not obtained, the user of the image retrieval system 10 adds or modifies the query tags $TAG_Q$, for example, and then the processing returns to Step S23. The above is an example of the image retrieval method using the image retrieval system 10.

This embodiment can be combined with the other embodiment as appropriate. In this specification, in the case where a plurality of structure examples are shown in one embodiment, the structure examples can be combined as appropriate.

Embodiment 2

In Embodiment 1, the image retrieval system 10 calculates the similarity of the database image data $GD_{DB}$ to the query image data $GD_Q$ by comparison between the entire area of the database image data $GD_{DB}$ and the entire area of the query image data $GD_Q$; however, one embodiment of the present invention is not limited thereto. For example, the similarity of the database image data $GD_{DB}$ to the query image data $GD_Q$ may be calculated by comparison between part of the area of the database image data $GD_{DB}$ and the entire area of the query image data $GD_Q$. Alternatively, the similarity of the database image data $GD_{DB}$ to the query image data $GD_Q$ may be calculated by comparison between the entire area of the database image data $GD_{DB}$ and part of the area of the query image data $GD_Q$.

<2-1. Image Retrieval Method 3>

Figure 17:
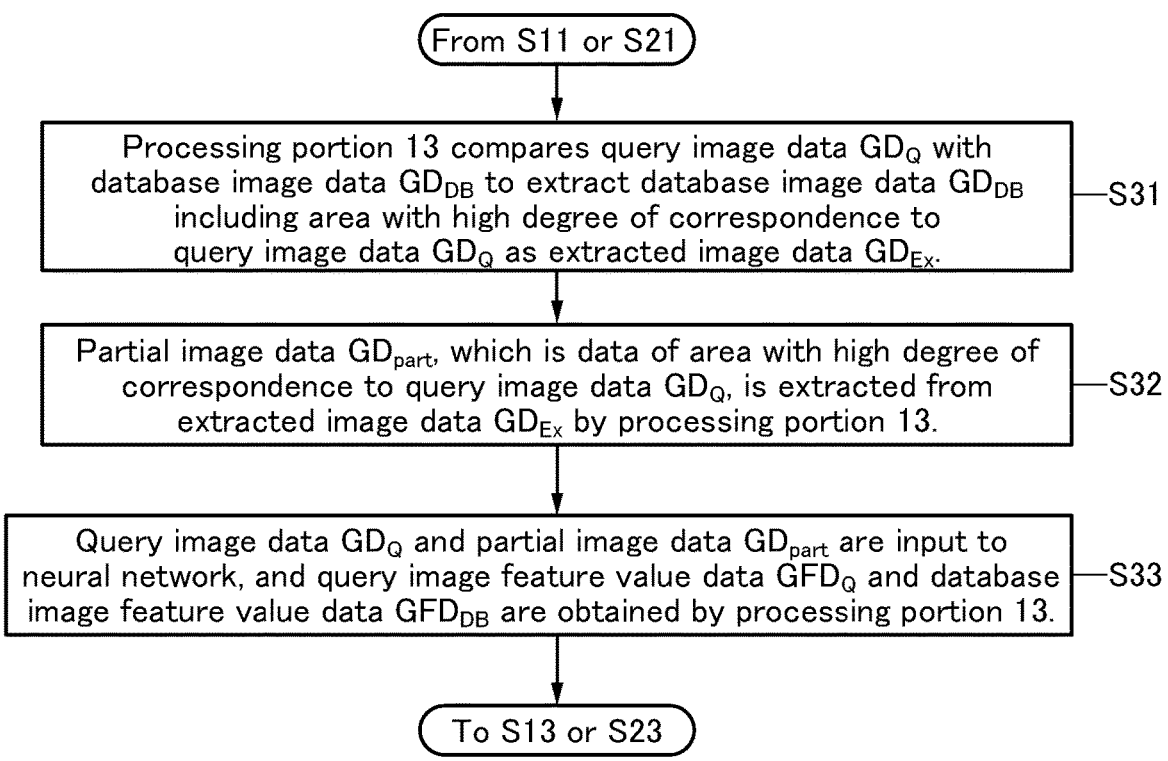
FIG. 17 is a flow chart showing an example of an image retrieval method.

FIG. 17 is an example of the image retrieval method using the image retrieval system 10 in the case where the similarity of the database image data $GD_{DB}$ to the query image data $GD_Q$ is calculated by comparison between part of the area of the database image data $GD_{DB}$ and the entire area of the query image data $GD_Q$. First, the image retrieval system 10 performs Step S11 in FIG. 9 or Step 21 in FIG. 14.

[Step S31]

Next, the processing portion 13 compares the query image data $GD_Q$ with the database image data $GD_{DB}$ to extract the database image data $GD_{DB}$ including an area with a high degree of correspondence to the query image data $GD_Q$. Here, the extracted database image data $GD_{DB}$ is referred to as extracted image data $GD_{Ex}$. The comparison between the query image data $GD_Q$ and the database image data $GD_{DB}$ can be performed by area-based matching, for example.

Figure 18A:
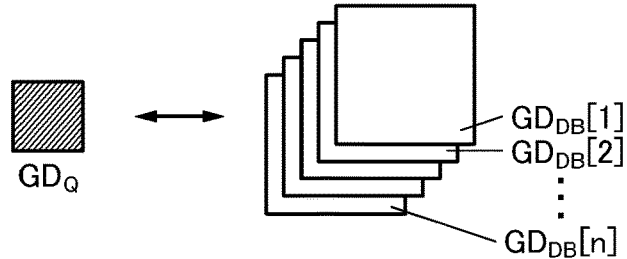
FIG. 18A and FIG. 18B are diagrams illustrating an example of an image retrieval method.

An operation example of Step S31 is described in detail with reference to FIG. 18 to FIG. 20. In Step S31, the query image data $GD_Q$ is compared with each of n pieces (n is an integer greater than or equal to 1) of the database image data $GD_{DB}$, as illustrated in FIG. 18A. Here, n may be less than or equal to the number of pieces of the database image data $GD_{DB}$ stored in the database 17. Furthermore, n may be greater than the number of pieces of the database image data $GD_{DB}$ stored in the database 17. In that case, the query image data $GD_Q$ is compared with the image data stored in the memory portion 15 or the image data input from the outside of the image retrieval system 10 to the processing portion 13 through the input portion 11 as well as the database image data $GD_{DB}$ stored in the database 17. Note that even when n is less than or equal to the number of pieces of the database image data $GD_{DB}$, the query image data $GD_Q$ may be compared with the image data stored in the memory portion 15 or the image data input from the outside of the image retrieval system 10 to the processing portion 13 through the input portion 11.

In the case where n is small, the operation of Step S31 can be performed in a short time. By contrast, in the case where n is large, the database image data $GD_{DB}$ including an area with a high degree of correspondence to the query image data $GD_Q$ can be extracted with high accuracy.

Figure 18B:
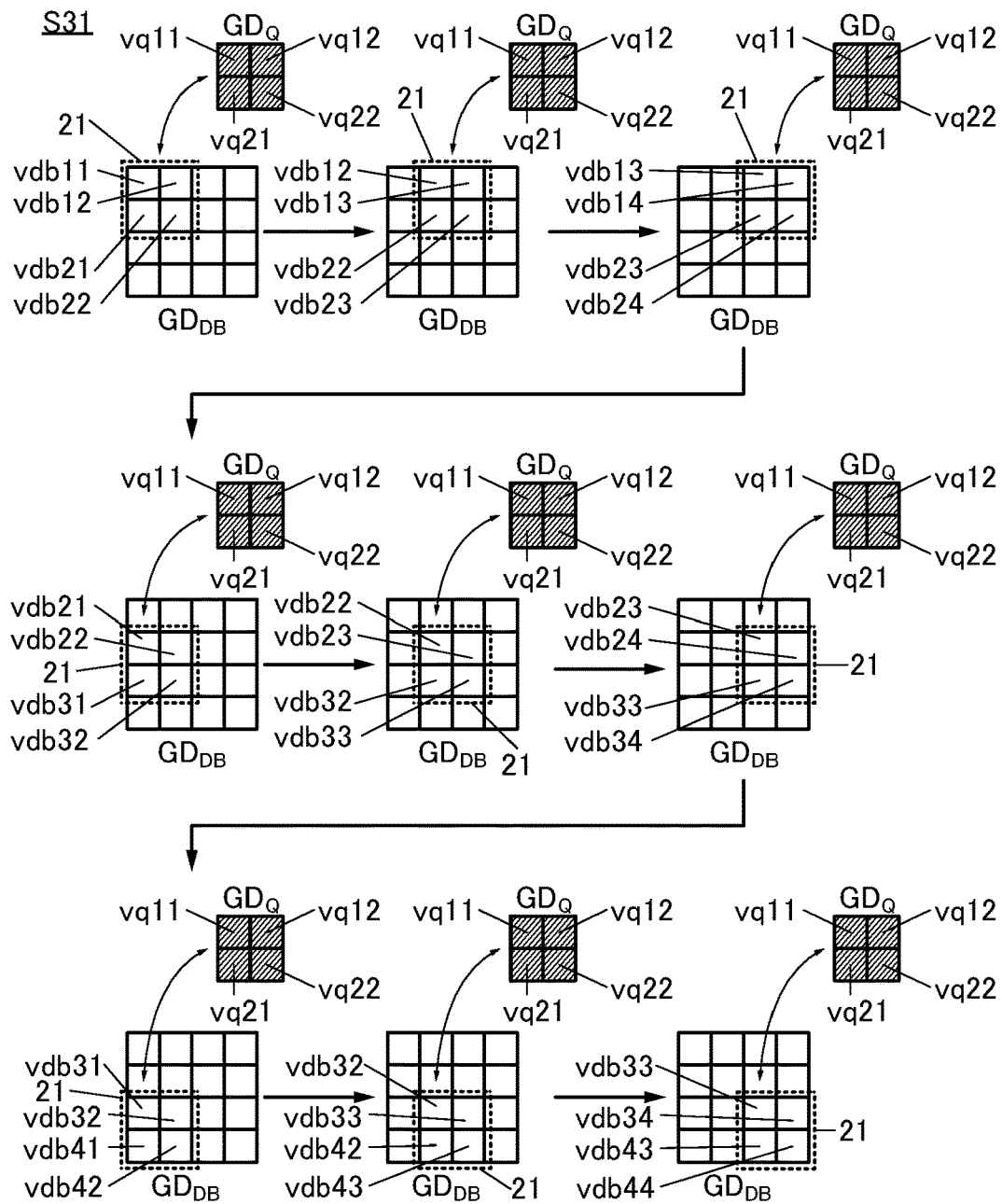

FIG. 18B is a diagram illustrating a procedure in which the query image data $GD_Q$ and the database image data $GD_{DB}$ are compared by area-based matching. Here, the number of pixels of the image corresponding to the query image data $GD_Q$ is 2×2, and the number of pixels of the image corresponding to the database image data $GD_{DB}$ is 4×4. In other words, the query image data $GD_Q$ includes 2×2 pixel values and the database image data $GD_{DB}$ includes 4×4 pixel values.

In FIG. 18B, the 2×2 pixel values included in the query image data $GD_Q$ are referred to as a pixel value vq11, a pixel value vq12, a pixel value vg21, and a pixel value vg22. In the query image data $GD_Q$, the pixel value vq1 is a pixel value corresponding to a pixel in a first row and a first column, the pixel value vq12 is a pixel value corresponding to a pixel in the first row and a second column, the pixel value vg21 is a pixel value corresponding to a pixel in a second row and the first column, and the pixel value vg22 is a pixel value corresponding to a pixel in the second row and the second column, for example. The 4×4 pixel values included in the database image data $GD_{DB}$ are referred to as a pixel value vdb11 to a pixel value vdb44. In the database image data $GD_{DB}$, the pixel value vdb11 is a pixel value corresponding to a pixel in a first row and a first column, the pixel value vdb14 is a pixel value corresponding to a pixel in the first row and a fourth column, the pixel value vdb41 is a pixel value corresponding to a pixel in a fourth row and the first column, and the pixel value vdb44 is a pixel value corresponding to a pixel in the fourth row and the fourth column, for example.

First, the pixel value vq11, the pixel value vq12, the pixel value vg21, and the pixel value vg22 are compared with the pixel value vdb11, the pixel value vdb12, the pixel value vdb21, and the pixel value vdb22. Consequently, the degree of correspondence between the query image data $GD_Q$ and an area formed of the pixel value vdb11, the pixel value vdb12, the pixel value vdb21, and the pixel value vdb22 in the database image data $GD_{DB}$ can be calculated. Note that in FIG. 18B, pixel values compared with the query image data $GD_Q$, which are among the pixel values included in the database image data $GD_{DB}$, are referred to as a compared data area 21 surrounded by a dashed line.

Next, the compared data area 21 shifts by one column at a time in the pixel values included in the database image data $GD_{DB}$, and comparison between the pixel values is performed as described above to calculate the degree of correspondence. Specifically, the pixel value vq11, the pixel value vq12, the pixel value vg21, and the pixel value vg22 are compared with the pixel value vdb12, the pixel value vdb13, the pixel value vdb22, and the pixel value vdb23. Consequently, the degree of correspondence between the query image data $GD_Q$ and an area formed of the pixel value vdb12, the pixel value vdb13, the pixel value vdb22, and the pixel value vdb23 in the database image data $GD_{DB}$ can be calculated.

After that, the compared data area 21 shifts by one column at a time in the pixel values included in the database image data $GD_{DB}$, and comparison between the pixel values is performed as described above to calculate the degree of correspondence. Specifically, the pixel value vq11, the pixel value vq12, the pixel value vg21, and the pixel value vg22 are compared with the pixel value vdb13, the pixel value vdb14, the pixel value vdb23, and the pixel value vdb24. Consequently, the degree of correspondence between the query image data $GD_Q$ and an area formed of the pixel value vdb13, the pixel value vdb14, the pixel value vdb23, and the pixel value vdb24 in the database image data $GD_{DB}$ can be calculated.

Next, the compared data area 21 shifts by one row at a time in the pixel values included in the database image data $GD_{DB}$, and pixel values in the second row and pixel values in the third row in the database image data $GD_{DB}$ are compared with the pixel values of the query image data $GD_Q$ as described above for each column. Consequently, the degree of correspondence between the query image data $GD_Q$ and the area formed of the pixel values in the second row and the third row in the database image data $GD_{DB}$ can be calculated as described above for each column.

After that, the compared data area 21 shifts by one row at a time in the pixel values included in the database image data $GD_{DB}$, and the pixel values in the third row and pixel values in the fourth row in the database image data $GD_{DB}$ are compared with the pixel values of the query image data $GD_Q$ as described above for each column. Consequently, the degree of correspondence between the query image data $GD_Q$ and the pixel values in the third row and the fourth row included in the database image data $GD_{DB}$ can be calculated as described above for each column.

After the above operation is performed, the highest degree of correspondence is regarded as the degree of correspondence of the database image data $GD_{DB}$ to the query image data $GD_Q$, for example. The above is performed on each of the n pieces of the database image data $GD_{DB}$. After that, the database image data $GD_{DB}$ with a high degree of correspondence to the query image data $GD_Q$ is extracted as the extracted image data $GD_{Ex}$ from the n pieces of the database image data $GD_{DB}$. For example, a prescribed number of pieces of the database image data $GD_{DB}$ may be extracted as the extracted image data $GD_{Ex}$ in descending order of the degree of correspondence. Alternatively, for example, the database image data $GD_{DB}$ with a degree of correspondence to the query image data $GD_Q$, which is higher than or equal to a prescribed value, may be extracted as the extracted image data $GD_{Ex}$.

The extraction of the database image data $GD_{DB}$ may be omitted. In other words, the database image data $GD_{DB}$ compared with the query image data $GD_Q$ can all be the extracted image data $GD_{Ex}$.

Figure 19:
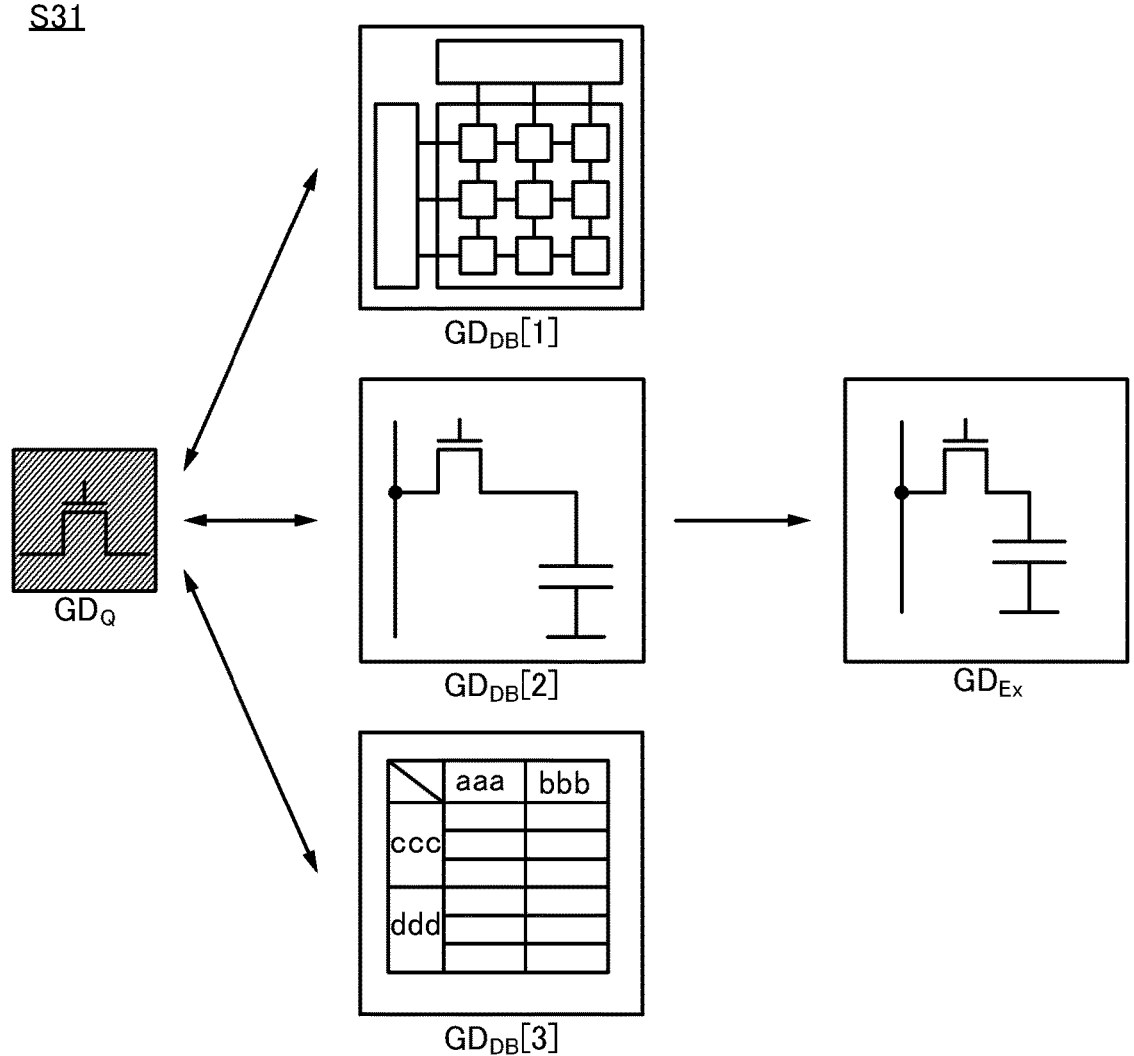
FIG. 19 is a diagram illustrating an example of an image retrieval method.

FIG. 19 is a diagram illustrating the extraction of the database image data $GD_{DB}$. FIG. 19 illustrates an example in which one piece of image data is extracted as the extracted image data $GD_{Ex}$ from the database image data $GD_{DB}[1]$ to the database image data $GD_{DB}[3]$.

An image corresponding to the query image data $GD_Q$ illustrated in FIG. 19 includes a transistor symbol, for example. An image corresponding to the database image data $GD_{DB}[2]$ illustrated in FIG. 19 includes a transistor symbol, while an image corresponding to the database image data $GD_{DB}[1]$ and an image corresponding to the database image data $GD_{DB}[3]$ do not include a transistor symbol. In that case, the degree of correspondence of the database image data $GD_{DB}[2]$ to the query image data $GD_Q$ is higher than the degrees of correspondence of the database image data $GD_{DB}[1]$ and the database image data $GD_{DB}[3]$ to the query image data $GD_Q$. Thus, the database image data $GD_{DB}[2]$ can be extracted as the extracted image data $GD_{Ex}$.

Note that comparison between the query image data $GD_Q$ and the database image data $GD_{DB}$ and calculation of the degree of correspondence can be performed by SAD (Sum of Absolute Differences), SSD (Sum of Squared Differences), NCC (Normalized Cross Correlation), ZNCC (Zero-mean Normalized Cross Correlation), POC (Phase-Only Correlation), or the like.

Although the compared data area 21 shifts by one column or one row at a time in the pixel values included in the database image data $GD_{DB}$ in FIG. 18B, one embodiment of the present invention is not limited thereto. The compared data area 21 may shift by two or more columns or two or more rows at a time in the pixel values included in the database image data $GD_{DB}$. For example, immediately after the pixel value vg11, the pixel value vq12, the pixel value vg21, and the pixel value vg22 are compared with the pixel value vdb11, the pixel value vdb12, the pixel value vdb21, and the pixel value vdb22, the pixel value vq11, the pixel value vq12, the pixel value vg21, and the pixel value vg22 may be compared with the pixel value vdb13, the pixel value vdb14, the pixel value vdb23, and the pixel value vdb24. In that case, comparison of the pixel value vq11, the pixel value vq12, the pixel value vg21, and the pixel value vg22 with the pixel value vdb12, the pixel value vdb13, the pixel value vdb22, and the pixel value vdb23 is not performed. In addition, immediately after the pixel value vg11, the pixel value vq12, the pixel value vg21, and the pixel value vg22 are compared with the pixel value vdb13, the pixel value vdb14, the pixel value vdb23, and the pixel value vdb24, the pixel value vq11, the pixel value vq12, the pixel value vg21, and the pixel value vg22 may be compared with the pixel value vdb31, the pixel value vdb32, the pixel value vdb41, and the pixel value vdb42.

An increase in the shift width of the compared data area 21 can reduce the number of arithmetic operations for the comparison between the pixel values included in the query image data $GD_Q$ and the pixel values included in the database image data $GD_{DB}$. Accordingly, the degree of correspondence of the database image data $GD_{DB}$ to the query image data $GD_Q$ can be calculated in a short time.

Although FIG. 18A illustrates an example in which one piece of the query image data $GD_Q$ is compared with each of the n pieces of the database image data $GD_{DB}$, one embodiment of the present invention is not limited thereto. As illustrated in FIG. 20A, a plurality of pieces of the query image data $GD_Q$ that differ in the number of pixel values may be generated on the basis of the query image data $GD_Q$ input to the processing portion 13. FIG. 20A illustrates an example in which query image data $GD_Q[1]$, query image data $GD_Q[2]$, and query image data $GD_Q[3]$, which differ in the number of pixel values, are generated on the basis of the query image data $GD_Q$ input to the processing portion 13. As illustrated in FIG. 20A, the number of pixels of an image corresponding to the query image data $GD_Q[1]$, the number of pixels of an image corresponding to the query image data $GD_Q[2]$, and the number of pixels of an image corresponding to the query image data $GD_Q[3]$ are different from each other. In other words, the images corresponding to the query image data $GD_Q[1]$ to the query image data $GD_Q[3]$ can be regarded as enlarged or reduced images of the image corresponding to the query image data $GD_Q$ input to the processing portion 13.

In the case where a plurality of pieces of the query image data $GD_Q$ are generated, each of the plurality of pieces of the query image data $GD_Q$ is compared with the database image data $GD_{DB}[1]$ to the database image data $GD_{DB}[n]$. Thus, the degrees of correspondence of the database image data $GD_{DB}[1]$ to the database image data $GD_{DB}[n]$ to each of the plurality of pieces of the query image data $GD_Q$ can be calculated. The highest degree of correspondence among the above degrees of correspondence to the plurality of pieces of the query image data $GD_Q$ can be regarded as the degree of correspondence of the database image data $GD_{DB}$ to the query image data $GD_Q$ input to the processing portion 13, for example.

For example, in the case of FIG. 20A, the query image data $GD_Q[1]$ is compared with each of the database image data $GD_{DB}[1]$ to the database image data $GD_{DB}[n]$, the query image data $GD_Q[2]$ is compared with each of the database image data $GD_{DB}[1]$ to the database image data $GD_{DB}[n]$, and the query image data $GD_Q[3]$ is compared with each of the database image data $GD_{DB}[1]$ to the database image data $GD_{DB}[n]$. Thus, the degree of correspondence to the query image data $GD_Q[1]$, the degree of correspondence to the query image data $GD_Q[2]$, and the degree of correspondence to the query image data $GD_Q[3]$ can be calculated for each of the database image data $GD_{DB}[1]$ to the database image data $GD_{DB}[n]$.

For example, the highest degree of correspondence among the degree of correspondence to the query image data $GD_Q[1]$, the degree of correspondence to the query image data $GD_Q[2]$, and the degree of correspondence to the query image data $GD_Q[3]$ can be regarded as the degree of correspondence of the database image data $GD_{DB}$ to the query image data $GD_Q$ input to the processing portion 13. For example, the highest degree of correspondence among the degree of correspondence of the database image data $GD_{DB}[1]$ to the query image data $GD_Q[1]$, the degree of correspondence thereof to the query image data $GD_Q[2]$, and the degree of correspondence thereof to the query image data $GD_Q[3]$ can be regarded as the degree of correspondence of the database image data $GD_{DB}[1]$ to the query image data $GD_Q$ input to the processing portion 13.

Even in the case where the same component is illustrated in the image corresponding to the query image data $GD_Q$ and the image corresponding to the database image data $GD_{DB}$, when the size of the component differs between the images, the database image data $GD_{DB}$ is possibly judged not to include an area with a high degree of correspondence to the query image data $GD_Q$. In the case of FIG. 20B1, the same components, which are transistor symbols, are illustrated in both the image corresponding to the query image data $GD_Q$ and the image corresponding to the database image data $GD_{DB}$. However, the size of the transistor symbol illustrated in the image corresponding to the query image data $GD_Q$ and the size of the transistor symbol illustrated in the image corresponding to the database image data $GD_{DB}$ are different from each other. In that case, the degree of correspondence of the database image data $GD_{DB}$ to the query image data $GD_Q$ is possibly judged to be low.

By contrast, in the case of FIG. 20B2, the same components, which are transistor symbols, are illustrated in both the image corresponding to the query image data $GD_Q$ and the image corresponding to the database image data $GD_{DB}$ and the components also have the same size. Hence, the database image data $GD_{DB}$ can be judged to include an area with a high degree of correspondence to the query image data $GD_Q$ by the processing portion 13.

As illustrated in FIG. 20A, when the plurality of pieces of the query image data $GD_Q$ that differ in the number of pixel values are generated, the size of the component illustrated in the image corresponding to the query image data $GD_Q$ can be enlarged or reduced. Thus, even in the case where the same components are illustrated in the image corresponding to the query image data $GD_Q$ input to the processing portion 13 and the image corresponding to the database image data $GD_{DB}$ in different sizes, the degree of correspondence between the both images can be high. For example, in the case where the query image data $GD_Q$ illustrated in FIG. 20B1 is input to the processing portion 13, the query image data $GD_Q$ illustrated in FIG. 20B2 is generated by a change in the number of pixel values included in the query image data $GD_Q$ so that the degree of correspondence of the database image data $GD_{DB}$ to the query image data $GD_Q$ can be high. As described above, the degree of correspondence of the database image data $GD_{DB}$ to the query image data $GD_Q$ input to the processing portion 13 can be calculated with high accuracy.

[Step S32]

Next, partial image data $GD_{part}$, which is data of an area with a high degree of correspondence to the query image data $GD_Q$, is extracted from the extracted image data $GD_{Ex}$ by the processing portion 13. For example, in the case where the degrees of correspondence of the areas of the database image data $GD_{DB}$ to the query image data $GD_Q$ are each calculated by the method illustrated in FIG. 18B, the area with the highest degree of correspondence is extracted as the partial image data $GD_{part}$. Thus, the number of pixel values included in the partial image data $GD_{part}$ can be equal to the number of pixel values included in the query image data $GD_Q$.

Figure 21A:
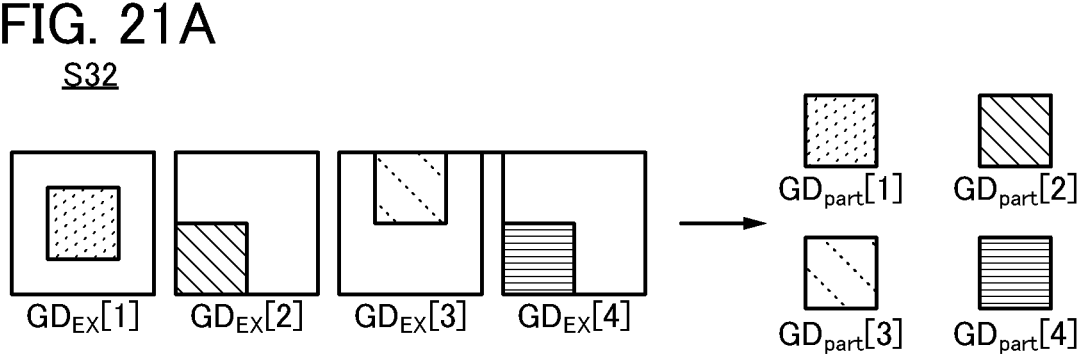
FIG. 21A and FIG. 21B are diagrams illustrating examples of an image retrieval method.
Figure 21B:
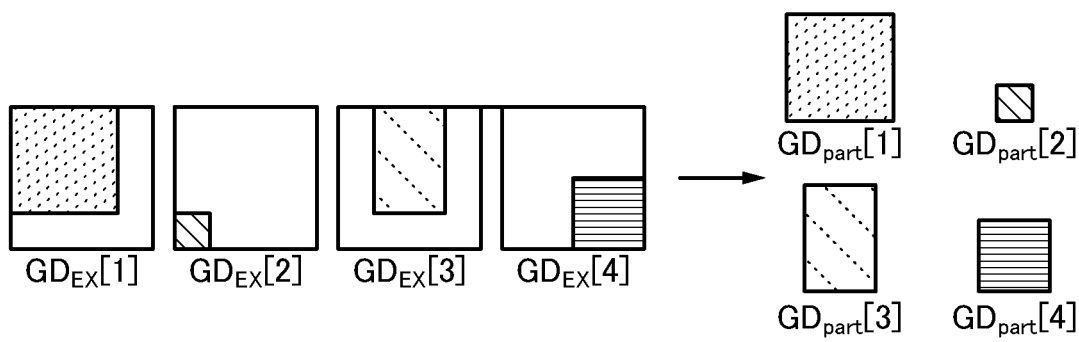

FIG. 21A and FIG. 21B are diagrams illustrating operation examples of Step S32. Areas with high degrees of correspondence to the query image data $GD_Q$ in extracted image data $GD_{Ex}[1]$ to extracted image data $GD_{Ex}[4]$ are hatched as illustrated in FIG. 21A and FIG. 21B. As illustrated in FIG. 21A and FIG. 21B, the hatched areas can be extracted to be partial image data $GD_{part}[1]$ to partial image data $GD_{part}[4]$. In FIG. 21A and FIG. 21B, image data extracted from the extracted image data $GD_{Ex}[1]$ to the extracted image data $GD_{Ex}[4]$ are referred to as the partial image data $GD_{part}[1]$ to the partial image data $GD_{part}[4]$, respectively.

FIG. 21A illustrates an example in which one piece of the query image data $GD_Q$ is compared with the database image data $GD_{DB}$ as illustrated in FIG. 18A. In that case, the images corresponding to the partial image data $GD_{part}$ can all have the same number of pixels.

FIG. 21B illustrates an example in which the plurality of pieces of the query image data $GD_Q$ that differ in the number of pixel values are compared with the database image data $GD_{DB}$ as illustrated in FIG. 20A. In that case, the number of pixels of the images corresponding to the partial image data $GD_{part}$ can be equal to the number of pixels of the image corresponding to the query image data $GD_Q$ with the highest degree of correspondence, for example. Thus, in the case where there are a plurality of pieces of the partial image data $GD_{part}$, the numbers of pixels of the images corresponding to the partial image data $GD_{part}$ may differ depending on the partial image data $GD_{part}$. FIG. 21B illustrates an example in which the numbers of pixels of the images corresponding to the partial image data $GD_{part}[1]$ to the partial image data $GD_{part}[4]$ are different from each other.

Note that the extraction of the partial image data $GD_{part}$ may be omitted. In that case, the partial image data $GD_{part}$ is rephrased as the extracted image data $GD_{Ex}$ as appropriate, so that the following description can be applied. Alternatively, the whole of the extracted image data $GD_{Ex}$ can be regarded as the partial image data $GD_{part}$. For example, when the number of pixel values included in one or both of the query image data $GD_Q$ and the extracted image data $GD_{Ex}$ is increased or decreased, the image retrieval method using the image retrieval system 10 can be executed without extraction of the partial image data $GD_{part}$.

[Step S33]

Next, the query image data $GD_Q$ is input to the neural network included in the processing portion 13, so that the query image feature value data $GFD_Q$ is obtained by the processing portion 13. Moreover, the partial image data $GD_{part}$ is input to the neural network included in the processing portion 13, so that the database image feature value data $GFD_{DB}$ is obtained by the processing portion 13. The query image data $GD_Q$ and the partial image data $GD_p$ an can be input to the neural network 30 having the structure illustrated in FIG. 3A or FIG. 3B, for example. Note that in the case where the image retrieval system 10 is operated by the method shown in FIG. 17, Step S02 shown in FIG. 2 is not necessarily performed. That is, the database image feature value data $GFD_{DB}$ representing the feature value of the entire area of the database image data $GD_{DB}$ is not necessarily obtained.

As described in Embodiment 1, the database image data $GD_{DB}$ can be used as learning data of the neural network 30. Here, the number of pixel values included in the image data used as the learning data is preferably equal to the number of pixel values included in the image data input to the neural network 30. Thus, the number of pixel values of the database image data $GD_{DB}$ or the like used as the learning data is preferably adjusted by being increased or decreased as needed when the neural network 30 performs learning. The number of pixel values included in the query image data $GD_Q$ or the partial image data $GD_{part}$ is preferably increased or decreased as needed when the query image data $GD_Q$ or the partial image data $GD_{part}$ is input to the neural network 30. Here, increasing the number of pixel values is preferably performed by padding, for example, and is preferably performed by zero padding, for example.

Figure 22A:
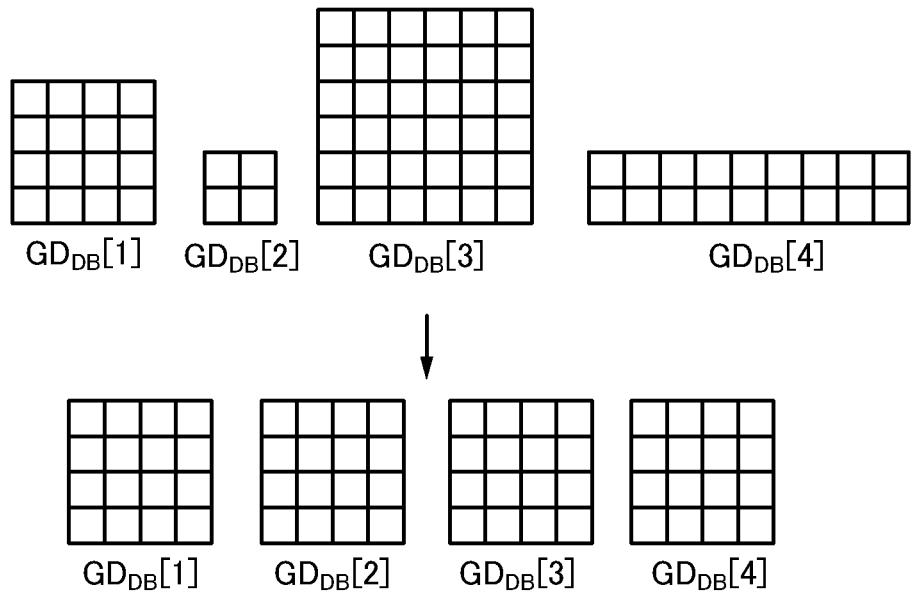
FIG. 22A and FIG. 22B are diagrams illustrating examples of an image retrieval method.

FIG. 22A is a diagram illustrating the adjustment of the number of pixel values included in the database image data $GD_{DB}$. In the case of FIG. 22A, the numbers of pixel values included in the database image data $GD_{DB}[1]$ to the database image data $GD_{DB}[4]$ are all different from each other. In that case, when the database image data $GD_{DB}[1]$ to the database image data $GD_{DB}[4]$ are used as the learning data of the neural network 30, the numbers of pixel values included in these image data are preferably equalized as illustrated in FIG. 22A.

Figure 22B:
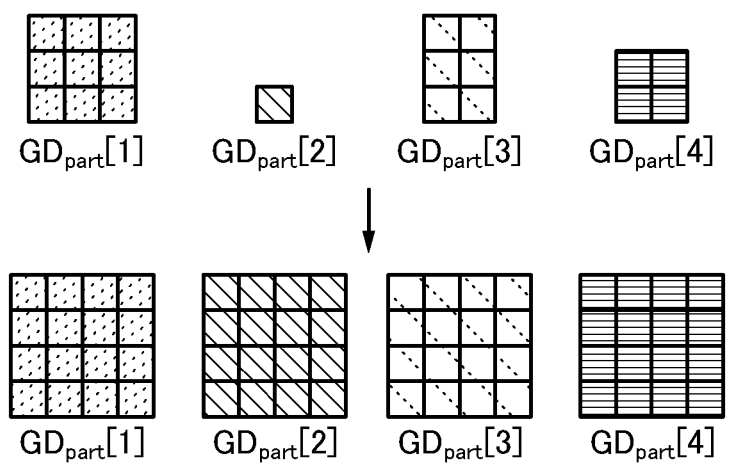

FIG. 22B is a diagram illustrating the adjustment of the number of pixel values included in the partial image data $GD_{part}$. The number of pixel values included in the partial image data $GD_{part}$ is preferably equalized to the number of pixel values included in the image data used for the learning in the neural network 30. Similarly, the number of pixel values included in the query image data $GD_Q$ is preferably equalized to the number of pixel values included in the image data used for the learning in the neural network 30 when the query image data $GD_Q$ is input to the neural network 30.

After Step S33 is performed, the image retrieval system 10 performs Step S13 in FIG. 9 or Step S23 in FIG. 14. Specifically, Step S13 is performed after Step S33 in the case where Step S11 is performed before Step S31, and Step S23 is performed after Step S33 in the case where Step S21 is performed before Step S31. The above is an example of the image retrieval method using the image retrieval system 10 in the case where the similarity of the database image data $GD_{DB}$ to the query image data $GD_Q$ is calculated by comparison between part of the area of the database image data $GD_{DB}$ and the entire area of the query image data $GD_Q$.

In the method shown in FIG. 17, the query image data $GD_Q$ is compared with the database image data $GD_{DB}$ by area-based matching or the like, and the database image data $GD_{DB}$ including an area with a high degree of correspondence to the query image data $GD_Q$ is extracted as the extracted image data $GD_{Ex}$. After that, the area with a high degree of correspondence is extracted as the partial image data $GD_{part}$ from the extracted image data $GD_{Ex}$, and the query image data $GD_Q$ and the partial image data $GD_{part}$ are input to the neural network included in the processing portion 13. By the extraction of the database image data $GD_{DB}$ in this manner, it is possible to inhibit input of the database image data $GD_{DB}$, which represents the database image that does not include an image with a high degree of correspondence to the image corresponding to the query image data $GD_Q$, to the neural network included in the processing portion 13. Thus, the database image partly including an image similar to the image corresponding to the query image data $GD_Q$ can be retrieved with high accuracy in a short time. Note that, for example, in the case where the number of pieces of the database image data $GD_{DB}$ compared with the query image data $GD_Q$ is small, the above retrieval can be performed with high accuracy in a short time even without the extraction of the database image data $GD_{DB}$.

<2-2. Image Retrieval Method 4>

Figure 23:
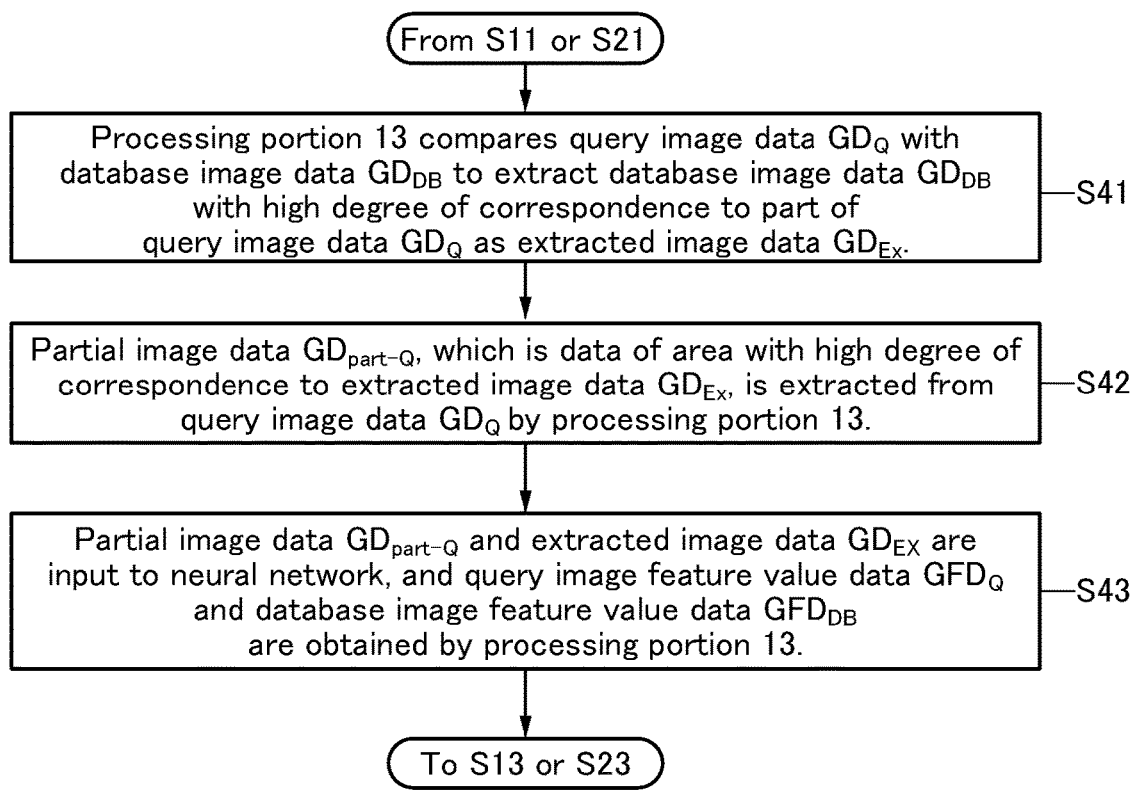
FIG. 23 is a flow chart showing an example of an image retrieval method.

FIG. 23 is an example of the image retrieval method using the image retrieval system 10 in the case where the similarity of the database image data $GD_{DB}$ to the query image data $GD_Q$ is calculated by comparison between the entire area of the database image data $GD_{DB}$ and part of the area of the query image data $GD_Q$. First, the image retrieval system 10 performs Step S11 in FIG. 9 or Step 21 in FIG. 14.

[Step S41]

Next, the processing portion 13 compares the query image data $GD_Q$ with the database image data $GD_{DB}$ to extract the database image data $GD_{DB}$ with a high degree of correspondence to part of the query image data $GD_Q$ as the extracted image data $GD_{Ex}$. As in Step S31, the comparison between the query image data $GD_Q$ and the database image data $GD_{DB}$ can be performed by area-based matching, for example.

Figure 24A:
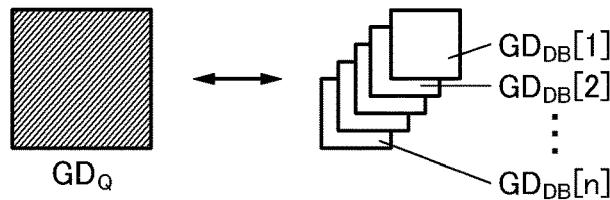
FIG. 24A and FIG. 24B are diagrams illustrating an example of an image retrieval method.

An operation example of Step S41 is described in detail with reference to FIG. 24 and FIG. 25. In Step S41, the query image data $GD_Q$ is compared with each of n pieces of the database image data $GD_{DB}$, as illustrated in FIG. 24A.

Figure 24B:
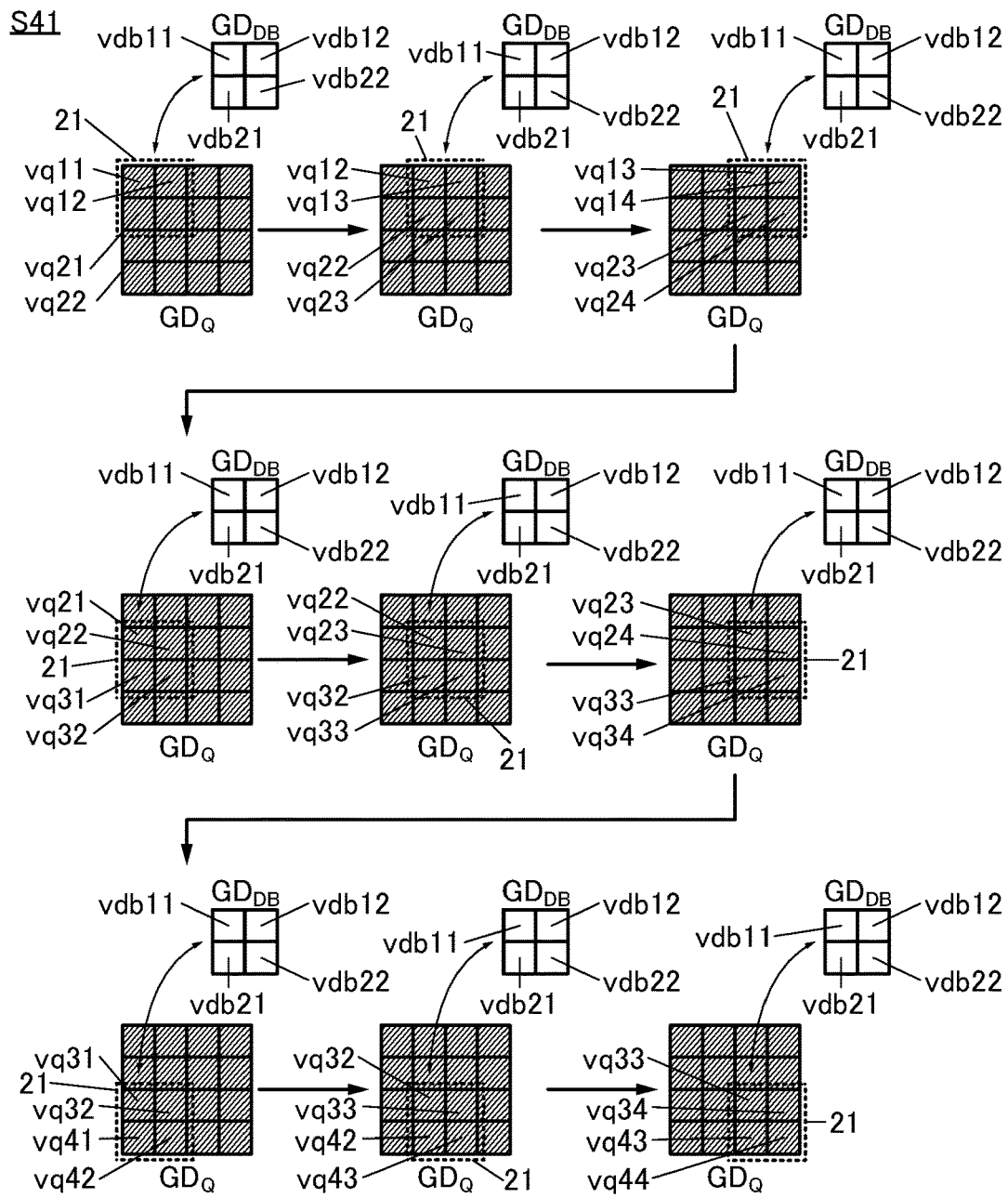

FIG. 24B is a diagram illustrating a procedure in which the query image data $GD_Q$ and the database image data $GD_{DB}$ are compared by area-based matching. Here, the number of pixels of the image corresponding to the query image data $GD_Q$ is 4×4, and the number of pixels of the image corresponding to the database image data $GD_{DB}$ is 2×2. In other words, the query image data $GD_Q$ includes 4×4 pixel values and the database image data $GD_{DB}$ includes 2×2 pixel values.

In FIG. 24B, the 4×4 pixel values included in the query image data $GD_Q$ are referred to as the pixel value vq11 to a pixel value vg44. In the query image data $GD_Q$, the pixel value vq11 is a pixel value corresponding to a pixel in a first row and a first column, the pixel value vq14 is a pixel value corresponding to a pixel in the first row and a fourth column, the pixel value vg41 is a pixel value corresponding to a pixel in a fourth row and the first column, and the pixel value vg44 is a pixel value corresponding to a pixel in the fourth row and the fourth column, for example. The 2×2 pixel values included in the database image data $GD_{DB}$ are referred to as the pixel value vdb11, the pixel value vdb12, the pixel value vdb21, and the pixel value vdb22. In the database image data $GD_{DB}$, the pixel value vdb11 is a pixel value corresponding to a pixel in a first row and a first column, the pixel value vdb12 is a pixel value corresponding to a pixel in the first row and a second column, the pixel value vdb21 is a pixel value corresponding to a pixel in a second row and the first column, and the pixel value vdb22 is a pixel value corresponding to a pixel in the second row and the second column, for example.

First, the pixel value vdb11, the pixel value vdb12, the pixel value vdb21, and the pixel value vdb22 are compared with the pixel value vg11, the pixel value vq12, the pixel value vg21, and the pixel value vg22. Consequently, the degree of correspondence between the database image data $GD_{DB}$ and an area formed of the pixel value vg11, the pixel value vq12, the pixel value vg21, and the pixel value vg22 in the query image data $GD_Q$ can be calculated. Note that in FIG. 24B, pixel values compared with the database image data $GD_{DB}$, which are among the pixel values included in the query image data $GD_Q$, are referred to as the compared data area 21 surrounded by a dashed line.

Next, the compared data area 21 shifts by one column at a time in the pixel values included in the query image data $GD_Q$, and comparison between the pixel values is performed as described above to calculate the degree of correspondence. Specifically, the pixel value vdb11, the pixel value vdb12, the pixel value vdb21, and the pixel value vdb22 are compared with the pixel value vq12, the pixel value vq13, the pixel value vg22, and the pixel value vg23. Consequently, the degree of correspondence between the database image data $GD_{DB}$ and an area formed of the pixel value vq12, the pixel value vq13, the pixel value vg22, and the pixel value vg23 in the query image data $GD_Q$ can be calculated.

After that, the compared data area 21 shifts by one column at a time in the pixel values included in the query image data $GD_Q$, and comparison between the pixel values is performed as described above to calculate the degree of correspondence. Specifically, the pixel value vdb11, the pixel value vdb12, the pixel value vdb21, and the pixel value vdb22 are compared with the pixel value vq13, the pixel value vq14, the pixel value vg23, and the pixel value vg24. Consequently, the degree of correspondence between the database image data $GD_{DB}$ and an area formed of the pixel value vq13, the pixel value vq14, the pixel value vg23, and the pixel value vg24 in the query image data $GD_Q$ can be calculated.

Next, the compared data area 21 shifts by one row at a time in the pixel values included in the query image data $GD_Q$, and pixel values in the second row and pixel values in the third row in the query image data $GD_Q$ are compared with the pixel values of the database image data $GD_{DB}$ as described above for each column. Consequently, the degree of correspondence between the database image data $GD_{DB}$ and the area formed of the pixel values in the second row and the third row in the query image data $GD_Q$ can be calculated as described above for each column.

After that, the compared data area 21 shifts by one row at a time in the pixel values included in the query image data $GD_Q$, and the pixel values in the third row and pixel values in the fourth row in the query image data $GD_Q$ are compared with the pixel values of the database image data $GD_{DB}$ as described above for each column. Consequently, the degree of correspondence between the database image data $GD_{DB}$ and the area formed of the pixel values in the third row and the fourth row in the query image data $GD_Q$ can be calculated as described above for each column.

After the above operation is performed, the highest degree of correspondence is regarded as the degree of correspondence of the database image data $GD_{DB}$ to the query image data $GD_Q$, for example. The above is performed on each of the n pieces of the database image data $GD_{DB}$. After that, as in Step S31, the database image data $GD_{DB}$ with a high degree of correspondence to the query image data $GD_Q$ is extracted as the extracted image data $GD_{Ex}$ from the n pieces of the database image data $GD_{DB}$. Note that as in Step S31, the extraction of the database image data $GD_{DB}$ may be omitted.

Figure 25:
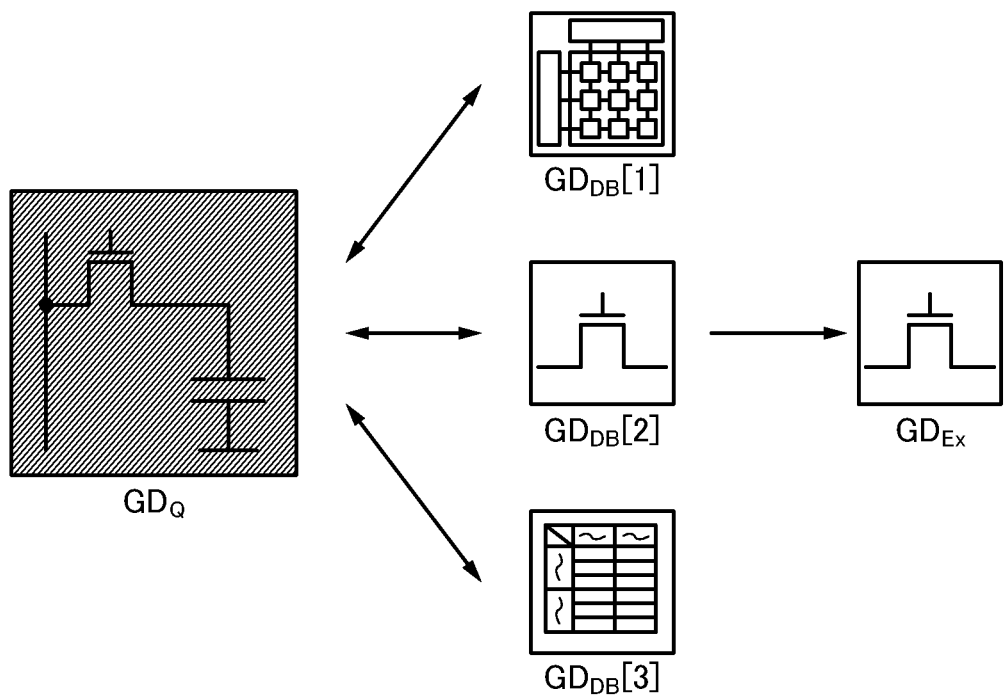
FIG. 25 is a diagram illustrating an example of an image retrieval method.

FIG. 25 is a diagram illustrating the extraction of the database image data $GD_{DB}$. FIG. 25 illustrates an example in which one piece of image data is extracted as the extracted image data $GD_{Ex}$ from the database image data $GD_{DB}[1]$ to the database image data $GD_{DB}[3]$.

An image corresponding to the query image data $GD_Q$ illustrated in FIG. 25 includes a transistor symbol and a capacitor symbol, for example. An image corresponding to the database image data $GD_{DB}[2]$ illustrated in FIG. 25 includes a transistor symbol, while an image corresponding to the database image data $GD_{DB}[1]$ and an image corresponding to the database image data $GD_{DB}[3]$ do not include a transistor symbol and a capacitor symbol. In that case, the degree of correspondence of the database image data $GD_{DB}[2]$ to the query image data $GD_Q$ is higher than the degrees of correspondence of the database image data $GD_{DB}[1]$ and the database image data $GD_{DB}[3]$ to the query image data $GD_Q$. Thus, the database image data $GD_{DB}[2]$ can be extracted as the extracted image data $GD_{Ex}$.

Note that a method similar to the method that can be used in Step S31 can be used for the comparison between the query image data $GD_Q$ and the database image data $GD_{DB}$ and the calculation of the degree of correspondence. Although the compared data area shifts by one column or one row at a time in the pixel values included in the query image data $GD_Q$ in FIG. 24B, the compared data area 21 may shift by two or more columns or two or more rows at a time in the pixel values included in the query image data $GD_Q$, as in Step S31. As in the case of FIG. 20A, a plurality of pieces of the query image data $GD_Q$ that differ in the number of pixel values may be generated on the basis of the query image data $GD_Q$ input to the processing portion 13.

[Step S42]

Next, partial image data $GD_{part-Q}$, which is data of an area with a high degree of correspondence to the extracted image data $GD_{Ex}$, is extracted from the query image data $GD_Q$ by the processing portion 13. For example, in the case where the degrees of correspondence of the areas of the query image data $GD_Q$ to the database image data $GD_{DB}$ are each calculated by the method illustrated in FIG. 24B, the area with the highest degree of correspondence is extracted as the partial image data $GD_{part-Q}$. Thus, the number of pixel values included in the partial image data $GD_{part-Q}$ can be equal to the number of pixel values included in the extracted image data $GD_{Ex}$.

FIG. 26 is a diagram illustrating an example of the operation of Step S42. In the case of FIG. 26, the upper left portion of the image corresponding to the query image data $GD_Q$ is the area with the highest degree of correspondence to the extracted image data $GD_{Ex}[1]$. Thus, data corresponding to the upper left area of the query image data $GD_Q$ is referred to as partial image data $GD_{part-Q}[1]$. The lower right portion of the image corresponding to the query image data $GD_Q$ is the area with the highest degree of correspondence to the extracted image data $GD_{Ex}[2]$. Thus, data corresponding to the lower right area of the query image data $GD_Q$ is referred to as partial image data $GD_{part-Q}[2]$. In other words, a plurality of pieces of the partial image data $GD_{part-Q}$ are extracted from one piece of the query image data $GD_Q$.

In Step S42, image data whose number of pieces is equal to that of pieces of the extracted image data $GD_{Ex}$ may be extracted from the query image data $GD_Q$ as partial image data $GD_{part-Q}$. Alternatively, image data whose number of pieces is smaller than that of pieces of the extracted image data $GD_{Ex}$ may be extracted from the query image data $GD_Q$ as partial image data $GD_{part-Q}$. For example, in the case where areas of the query image data $GD_Q$ with high degrees of correspondence to a plurality of pieces of the extracted image data $GD_{Ex}$ are the same, the number of pieces of the partial image data $GD_{part-Q}$ extracted from the query image data $GD_Q$ can be one in that areas. That is, it is not necessary to extract the plurality of pieces of the same partial image data $GD_{part-Q}$ from the query image data $GD_Q$.

Note that the extraction of the partial image data $GD_{part-Q}$ may be omitted. In that case, the partial image data $GD_{part-Q}$ is rephrased as the query image data $GD_Q$ as appropriate, so that the following description can be applied. Alternatively, the whole of the query image data $GD_Q$ can be regarded as the partial image data $GD_{part-Q}$. For example, when the number of pixel values included in one or both of the query image data $GD_Q$ and the extracted image data $GD_{Ex}$ is increased or decreased, the image retrieval method using the image retrieval system 10 can be executed without extraction of the partial image data $GD_{part-Q}$.

[Step S43]

Next, the partial image data $GD_{part-Q}$ and the extracted image data $GD_{Ex}$ are input to the neural network included in the processing portion 13.

The description of Step S33 can be referred to for the operation in Step S43 as appropriate when the query image data $GD_Q$ is rephrased as the partial image data $GD_{part-Q}$ and the partial image data $GD_{part}$ is rephrased as the extracted image data $GD_{Ex}$, for example. Note that the query image data $GD_Q$ is rephrased as the extracted image data $GD_{Ex}$ and the partial image data $GD_{part}$ is rephrased as the partial image data $GD_{part-Q}$ in some cases.

The above is an example of the image retrieval method using the image retrieval system 10 in the case where the similarity of the database image data $GD_{DB}$ to the query image data $GD_Q$ is calculated by comparison between the entire area of the database image data $GD_{DB}$ and part of the area of the query image data $GD_Q$.

In the method shown in FIG. 23, the query image data $GD_Q$ is compared with the database image data $GD_{DB}$ by area-based matching or the like, and the database image data $GD_{DB}$ with a high degree of correspondence to part of the query image data $GD_Q$ is extracted as the extracted image data $GD_{Ex}$. After that, the area with a high degree of correspondence is extracted as the partial image data $GD_{part-Q}$ from the query image data $GD_Q$, and the partial image data $GD_{part-Q}$ and the extracted image data $GD_{Ex}$ are input to the neural network included in the processing portion 13. By the extraction of the database image data $GD_{DB}$ in this manner, it is possible to inhibit input of the database image data $GD_{DB}$, which represents the database image that does not include an image with a high degree of correspondence to the image corresponding to the query image data $GD_Q$, to the neural network included in the processing portion 13. Thus, the database image similar to part of the image corresponding to the query image data $GD_Q$ can be retrieved with high accuracy in a short time. Note that, for example, in the case where the number of pieces of the database image data $GD_{DB}$ compared with the query image data $GD_Q$ is small, the above retrieval can be performed with high accuracy in a short time even without the extraction of the database image data $GD_{DB}$.

This embodiment can be combined with the other embodiment as appropriate. In this specification, in the case where a plurality of structure examples are shown in one embodiment, the structure examples can be combined as appropriate.

Example

This example describes the results of retrieval of a database image similar to an image input to the image retrieval system.

In this example, one image was input as a query image to the image retrieval system. After that, 100 database images similar to the image were retrieved in each of Condition 1 and Condition 2. In each of Condition 1 and Condition 2, the query image was a schematic diagram illustrating a semiconductor manufacturing apparatus. As the database images, circuit diagrams, circuit layout diagrams, block diagrams, and the like as well as schematic diagrams each illustrating a semiconductor manufacturing apparatus were prepared. Furthermore, the database images were drawings disclosed in a patent document.

In Condition 1, the similarity of the database images to the query image was calculated through Step S11 to Step S13 in FIG. 9. After that, Step S17 was performed to generate ranking data representing the database images in descending order of the similarity from the first highest similarity to the hundredth highest similarity.

In Condition 2, first, database tags were obtained from a specification disclosed in a patent document that is the same as the patent document disclosing the database images through Step S01 to Step S04 in FIG. 2. Next, Step S11 to Step S13 in FIG. 9 were performed to calculate the similarity of the database images to the query image, and then Step S14 to Step S16 were performed to correct the similarity. After that, Step S17 was performed to generate ranking data representing the database images in descending order of the similarity after the correction from the first highest similarity to the hundredth highest similarity.

In Condition 1, the number of images illustrating a semiconductor manufacturing apparatus as in the query image among the database images with the first highest similarity to the hundredth highest similarity to the query image was 14, and the other 86 images were images illustrating circuit diagrams, circuit layout diagrams, block diagrams, and the like. By contrast, in Condition 2, all the 100 images were images illustrating a semiconductor manufacturing apparatus.

The above demonstrated that more database images having similar concepts to the query image were able to be retrieved in Condition 2 than in Condition 1.

REFERENCE NUMERALS

10: image retrieval system, 11: input portion, 12: transmission path, 13: processing portion, 15: memory portion, 17: database, 19: output portion, 21: compared data area, 30: neural network, 30a: neural network, 31: layer, 32: neuron, 32a: neuron, 32b: neuron, 32c: neuron, 40: neural network

The invention claimed is:

1. An image retrieval system comprising a database, a processing portion comprising a plurality of neural networks including one or more processors, and an input portion,
   wherein the database is configured to store document data and a plurality of pieces of database image data,
   wherein a first neural network of the plurality of neural networks is configured to obtain database image feature value data representing a feature value of the database image data for each of the plurality of pieces of database image data,
   wherein the processing portion is configured to generate a plurality of database tags using the document data, and linking the database tags to the database image data,
   wherein a second neural network of the plurality of neural networks is configured to obtain a database tag vector representing the database tag for each of the plurality of database tags,
   wherein, when query image data is input to the input portion, the processing portion is configured to obtain query image feature value data representing a feature value of the query image data,
   wherein the processing portion is configured to calculate first similarity that is similarity of the database image data to the query image data for each of the plurality of pieces of database image data,
   wherein the processing portion is configured to obtain a query tag linked to the query image data using the database tags on the basis of the first similarity,
   wherein the processing portion is configured to obtain a query tag vector representing the query tag,
   wherein the processing portion is configured to obtain first data comprising the database image feature value data and the database tag vector,
   wherein the processing portion is configured to obtain second data comprising the query image feature value data and the query tag vector, and
   wherein the processing portion is configured to obtain second similarity that is similarity of the first data to the second data.

2. The image retrieval system according to claim 1, wherein the database tag includes a term.

3. The image retrieval system according to claim 1, wherein the processing portion is configured to generate the database tag by conducting morphological analysis on the document data.

4. The image retrieval system according to claim 1,
   wherein the query image feature value data is obtained using the first neural network, and
   wherein the query tag vector is obtained using the second neural network.

5. The image retrieval system according to claim 4,
   wherein the first neural network comprises a convolutional layer and a pooling layer, and
   wherein the database image feature value data and the query image feature value data are output from the pooling layer.

6. The image retrieval system according to claim 4, wherein the database tag vector and the query tag vector are each a distributed representation vector.

7. The image retrieval system according to claim 1, wherein the first similarity and the second similarity are each cosine similarity.

8. An image retrieval method using an image retrieval system comprising an input portion and a database storing document data and a plurality of pieces of database data, comprising:
   obtaining, by a first neural network, database image feature value data representing a feature value of the database image data for each of the plurality of pieces of database image data;
   generating a plurality of database tags using the document data, and linking the database tags to the database image data;
   obtaining, by a second neural network, a database tag vector representing the database tag for each of the plurality of database tags;
   inputting query image data to the input portion;
   obtaining query image feature value data representing a feature value of the query image data;
   calculating first similarity that is similarity of the database image data to the query image data for each of the plurality of pieces of database image data;

obtaining a query tag linked to the query image data using of the database tags on the basis of the first similarity;

obtaining a query tag vector representing the query tag;

obtaining first data comprising the database image feature value data and the database tag vector and second data comprising the query image feature value data and the query tag vector; and calculating second similarity that is similarity of the first data to the second data.

9. The image retrieval method according to claim 8, wherein the database tag includes a term.

10. The image retrieval method according to claim 8, wherein the database tag is generated by morphological analysis conducted on the document data.

11. The image retrieval method according to claim 8,
wherein the query image feature value data is obtained using a first neural network, and
wherein the query tag vector is obtained using a second neural network.

12. The image retrieval method according to claim 11,
wherein the first neural network comprises a convolutional layer and a pooling layer, and
wherein the database image feature value data and the query image feature value data are output from the pooling layer.

13. The image retrieval method according to claim 11, wherein the database tag vector and the query tag vector are each a distributed representation vector.

14. The image retrieval method according to claim 8, wherein the first similarity and the second similarity are each cosine similarity.

* * * * *